US007891223B2

(12) United States Patent
Kaneko et al.

(10) Patent No.: US 7,891,223 B2
(45) Date of Patent: Feb. 22, 2011

(54) TRANSFER PRESS MACHINE

(75) Inventors: Sotoyuki Kaneko, Sagamihara (JP);
Hiroshi Hosoya, Hachioji (JP);
Kazuhiro Kuboe, Sagamihara (JP)

(73) Assignee: Aida Engineering, Ltd.,
Sagamihara-Shi (JP)

( * ) Notice: Subject to any disclaimer, the term of this patent is extended or adjusted under 35 U.S.C. 154(b) by 876 days.

(21) Appl. No.: 11/718,174

(22) PCT Filed: Oct. 28, 2005

(86) PCT No.: PCT/JP2005/019934

§ 371 (c)(1),
(2), (4) Date: Jun. 19, 2007

(87) PCT Pub. No.: WO2006/046717

PCT Pub. Date: May 4, 2006

(65) Prior Publication Data

US 2008/0295564 A1    Dec. 4, 2008

(30) Foreign Application Priority Data

Oct. 29, 2004    (JP) ............................. 2004-316801

(51) Int. Cl.
*B21D 55/00* (2006.01)
*B21C 51/00* (2006.01)
*B21J 11/00* (2006.01)

(52) U.S. Cl. .......................... 72/14.8; 72/15.1; 72/17.2; 72/20.3; 72/405.01

(58) Field of Classification Search . 72/405.01–405.16, 72/14.8–15.1, 17.1, 17.2, 20.2, 20.3; 700/97–98, 700/178, 174, 206; 703/6–7

See application file for complete search history.

(56) References Cited

U.S. PATENT DOCUMENTS 5,231,860 A * 8/1993 Tsuruta et al. ............... 72/20.1

(Continued)

FOREIGN PATENT DOCUMENTS

EP        0837379        4/1998

(Continued)

OTHER PUBLICATIONS

International Search Report for PCT/JP2005/019934 mailed Jan. 24, 2006.

*Primary Examiner*—Dana Ross
*Assistant Examiner*—Mohammad Yusuf
(74) *Attorney, Agent, or Firm*—McDermott Will & Emery LLP

(57) ABSTRACT

A transfer press machine which can accurately and promptly check interference and can be easily handled is provided. The transfer press machine includes an interference check device including: a data-conversion constituent element storage section which stores a press-side data-conversion constituent element and a transfer-side data-conversion constituent element in a state of being placed in virtual space to have the same relative positional relationship as in real space; a virtual press operation control section which causes the press-side data-conversion constituent element to perform a virtual press operation in the virtual space according to a press motion; a virtual transfer operation control section which causes the transfer-side data-conversion constituent element to perform a virtual transfer operation in the virtual space according to a transfer motion; a virtual synchronization timing information generation-output section which generates and outputs virtual synchronization timing information, and a virtual interference determination section which determines whether or not interference occurs between the press-side data-conversion constituent element and the transfer-side data-conversion constituent element during a transfer press cycle.

14 Claims, 26 Drawing Sheets

U.S. PATENT DOCUMENTS

| | | | |
|---|---|---|---|
| 5,970,763 | A | 10/1999 | Takayama et al. |
| 6,182,023 | B1 | 1/2001 | Ohtsu et al. |
| 6,185,517 | B1 | 2/2001 | Ohtsu et al. |
| 6,845,646 | B2 | 1/2005 | Goto |
| 2003/0004604 | A1 | 1/2003 | Goto |

FOREIGN PATENT DOCUMENTS

| | | |
|---|---|---|
| JP | 5-71904 U | 9/1993 |
| JP | 06055352 | 3/1994 |
| JP | 08-096025 A | 4/1996 |
| JP | 08-304494 A | 11/1996 |
| JP | 09-237285 A | 9/1997 |
| JP | 2003-019527 A | 1/2003 |
| JP | 2003-19600 A | 1/2003 |
| JP | 2003-108212 A | 4/2003 |
| JP | 2003-181698 A | 7/2003 |
| JP | 2003-245800 A | 9/2003 |
| JP | 2003260530 | 9/2003 |

\* cited by examiner

TEMPORARY SETTING

TRANSFER PRESS MACHINE

CROSS REFERENCE TO PRIOR APPLICATION

This is a U.S. national phase application under 35 U.S.C. §371 of International Patent Application No. PCT/JP2005/019934 filed Oct. 28, 2005, and claims the benefit of Japanese Application No. 2004-316801 filed Oct. 29, 2004, both of them are incorporated by reference herein. The International Application was published in Japanese on May 4, 2006 as International Publication No. WO/2006/046717 under PCT Article 21(2).

TECHNICAL FIELD

The present invention relates to a transfer press machine including a press machine which can press a material by utilizing the press operation of a slide and a material transfer device which can transfer a material to the press machine, the press machine and the material transfer device being disposed in real space to have a specific relative positional relationship, and can press the material transferred during a transfer press cycle in which the press operation and the transfer operation are synchronized.

BACKGROUND

A press machine and a material transfer device forming a transfer press machine are disposed in real space to have a specific relative positional relationship. A material can be pressed while transferring the material during a transfer press cycle in which the press operation of the press machine and the transfer operation of the material transfer device are synchronized.

A press machine which presses a material utilizing the press (slide) operation of a slide is roughly classified as a flywheel energy storage system or a servomotor drive system. A material transfer device which can transfer a material from a pre-placed die (e.g. first die) to a post-placed die (e.g. second die) utilizing the transfer operation of a finger is roughly classified as a mechanical coupling (e.g. crankshaft and transfer power shaft are connected) system or a robot system. Since a mechanical-coupling material transfer device is associated (synchronized) with a press machine by means of mechanical coupling, a press operation (slide moving operation) according to a press (slide) motion and a transfer operation according to a transfer motion do not interfere.

On the other hand, a robot material transfer device is formed so that the material transfer operation starts when the actual crank angle which changes along with the press operation has reached the transfer start angle set in advance. In a flywheel energy storage press machine, the press motion changes in proportion to an increase (decrease) in strokes per minute (SPM). Therefore, it is not difficult to change the setting of the transfer operation pattern of the material transfer device.

On the other hand, when using a servomotor-drive press machine (see JP-A-2003-181698), it is desirable to use a servomotor-drive material transfer device in order to make the most of the universal motion of the press machine. In this case, the material transfer device is also formed so that the material transfer operation starts when the actual crank angle which changes along with the press operation has reached the transfer start angle set in advance.

In a three-dimensional transfer system, a material is transferred (e.g. brought in and out) in a state in which each transfer (e.g. clamp-unclamp, lift-down, and advance-return) operation and slide moving operation are synchronized so that interference does not occur. Specifically, the slide position is detected from an output signal (rotational angle signal) from an encoder provided to a crankshaft to determine the transfer operation pattern of the material transfer device. Therefore, the component (e.g. finger attached to feed bar or material) of the material transfer device and a die (e.g. upper die) of the press machine can be prevented from contacting (interfering) irrespective of the slide position during pressing.

However, it is troublesome and takes time for the operator to optimize the transfer operation pattern of the material transfer device (i.e. transfer motion) for the press motion each time the setting of the press operation pattern (i.e. press (slide) motion) is changed. In order to avoid such complexity, the tendency is to employ an operation in which the press motion is performed at a low speed and the transfer motion is made constant. This makes it impossible to fully utilize the advantage which allows selection of an arbitrary press motion (e.g. decreasing the processing speed in the pressing region or making the processing speed constant or achieving a stop operation at the bottom dead center). Moreover, it is extremely difficult to accurately and promptly set press conditions by intuition or an empirical rule to avoid interference.

The SPM of the press machine is restricted by the limit SPM of the material transfer device. The limit SPM is determined by the mechanical rigidity of each transfer mechanism and the maximum acceleration and the maximum speed determined by the amount of inertia, characteristics of the servomotor, and the like. Therefore, in order to increase the limit SPM, it is necessary to increase the operation angle range (determined by the transfer operation start angle and the transfer operation finish angle). However, the operation angle of the press machine is limited (360 degrees). Specifically, when the operation angle range is made constant, the limit SPM of the material transfer device cannot be increased without reducing the transfer moving amount. On the other hand, when the transfer moving amount is made constant, the limit SPM cannot be increased by increasing the transfer time if the operation angle range is not increased.

In order to deal with this problem, the operation angle range may be increased by causing an unclamp (UCL) operation, a return (RTN) operation, and a clamp (CLP) operation shown in FIG. 27(A) to partially overlap (simultaneous operation), as indicated by the solid line in FIG. 27(B), for example. In the case of a three-dimensional transfer, an unclamp (UCL) operation, a return (RTN) operation, a clamp (CLP) operation, a lift (LFT) operation, an advance (ADV) operation, and a down (DWN) operation shown in FIG. 28(A) are caused to partially overlap (simultaneous operation), as shown in FIG. 28(B). However, since interference occurs with a significantly high probability when enabling the overlapping operation, it is necessary to more carefully check whether or not interference occurs between the press machine and the material transfer device while operating the press machine at a low speed. In more detail, interference checks between respective parts and operation angle setting operations are repeatedly performed while gradually increasing the press speed to find an appropriate point.

In order to avoid such complexity, an operation tends to be employed in which the press motion is performed at a low speed and the transfer motion is made constant. This makes it impossible to fully utilize the characteristics of the servomotor drive press machine, that is, the advantage which allows selection of an arbitrary press motion (e.g. decreasing the processing speed in the pressing region or making the processing speed constant or achieving a stop operation at the bottom dead center). In this case, it is also extremely difficult to accurately and promptly set press conditions by intuition or an empirical rule to avoid interference.

Therefore, the applicant of the invention has proposed a transfer press machine which can maximize productivity while avoiding interference between the press machine and the material transfer device from the viewpoint of matching optimization of the press motion and the transfer motion (JP-A-2003-245800).

The previously proposed press machine is formed so that adjusted press conditions in which interference between the material transfer device and the die is prevented can be calculated utilizing press (processing) operation information according to input press (processing) conditions and material transfer operation information according to input specified material transfer conditions, and a motor can be controlled to achieve a press (processing) operation according to interference avoidable press conditions calculated instead of the set press conditions.

DISCLOSURE OF THE INVENTION

There has been a tendency to frequently change the press motion, the transfer motion, the shape of various parts, and the like during die tryout in the press production site employing a servomotor-drive press machine. Therefore, a strong demand exists for conducting interference checks before actual pressing more promptly, accurately, and safely. Moreover, an increase in productivity is also strongly demanded by increasing the SPM while preventing interference.

The previously proposed press machine is not sufficient for satisfying these demands. Specifically, according to the previously proposed press machine, press conditions (e.g. specified speed pattern at processing start position, processing end position, and processing region) and material transfer conditions (e.g. advance operation start timing, advance operation speed, and advance operation distance) must be set (input) each time the interference check is conducted. However, since these items are technical and require expertise, it is very difficult to accurately set (input) these items in a short time. This operation requires an additional worker and makes handling very complicated. Moreover, the results may become inaccurate due to input errors.

The presence or absence of interference is determined by calculating conditions selected from the set (input) press conditions and material transfer conditions in a specific order according to specific procedure in a number of stages, and comparing the calculation results with the preset values. This increases the calculation load and increases the processing time. It is also difficult to determine a specific position at which interference occurs. For example, it is impossible to take measures such as replacing the upper die part with an upper die part which does not cause interference. Moreover, since the press motion is automatically changed within a range determined in advance in order to automatically prevent interference, it may not be suitable for actual operation. In addition, it is difficult for a worker other than a skilled person to handle the machine.

In the previously proposed press machine, the virtual interference determination calculation function and the automatic motion change function are introduced in order to optimize the motion, but the shape of the die and the material is not taken into consideration. Therefore, it is impossible to practically determine the presence or absence of virtual interference before operating the machine in real space. Moreover, it is very difficult to establish a transfer press motion (cycle) effective for an increase in productivity by increasing the SPM while preventing interference.

A first object of the invention is to provide a transfer press machine which can accurately and promptly check interference and can be easily handled. A second object of the invention is to provide a transfer press machine which can automatically, promptly, and accurately optimize the transfer press motion (cycle) in which the SPM is increased while preventing interference.

According to an embodiment of the invention, there is provided a transfer press machine including a press machine which can press a material by using a press operation of a slide and a material transfer device which can transfer a material to the press machine by using a transfer operation of a finger, the press machine and the material transfer device being disposed in real space to have a specific relative positional relationship with each other, the transfer press machine being capable of pressing a material transferred during a transfer press cycle in which the press operation and the transfer operation are synchronized, and the transfer press machine comprising an interference check device, the interference check device including: a data-conversion constituent element storage section which stores a press-side data-conversion constituent element, which is a constituent element of the press machine and is converted into three-dimensional shape data, and a transfer-side data-conversion constituent element, which is a constituent element of the material transfer machine and is converted into three-dimensional shape data, in a state of being placed in virtual space to have the same relative positional relationship as in the real space; a virtual press operation control section which causes the press-side data-conversion constituent element placed in the data-conversion constituent element storage section to perform a virtual press operation in the virtual space according to a press motion; a virtual transfer operation control section which causes the transfer-side data-conversion constituent element placed in the data-conversion constituent element storage section to perform a virtual transfer operation in the virtual space according to a transfer motion; a virtual synchronization timing information generation-output section which generates and outputs virtual synchronization timing information for causing the virtual press operation control section and the virtual transfer operation control section to execute a virtual transfer press cycle in which the virtual press operation and the virtual transfer operation are synchronized; and a virtual interference determination section which determines whether or not interference occurs between the press-side data-conversion constituent element and the transfer-side data-conversion constituent element during the virtual transfer press cycle, whereby interference in the virtual space being checked without actually executing the transfer press cycle in the real space.

Optionally, when virtually moving a data-conversion upper die converted into three-dimensional shape data down to a virtual bottom dead center in the virtual space, interference between the data-conversion upper die and a data-conversion finger path-shaped box placed in the virtual space may be detected, the detected data-conversion upper die may be extracted as a virtual interference confirmation target, and the presence or absence of virtual interference may be determined by using the extracted data-conversion upper die and the data-conversion finger as the data-conversion constituent elements. Further, when virtually moving a data-conversion upper die converted into three-dimensional shape data down to a virtual bottom dead center in the virtual space, interference of the data-conversion upper die and a data-conversion lower die with each data-conversion material path-shaped box placed in virtual space may be detected, the detected data-conversion upper die and data-conversion lower die may be extracted as virtual interference confirmation targets, and the presence or absence of virtual interference may be determined by using the extracted data-conversion upper die and data-conversion lower die as the press-side data-conversion constituent elements and the data-conversion material as the transfer-side data-conversion constituent element.

In addition a data-conversion constituent element switch control section which switches the constituent element from the simple three-dimensional shape data-conversion constituent element to the complicated three-dimensional shape data-conversion constituent element at a specific timing during the virtual transfer press cycle may be provided, and the virtual interference determination section may determine the presence or absence of virtual interference by using at least one of the press-side data-conversion constituent element and the transfer-side data-conversion constituent element as the simple three-dimensional shape data-conversion constituent element before switching, and by using both the press-side data-conversion constituent element and the transfer-side data-conversion constituent element as the complicated three-dimensional shape data-conversion constituent elements after switching.

Optionally the determination of a necessary interval which requires determination of the presence or absence of virtual interference may be set in the virtual transfer press cycle; and the virtual interference determination section may determine the presence or absence of virtual interference in the determination necessary interval during the virtual transfer press cycle. Also, a determination execution interval formed by subdividing the set determination necessary interval may be set, and the virtual interference determination section may determine the presence or absence of virtual interference in the determination execution interval. Further, execution of a determination of the presence or absence of virtual interference may be designated during the virtual transfer press cycle in units of one-dimensional virtual transfer operations forming the virtual transfer operation, and the virtual interference determination section may determine the presence or absence of virtual interference during the one-dimensional virtual transfer operation for which execution of determination of the presence or absence of virtual interference is designated.

The press-side data-conversion constituent element and the transfer-side data-conversion constituent element stored in the data-conversion constituent element storage section in a state of being placed in the virtual space may be displayed on a display section.

In one embodiment there is provided a transfer press machine including a press machine which can press a material by utilizing a press operation of a slide and a material transfer device which can three-dimensionally transfer a material, the press machine and the material transfer device being disposed in real space to have a specific relative positional relationship, and the transfer press machine being capable of pressing a material transferred during a transfer press cycle in which the press operation and the transfer operation are synchronized. A press-side data-conversion constituent element, which is a constituent element of the press machine and is converted into three-dimensional shape data, and a transfer-side data-conversion constituent element, which is a constituent element of the material transfer machine and is converted into three-dimensional shape data, can be stored in a state of being placed in virtual space to have the same relative positional relationship as in the real space. The transfer press machine includes: a virtual interference check device formed so that interference between the press-side data-conversion constituent element and the transfer-side data-conversion constituent element can be checked during a virtual transfer press cycle in which a virtual press operation of the press-side data-conversion constituent element placed in the virtual space according to a press motion and a virtual transfer operation of the transfer-side data-conversion constituent element placed in the virtual space according to a transfer motion are synchronized; a clamp-unclamp operation optimization section including a first allowable SPM increasing section which increases an allowable SPM by increasing a clamp-unclamp operation angle range by using an eleventh angle range increasing section, a first virtual interference determination section which determines the presence or absence of interference by activating the virtual interference check device during a clamp-unclamp operation after increasing the allowable SPM, a first increase operation repeating section which again activates the first allowable SPM increasing section when the first virtual interference determination section has been determined that interference does not occur, and a first interference prevention section which prevents interference by reducing the clamp-unclamp operation angle range and increasing a clamp-unclamp operation moving amount when the first virtual interference determination section has been determined that interference has occurred, the clamp-unclamp operation optimization section being formed to optimize the clamp-unclamp operation; and a lift-down operation optimization section including a second allowable SPM increasing section which increases an allowable SPM by increasing a lift-down operation angle range by using a twenty-first angle range increasing section, a second virtual interference determination section which determines the presence or absence of interference by activating the virtual interference check device during a lift-down operation after increasing the allowable SPM, a second increase operation repeating section which again activates the second allowable SPM increasing section when the second virtual interference determination section has been determined that interference does not occur, and a second interference prevention section which prevents interference by reducing the lift-down operation angle range and increasing a lift-down operation moving amount when the second virtual interference determination section has been determined that interference has occurred, the lift-down operation optimization section being formed to optimize the lift-down operation. The smaller of a clamp-unclamp operation allowable SPM temporarily determined by the clamp-unclamp operation optimization section and a lift-down operation allowable SPM temporarily determined by the lift-down operation optimization section can be automatically determined as an SPM of the press machine.

Optionally, when an eleventh limit moving amount determination section has determined that the clamp-unclamp operation moving amount increased by the first interference prevention section is a limit moving amount, the clamp-unclamp operation moving amount may be returned to a value before being increased by activating an eleventh operation moving amount reducing section. Also, when a twenty-first limit moving amount determination section has determined that the lift-down operation moving amount increased by the second interference prevention section is a limit moving amount, the lift-down operation moving amount may be returned to a value before being increased by activating a twenty-first operation moving amount reducing section.

One embodiment, when a first allowable SPM comparison-determination section has compared the clamp-unclamp operation allowable SPM increased based on the clamp-unclamp operation angle range increased by the eleventh angle range increasing section with a return operation allowable SPM and determined that the return operation allowable SPM is smaller than the clamp-unclamp operation allowable SPM, the return operation angle range may be increased by a twelfth angle range increasing section, and the first virtual interference determination section may perform a determination operation by activating the virtual interference check device after the return operation angle range has been increased. Additionally, when a second allowable SPM comparison-determination section has compared the lift-down operation allowable SPM increased based on the lift-down operation angle range increased by the twenty-first angle range increasing section with an advance operation allowable SPM and determined that the advance operation allowable SPM is smaller than the lift-down operation allowable SPM, the advance operation angle range may be increased by a twenty-second angle range increasing section, and the second virtual interference determination section may perform a determination operation by activating the virtual interference check device after the advance operation angle range has been increased.

Further, when a twelfth limit angle range determination section has determined that the return operation angle range increased by the twelfth angle range increasing section is a value exceeding 180 degrees, the determination operation of the first virtual interference determination section may be prohibited, and the return operation angle range may be reduced by the twelfth angle range reducing section. When a twenty-second limit angle range determination section has determined that the advance operation angle range increased by the twenty-second angle range increasing section is a value exceeding 180 degrees, the determination operation of the second virtual interference determination section may be prohibited, and the advance operation angle range may be reduced by a twenty-second angle range reducing section.

Optionally, when an eleventh setting angle appropriateness determination section has determined that the relationship between a clamp operation start angle and an unclamp operation finish angle is inappropriate and an eleventh moving amount increase determination section has determined that the clamp-unclamp moving amount has not been increased, the clamp-unclamp moving amount may be temporarily set by activating an eleventh moving amount temporarily setting section. When a twenty-first setting angle appropriateness determination section has determined that a down operation start angle does not exceed 0 degrees (inappropriate) and a twenty-first moving amount increase determination section has determined that the lift-down moving amount has not been increased, the lift-down moving amount may be temporarily set by activating a twenty-first moving amount temporarily setting section.

In one embodiment of the invention there is provided a transfer press machine including a press machine which can press a material by utilizing a press operation of a slide and a material transfer device which can two-dimensionally transfer a material, the press machine and the material transfer device being disposed in real space to have a specific relative positional relationship, and the transfer press machine being capable of pressing a material transferred during a transfer press cycle in which the press operation and the transfer operation are synchronized. A press-side data-conversion constituent element and a transfer-side data-conversion constituent element, which are converted into three-dimensional shape data as stated above can be stored in a state of being placed in virtual space to have the same relative positional relationship as in the real space. The transfer press machine includes: a virtual interference check device as described above; a clamp-unclamp operation optimization section including a third allowable SPM increasing section which increases an allowable SPM by increasing a clamp-unclamp operation angle range by using a thirty-first angle range increasing section, a third virtual interference determination section which determines the presence or absence of interference by activating the virtual interference check device during a clamp-unclamp operation after increasing the allowable SPM, a third increase operation repeating section which again activates the third allowable SPM increasing section when the third virtual interference determination section has been determined that interference does not occur, and a third interference prevention section which prevents interference by reducing the clamp-unclamp operation angle range and increasing a clamp-unclamp operation moving amount when the third virtual interference determination section has been determined that interference has occurred, the clamp-unclamp operation optimization section being formed to optimize the clamp-unclamp operation; a third allowable SPM comparison-determination section which compares a clamp-unclamp operation allowable SPM increased based on the clamp-unclamp operation angle range increased by the thirty-first angle range increasing section with a return operation allowable SPM to determine whether or not the return operation allowable SPM is smaller than the clamp-unclamp operation allowable SPM; a thirty-second angle range increasing section which increases a return-advance operation angle range; and a thirty-second angle adjusting section which adjusts a clamp operation finish angle and advance operation start angle and adjusts an unclamp operation start angle and an advance operation finish angle. When the third allowable SPM comparison-determination section has determined that the return operation allowable SPM is smaller than the clamp-unclamp operation allowable SPM, the return-advance operation angle range can be increased by the thirty-first angle range increasing section, angle adjustments can be performed by the thirty-second angle adjusting section, and the third virtual interference determination section can perform a determination operation by activating the virtual interference check device after the angle adjustments.

Since whether or not interference occurs between the press-side data-conversion constituent element and the transfer-side data-conversion constituent element can be determined during the virtual transfer press cycle in virtual space, interference can be accurately and promptly checked, and handling is easy. Complicated setting/input work and an additional worker are unnecessary. Moreover, since it is unnecessary to actually perform the transfer press cycle in real space, it is safe and almost free from risk. The data-conversion upper die which interferes with the placement data-conversion finger path-shaped box by virtually moving the data-conversion upper die down to the virtual bottom dead center can be extracted as the virtual interference confirmation target, the same effects as those can be achieved. Moreover, the virtual interference confirmation target can be efficiently selected, and the load of the interference check between the data-conversion upper die and the data-conversion finger can be reduced, and the processing speed can be increased. In particular, the invention is effective when changing the material transfer motion. Further, the data-conversion upper die and the data-conversion lower die which interfere with the placement data-conversion material path-shaped box by virtually moving the data-conversion upper die down to the virtual bottom dead center can be extracted as the virtual interference confirmation targets, the same effects as the invention in claim 1 can be achieved. Moreover, the virtual interference confirmation target can be efficiently selected, the load of the interference check between the data-conversion upper die and the data-conversion lower die and the data-conversion material can be reduced, and the processing speed can be increased. In particular, the invention in claim 3 is effective when changing the material.

Since interference can be checked using the simple three-dimensional shape data-conversion constituent element as one of the constituent elements before switching during the virtual transfer press cycle, the same effects as above can be achieved. Moreover, the processing load in the initial stage can be significantly reduced, and the processing speed can be further increased. Since the complicated three-dimensional shape data-conversion constituent element is used after switching, specific, accurate, and prompt determination can be ensured.

In another embodiment, since interference is checked when the virtual transfer press cycle is in progress and the interval is the determination necessary interval, the same effects as above can be achieved. Moreover, load can be reduced by selecting the necessary interval, and the time required for all the check steps can be reduced. Moreover, if the virtual interference determination section determines the presence or absence of virtual interference when the interval is the determination execution interval, load and time required for all the check steps can be further reduced.

As stated above, if the presence or absence of virtual interference is determined in the one-dimensional virtual transfer operation in which execution of determination of the presence or absence of interference is designated, the same effects as the inventions in claims 1 to 4 can be achieved. Moreover, load and time required for all the check steps can be minimized in the relationship with the material transfer operation.

According to the other embodiment of the invention, since the press-side data-conversion constituent element and the transfer-side data-conversion constituent element can be displayed on the display section, the same effects as those stated above can be achieved. Moreover, the relative relationship between the constituent elements can be observed when creating the data-conversion constituent element or determining the presence or absence of virtual interference. Therefore, handling is further facilitated.

According to yet another, a transfer press machine can be provided which can automatically, promptly, and accurately optimize transfer press motion (cycle) in which the SPM is increased while preventing interference. Moreover, complicated setting/input work and an additional worker are unnecessary. Therefore, handling is facilitated. Since it is unnecessary to actually perform the transfer press cycle in real space, it is safe and almost free from risk.

Moreover, the SPM can be optimized to the allowable (limit) SPM at the time at which the clamp-unclamp operation moving amount reaches the limit width specified for the die or the like. Moreover, the SPM can be optimized to the limit SPM at the time at which immediately before the clamp operation finish angle and the unclamp operation start angle overlap.

Further using an embodiment of the invention situation can be reliably prevented in which the return operation angle range and the advance operation angle range exceed 180 degrees.

Also if a temporary setting of reducing the clamp-unclamp operation moving amount can be automatically performed, the same effects as those above can be achieved. Moreover, limitations to the allowable SPM which may occur when the unclamp operation finish angle and the clamp operation start angle overlap even though the clamp-unclamp operation moving amount is not increased can be automatically eliminated. The same effects (three-dimensional transfer material transfer device) can be achieved even when using a two-dimensional transfer material transfer device.

BRIEF DESCRIPTION OF THE DRAWINGS

FIGS. 13(A) to 13(D) are diagrams illustrative of operation such as finger path-shaped box and the like.

DETAILED DESCRIPTION

The best modes for carrying out the invention are described below in detail with reference to the drawings.

As shown in FIGS. 1 to 13(D), a transfer press machine (10,40) includes an interference check device which includes data-conversion constituent element storage means 64IPT, virtual press operation control means (61,64), virtual transfer operation control means (61,64), virtual synchronization timing information generation-output means (61,64), and virtual interference determination means (61,64), subjects a press-side data-conversion constituent element and a transfer-side data-conversion constituent element stored in a state in which the press-side data-conversion constituent element and the transfer-side data-conversion constituent element are converted into three-dimensional shape data and placed in virtual space to have the same relative positional relationship as in real space to a virtual transfer press cycle, and can determine whether or not virtual interference occurs between the press-side data-conversion constituent element and the transfer-side data-conversion constituent element during the virtual transfer press cycle so that interference can be checked during the transfer press cycle in virtual space without actually executing the transfer press cycle in real space.

In this embodiment, first virtual interference confirmation target extraction means (61,64) is provided so that a data-conversion finger path-shaped box 43DBX can be generated and placed in virtual space, interference between a data-conversion upper die 16D and the placed data-conversion finger path-shaped box 43DBX can be detected when virtually moving the data-conversion upper die 16D (data-conversion upper die part 16BD) down to a virtual bottom dead center in virtual space, and the data-conversion upper die 16D can be extracted as a virtual interference confirmation target.

Figure 1:
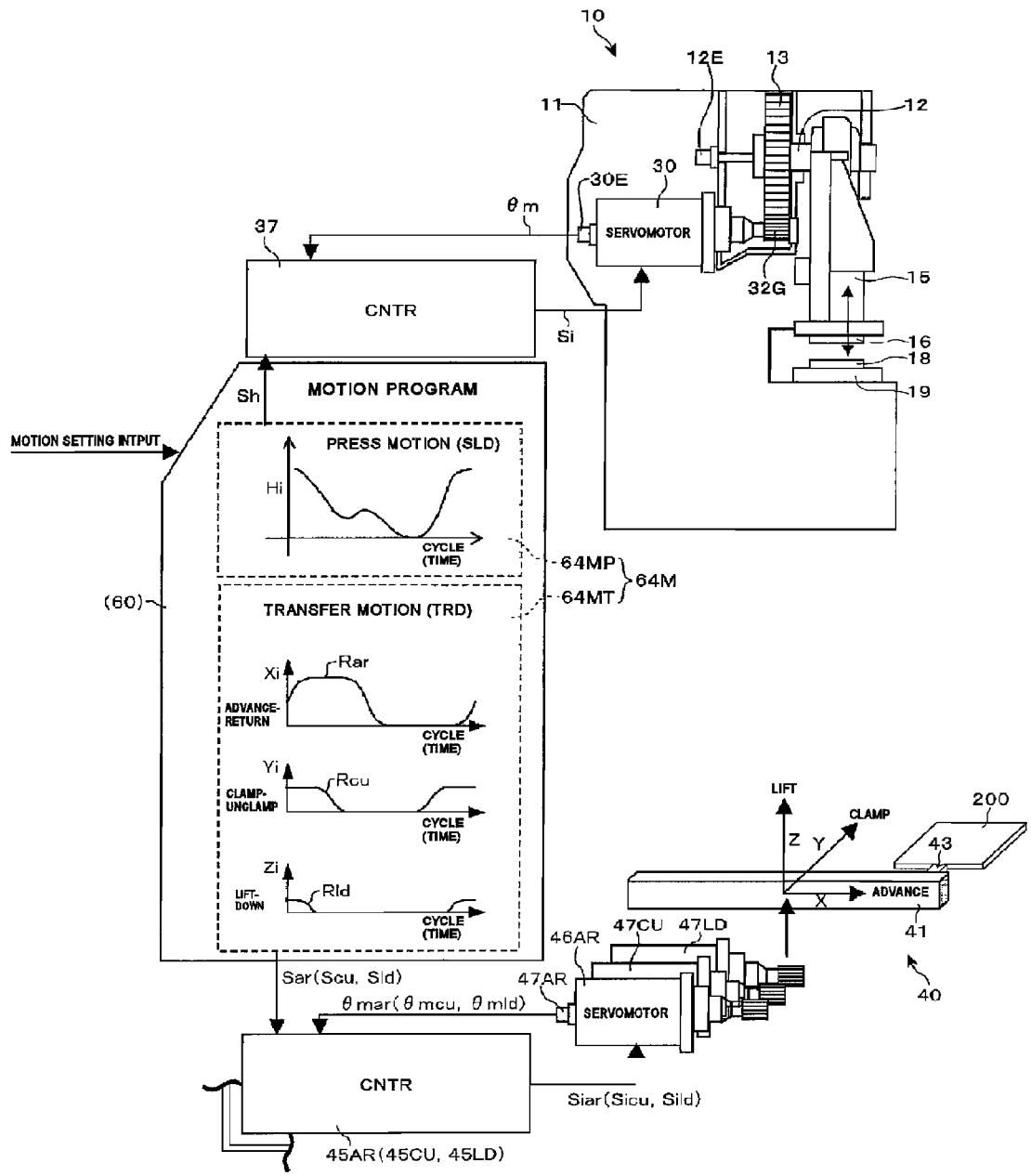
FIG. 1 is a diagram illustrative of transfer press machine according to a first embodiment of the invention.
Figure 2:
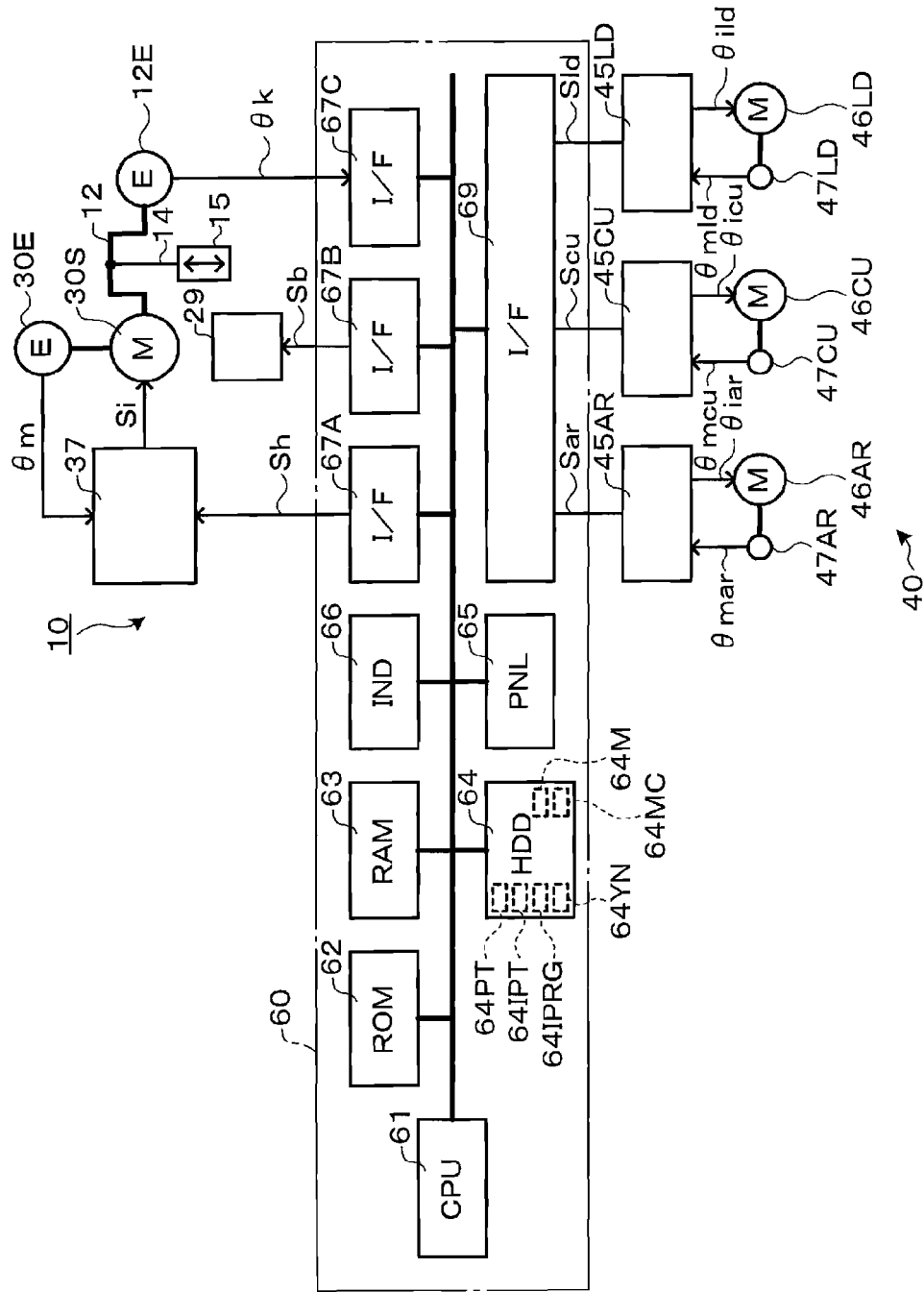
FIG. 2 is a block diagram illustrative of an operation control section.

As shown in FIG. 1 which schematically shows the basic configuration and function of the transfer press machine 10 and FIG. 2 (block diagram) which mainly shows an operation control device (60), the transfer press machine (10,40) includes a press machine 10 which can press a material by utilizing the press operation of a slide 15 (upper die 16) and a material transfer device 40 which can transfer a material 200 to the press machine by utilizing the transfer operation of a finger 43, the press machine 10 and the material transfer device 40 being disposed in real space to have a specific relative positional relationship, and can press the material 200 transferred during a transfer press cycle in which the press operation and the transfer operation are synchronized.

The mechanical structure of the press machine 10 is described below mainly referring to FIG. 1. The slide 15 (upper die 16) is provided to a main body (including crown, column, frame, bed, bolster 19, and the like) 11 so that the slide 15 can be reciprocated in the vertical direction. Power for moving the slide 15 up and down is supplied from a servomotor 30 through a crank mechanism (crankshaft 12 and connecting rod 14) and gears (13, 32G). Specifically, the rotary movement of the slide-moving motor (30) can be converted into the vertical (up and down . . . linear) movement of the slide 15 (upper die 16) through the crank mechanism.

The upper die 16 (slide 15) driven by the crank mechanism reaches the highest position at the top dead center and reaches the lowest position at the bottom dead center at which the upper die 16 is close to a lower die 18. A virtual bottom dead center described later refers to a bottom dead center in virtual space.

In FIGS. 1 and 2, a press control device 37 vertically moves the slide 15 (upper die 16) to a position corresponding to an input target slide position signal Sh while controlling the servomotor 30 (slide-moving motor). A transfer control device 45 transfers a feed bar 41 (finger 43) making up the material transfer device 40 to a position corresponding to an input target transfer position signal while controlling a transfer motor (servomotor 46).

The servomotor 30 is formed of an alternating current (AC) servomotor of which the rotation is controlled by the press (slide) control device 37. The press control device (CNTR) 37 includes a position-speed control section (controller) and a current control section (servo amplifier). The target slide position signal Sh is input to the controller, and a speed-position signal corresponding to a motor rotational angle equivalent signal theta(m) detected by an encoder 30E are fed back to the controller. The motor 30 may be a direct current (DC) servomotor or a reluctance motor.

As shown in FIGS. 1 and 13(A) to 13(D), the material transfer device 40 is a three-dimensional transfer device which causes the fingers 43 held by the feed bars 41 to hold the material 200 in the pre-placed die (lower die 18) (clamp operation (CLP) in Y axis direction), lift the held material in the Z axis direction to an advance operation height (lift operation (LFT)), transfer the held material in the X axis direction to the position above the post-placed die (lower die 18) (advance operation (ADV)), lower the material 200 from the position above the post-placed die to the height of the post-placed die (down operation (DWN)), release the material in the post-placed die (unclamp operation (UCL)), and return the empty fingers 43 (feed bars 41) to the pre-placed die (return operation (RTN)).

The following description is given taking an example of a three-dimensional transfer system which can transfer the material 200 three-dimensionally. Note that the invention may also be applied to a two-dimensional transfer system and carried out in the same manner as in the case of using a three-dimensional transfer system.

In FIG. 2, a computer 60 forming the operation control device includes a CPU (including clock function) 61, a ROM 62, a RAM 63, an HDD 64 an operation section (PNL) 65, a display section (IND) 66, and a plurality of interfaces (I/F) 67A, 67B, 67C, and 69. The computer 60 has a setting function, a selection function, an instruction function, a control function, and the like, and controls the operation of the entire transfer press machine (10,40).

The interface 67A outputs the target slide position signal Sh to the press control device 37, the interface 67B outputs a brake signal Sb to a mechanical brake 29, and a crank angle equivalent signal theta(k) is input to the interface 67C from an encoder 12E.

The interface 69 outputs an advance-return operation instruction signal Sar (advance: Sa, return: Sr) to an advance-return operation transfer control device (controller and servo amplifier) 45AR, and outputs a clamp-unclamp operation instruction signal Scu (clamp: Sc, unclamp: Su) to a clamp-unclamp operation transfer control device 45CU (45C, 45A). The interface 69 outputs a lift-down operation instruction signal Sld (lift: Sl, down: Sd) to a lift-down operation transfer control device 45LD (45C, 45A).

The operation signals Sar (Sa, Sr), Scu (Sc, Su), and Sld (Sl, Sd) also include rotation mode designation information (e.g. acceleration, maximum speed, deceleration, and moving amount) of servomotors 46AR, 46CU, and 46LD. Specifically, a pair of feed bars 41, that is, a plurality of fingers 43 can be moved in each operation direction in a specific amount (distance) according to a trapezoidal trace along with a smooth start by gradually increasing (accelerating) the rotational speed of the servomotor 46, high-speed movement at the maximum speed, and a smooth stop by gradually decreasing (decelerating) the rotational speed.

In one embodiment, the means designated as "(61,64)", such as the press operation control means (61,64) and the transfer operation control means (61,64) which are operated in real space, the synchronization timing information generation-output means (61,64), the virtual press operation control means (61,64), the virtual transfer operation control means (61,64), the first virtual interference confirmation target extraction means (61,64), the data-conversion constituent element switch control means (61,64), and the virtual interference determination means (61,64), are formed by the HDD 64 which stores respective control programs and the CPU 61 having a program execution function. The program and the like are loaded into the RAM 63 and executed. Specifically, the constituent elements are mainly formed by means of software. Note that the constituent elements may be formed by means of hardware such as a logic circuit.

Figure 7:
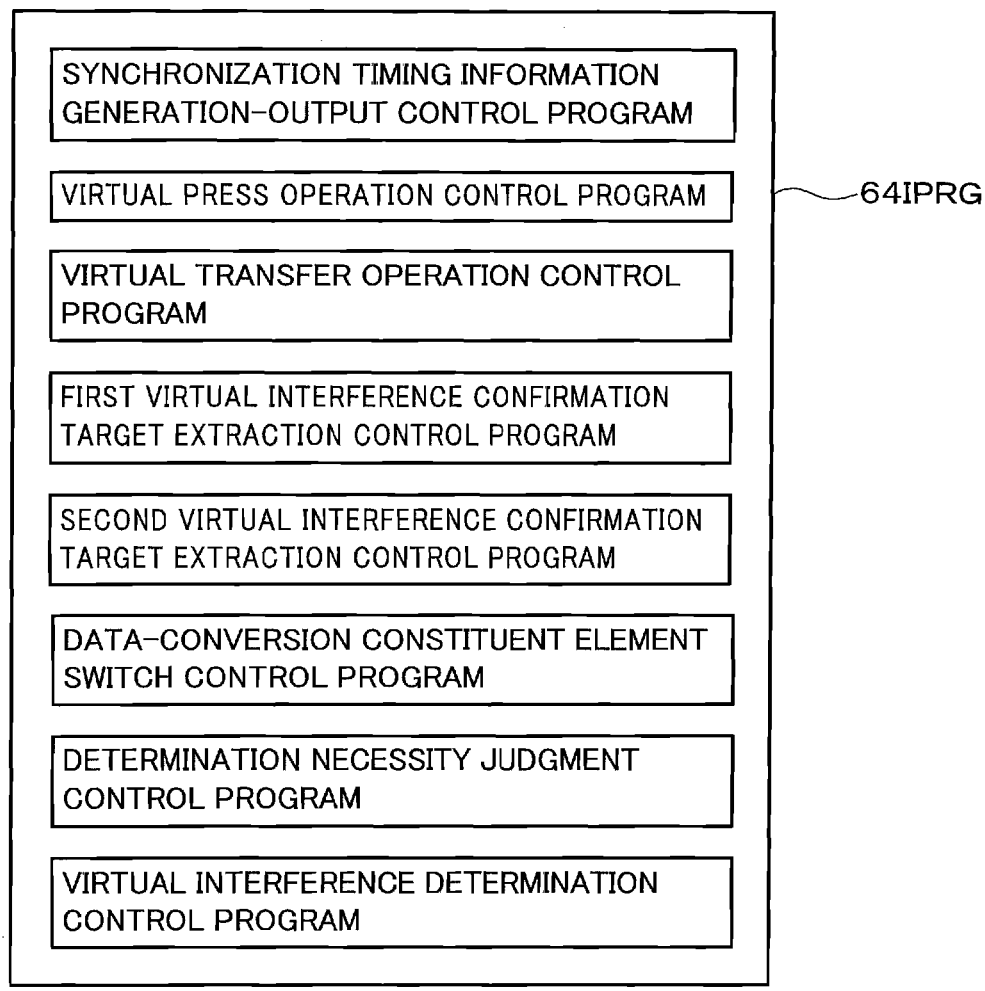
FIG. 7 is a diagram illustrative of virtual control program storage means.

Each control program characteristic of the invention is stored in virtual control program storage means 64IPRG shown in FIG. 7, and items (e.g. information of BIOS, fixed value, and the like) common to each control program are stored in the ROM 62. This also applies to second virtual interference confirmation target extraction means (61,64) and the like in a second embodiment described later.

The whole or part of each control program of each means may be stored in the ROM 62, an FRAM, or the like instead of the HDD 64, or may be downloaded from the outside through a data communication line, or may be installed using a medium.

Figure 3:
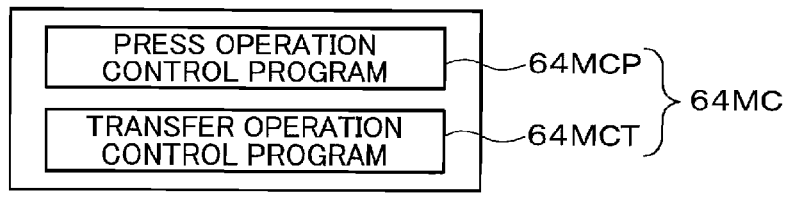
FIG. 3 is a diagram illustrative of actual control program storage means.
Figure 4:
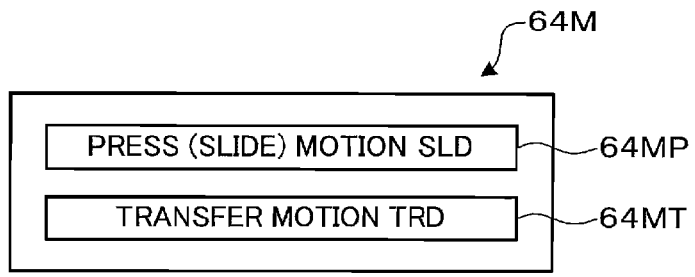
FIG. 4 is a diagram illustrative of motion storage means.

In regard to drive control of the press machine 10 in real space, the press operation control means (61,64) generates and outputs the target slide position signal Sh to the press control device 37 according to an actual press operation control program stored in actual control program storage means 64MC (area 64MCP) shown in FIGS. 2 and 3 and a press motion SLD shown in FIG. 1 stored in motion storage means 64M (area 64MP) shown in FIG. 4. The vertical axis of the press (slide) motion SLD indicates the position (height) of the slide 15 (upper die 16), and the horizontal axis indicates the cycle (time). The crank angle may also be used.

A speed signal is input to the servo amplifier (not shown) making up the press control device 37 from the controller, and a speed signal corresponding to a change in the motor rotational angle equivalent signal theta(m) is fed back to the servo amplifier. The servo amplifier outputs a motor drive current signal (torque equivalent signal) Si. The slide 15 (upper die 16) can be accurately positioned in the vertical direction at a position corresponding to the target slide position signal Hpr (Sh) by the above rotation control (torque control) of the servomotor 30.

The press operation control means (61,64) has a position pulse output type structure. The servomotor 30 and the crankshaft 12 are directly connected. When the set motor rotational speed is 120 rpm, the number of pulses output from the encoder 30E per rotation (360 degrees) is 1,000,000, and the output cycle time is 5 ms, the target slide position signal Sh (number of pulses output in cycle (5 ms) units) is 10000 pulses (=(1000000×120/60)×0.005).

The encoder 12E attached to the crank mechanism (crankshaft 12) outputs the rotational angle equivalent signal theta (k) of the crankshaft 12. A position H of the slide 15 in the vertical direction can be known by converting the signal theta (k). In this embodiment, a slide position Hi is displayed on a display section 66.

The material transfer device 40 has a three-dimensional transfer structure, is formed of a transfer mechanism including a pair of feed bars 41 (one of the feed bars 41 is omitted in FIG. 1), three servomotors 46 corresponding to the three axes perpendicular to one another (advance-return servomotor 46AR, clamp-unclamp servomotor 46CU, and lift-down servomotor 46LD), and corresponding transfer control devices 45AR, 45CU, and 45LD, and can perform the transfer operation by rotation control of the servomotors 46AR, 46CU, and 46LD.

Each of the transfer control devices 45AR, 45CU, and 45LD is formed of a controller (CNTR) and a servo amplifier in the same manner as the press control device 37, and obtains a feedback signal (motor rotational angle equivalent signals theta(mar), theta(mcu), and theta(mld)) from encoders 47AR, 47CU, and 47LD. Siar, Sicu, and Sild indicate motor drive current (torque equivalent) signals.

The transfer operation control means (CPU 61, HDD 64) which operates in real space generates and outputs the target transfer position signals (Sar, Scu, Sld) shown in FIG. 2 to the transfer control devices 45AR, 45LD, and 45CU according to an actual transfer operation control program stored in the actual control program storage means 64MC (area 64MCT) shown in FIG. 3 and a transfer motion TLD (Rar, Rcu, Rld) shown in FIG. 1 stored in the motion storage means 64M (area 64MT) shown in FIG. 4. The vertical axis of the transfer motion TLD indicates the position of the finger 43, and the horizontal axis indicates the cycle (time). The crank angle may also be used.

The slide motion (SLD) to be stored in the press motion storage means 64M (64MP) shown in FIG. 4 can be set and input using slide motion setting input means (operation section 65), and the transfer motion (TRD) to be stored in the transfer motion storage means 64M (64MT) can be set and input using transfer motion setting input means (operation section 65). Note that these motions are utilized as the basis for the virtual transfer press cycle of each data-conversion constituent element (e.g. data-conversion upper die) when determining the presence or absence of virtual interference in virtual space.

Figure 6:
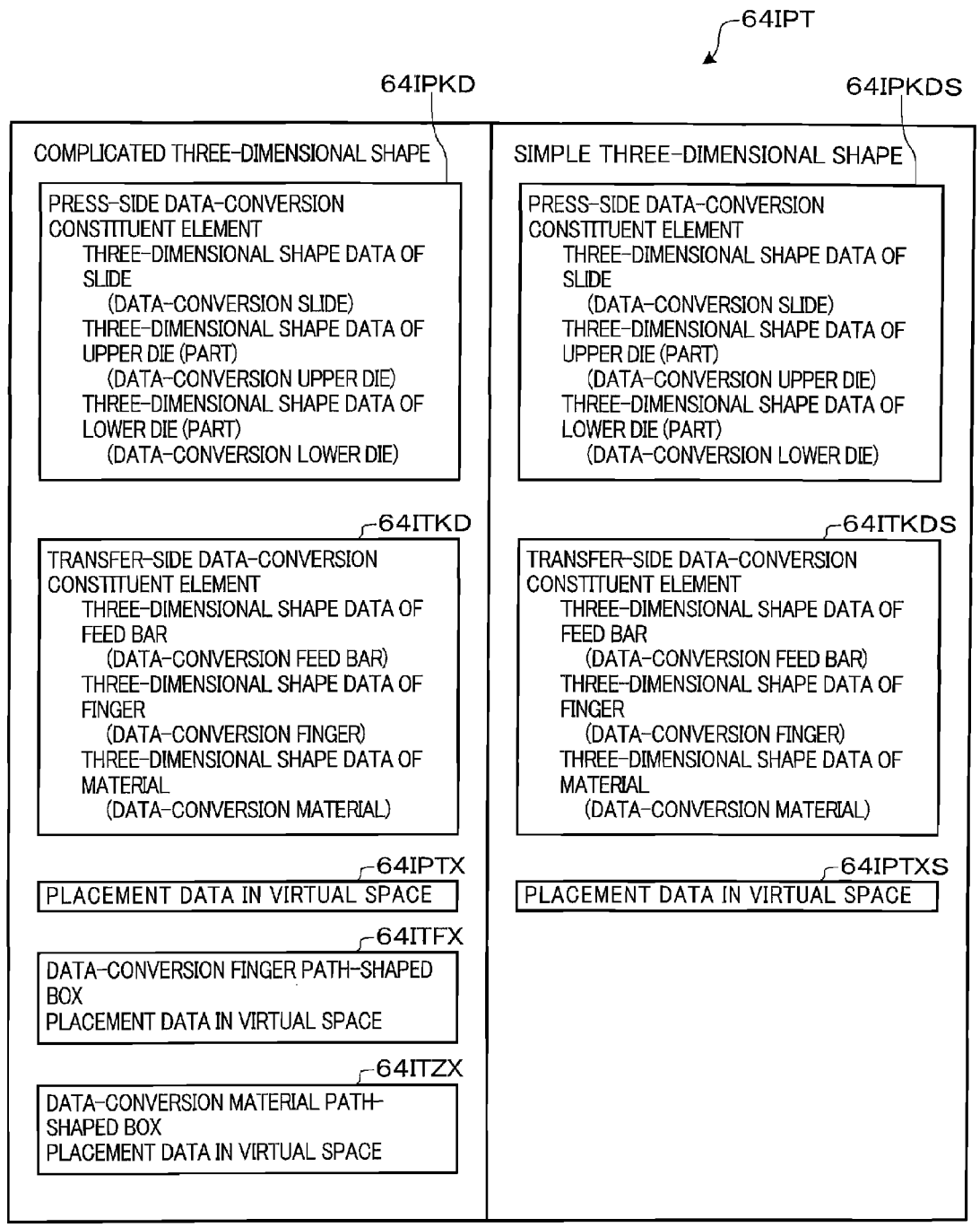
FIG. 6 is a diagram illustrative of data-conversion constituent element storage means.

The data-conversion constituent element storage means 64IPT shown in FIG. 6 stores press-side data-conversion constituent elements and transfer-side data-conversion constituent elements in a state in which the constituent elements are placed in virtual space to have the same relative position relationship as in real space.

The term "press-side data-conversion constituent element" refers to a press-side constituent element (e.g. slide 15 and upper die 16) which is converted into three-dimensional shape data (e.g. 15D and 16D). In this embodiment, the three-dimensional shapes include a complicated three-dimensional shape (system) shown on the left side of FIG. 6 and a simple three-dimensional shape (system) shown on the right side of FIG. 6. The complicated three-dimensional shape data-conversion constituent element is obtained by converting the actual three-dimensional shape of the press-side constituent element into data.

This conversion into data is performed by three-dimensional shape data conversion control means. Specifically, the three-dimensional shape data conversion control means (61,64) converts the data-conversion target (actual object) specified by referring to data-conversion target storage means 64PT shown in FIG. 5 (ST (step) 01 in FIG. 9) into three-dimensional shape data (ST04). The data-conversion target is specified from information (e.g. data of the upper die 16 or each upper die part 16BD such as the name and dimensions) displayed (ST02) on the display section 66 by key operation or touch operation of the operation section 65 (ST03). The data-conversion target may be scaled down when converting the data-conversion target into data.

The constituent element converted into data (e.g. 16D ... three-dimensional CAD data) is stored in the data-conversion constituent element storage means 64IPT (area 64IPKD) shown in FIG. 6 by the function of data-conversion constituent element storage control means (61,64) (ST06). The data-conversion constituent element is stored in a placement state in cooperation with placement control means (61,64).

Figure 5:
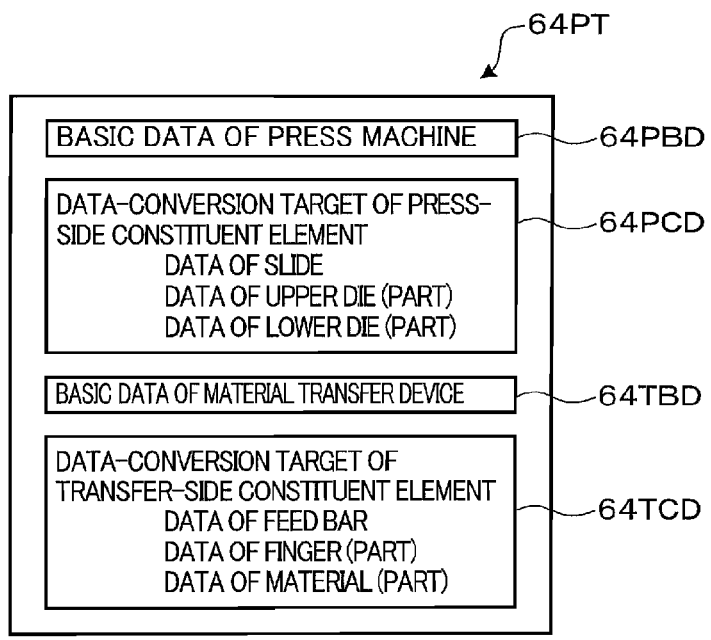
FIG. 5 is a diagram illustrative of data-conversion target storage means.

Specifically, the placement control means (61,64) places the press-side data-conversion constituent element (e.g. data-conversion upper die 16D) converted into three-dimensional shape data while referring to basic data (e.g. layout information) of the press machine 10 which is input using layout setting input means (operation section 65) and stored in the data-conversion target storage means 64PT (area 64PBD) shown in FIG. 5 (ST05). The layout information is "position information with respect to the center of the press main body in the width direction, the depth direction, and the height direction". In this embodiment, placement data storage control means (61,64) operates to store the data-conversion constituent element in the data-conversion constituent element storage means 64IPT (area 64IPTX) shown in FIG. 6 as "placement data in virtual space" (ST06).

Likewise, the transfer-side data-conversion constituent element is subjected to three-dimensional shape data conversion and placement (ST03 to ST06), and the processing is finished after all necessary constituent elements have been processed (YES in ST07). The data-conversion constituent element (e.g. data-conversion finger 43D) is stored in the data-conversion constituent element storage means 64IPT (area 64ITKD) shown in FIG. 6. The "placement data in virtual space" is stored in the area 64IPTX shown in FIG. 6 in the same manner as the press-side data-conversion constituent element (e.g. 16D) (ST05). Specifically, the relative positional relationship between the transfer-side data-conversion constituent element (e.g. data-conversion upper die 16D) and the transfer-side data-conversion constituent element (e.g. data-conversion finger 43D) in virtual space becomes the same as the relative positional relationship in real space by three-dimensional CG.

Figure 9:
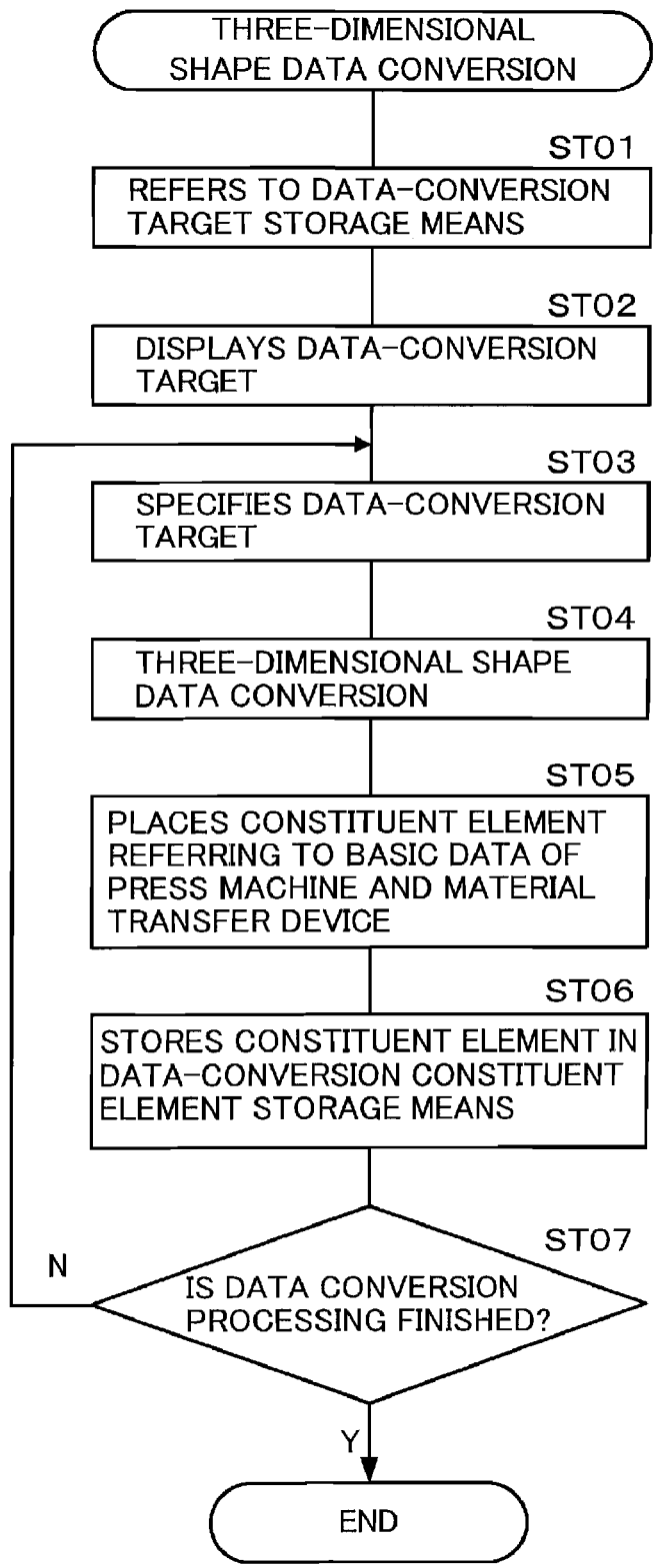
FIG. 9 is a flowchart illustrative of three-dimensional shape data conversion control operation.

A complicated three-dimensional shape system has been described above (FIGS. 5, 6, and 9). Note that a simple three-dimensional shape system is also subjected to three-dimensional shape data conversion and placement in the same manner as described above, and stored in areas 64IPKDS, 64ITKDS, and 64IPTXS shown on the right side in FIG. 6 (FIGS. 5, 6, and 9). Note that the simple three-dimensional shape involves the complicated three-dimensional shape. The details of the simple three-dimensional shape are described later.

The above series of operations may be carried out while confirming the data-conversion target (e.g. upper die 16 and upper die part 16B) and the basic data (e.g. layout information) displayed on the display section 66 with the naked eye. The completed press-side data-conversion constituent element (e.g. 16BD) and transfer-side data-conversion constituent element (e.g. 43BD) and the placement state thereof in virtual space may also be confirmed with the naked eye.

The respective data-conversion constituent elements and placement data may be created in another location and stored in the data-conversion constituent element storage means 64IPT (64IPTX) through a communication line or using a medium.

The virtual press operation control means (61,64) is means for causing the press-side data-conversion constituent elements (data-conversion slide 15D ... data-conversion upper die 16D and data-conversion upper die part 16BD) placed in the data-conversion constituent element storage means 64IPT (64IPKD and 64IPTX (or 64IPKDS and 64IPTXS)) shown in FIG. 6 to perform a virtual press operation in virtual space according to the press motion SLD stored in the press motion storage means 64M (area 64MP) shown in FIG. 4. Note that the press motion control means (61,64) which operates in real space outputs the pulse signal (Sh) in specific time units for feedback control, and it suffices that the virtual press operation control means (61,64) acquire the stored press (slide) motion as traces (SLD) and follow the traces (SLD). Specifically, it suffices that the virtual press operation control means (61,64) move the data-conversion upper die 16D (data-conversion upper die part 16BD) up and down together with the data-conversion slide 15D in specific cycle (time) units.

The virtual transfer operation control means (61,64) is means for causing the transfer-side data-conversion constituent elements (data-conversion feed bar 41D ... data-conversion finger 43D and data-conversion finger part 43BD) placed in the data-conversion constituent element storage means 64IPT (64ITKD and 64IPTX (or 64ITKDS and 64IPTXS)) shown in FIG. 6 to perform a virtual transfer operation in virtual space according to the transfer motion TRD stored in the transfer motion storage means 64M (area 64MT) shown in FIG. 4.

In this case, while the transfer motion control means (61, 64) which operates in real space outputs the pulse signal (Sar, Scu, Sld) in specific time units for feedback control, it suffices that the virtual transfer operation control means (61,64) acquire the stored transfer motion as traces (TRD) and follow the traces (TRD). Specifically, it suffices that the virtual transfer operation control means (61,64) move the data-conversion finger 43D (data-conversion finger part 43BD) up and down together with the feed bar 41D along the traces (TRD .... Rar, Rcu, Rld) in specific cycle (time) units.

Figure 10:
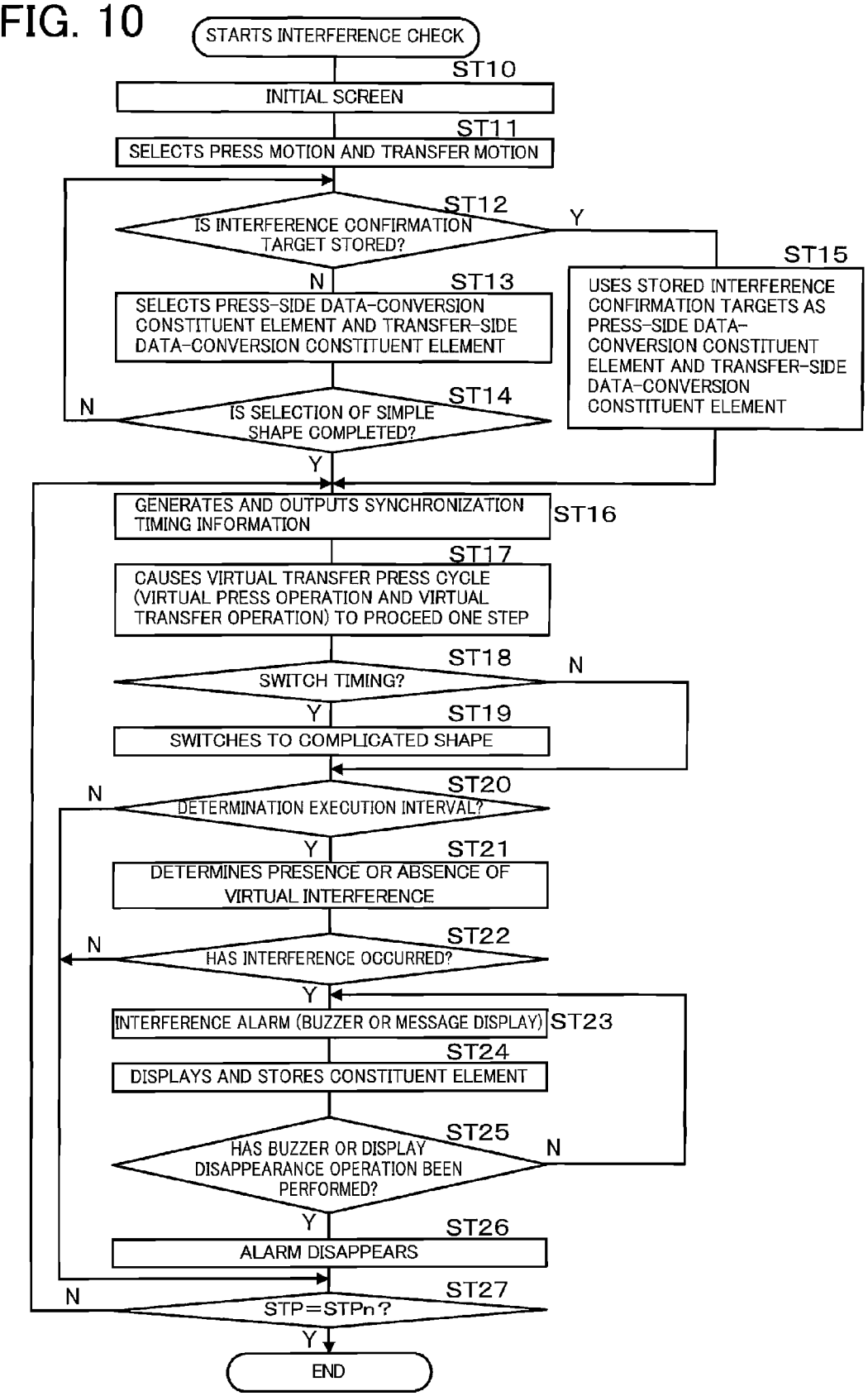
FIG. 10 is a flowchart illustrative of virtual interference check control operation.
Figure 11:
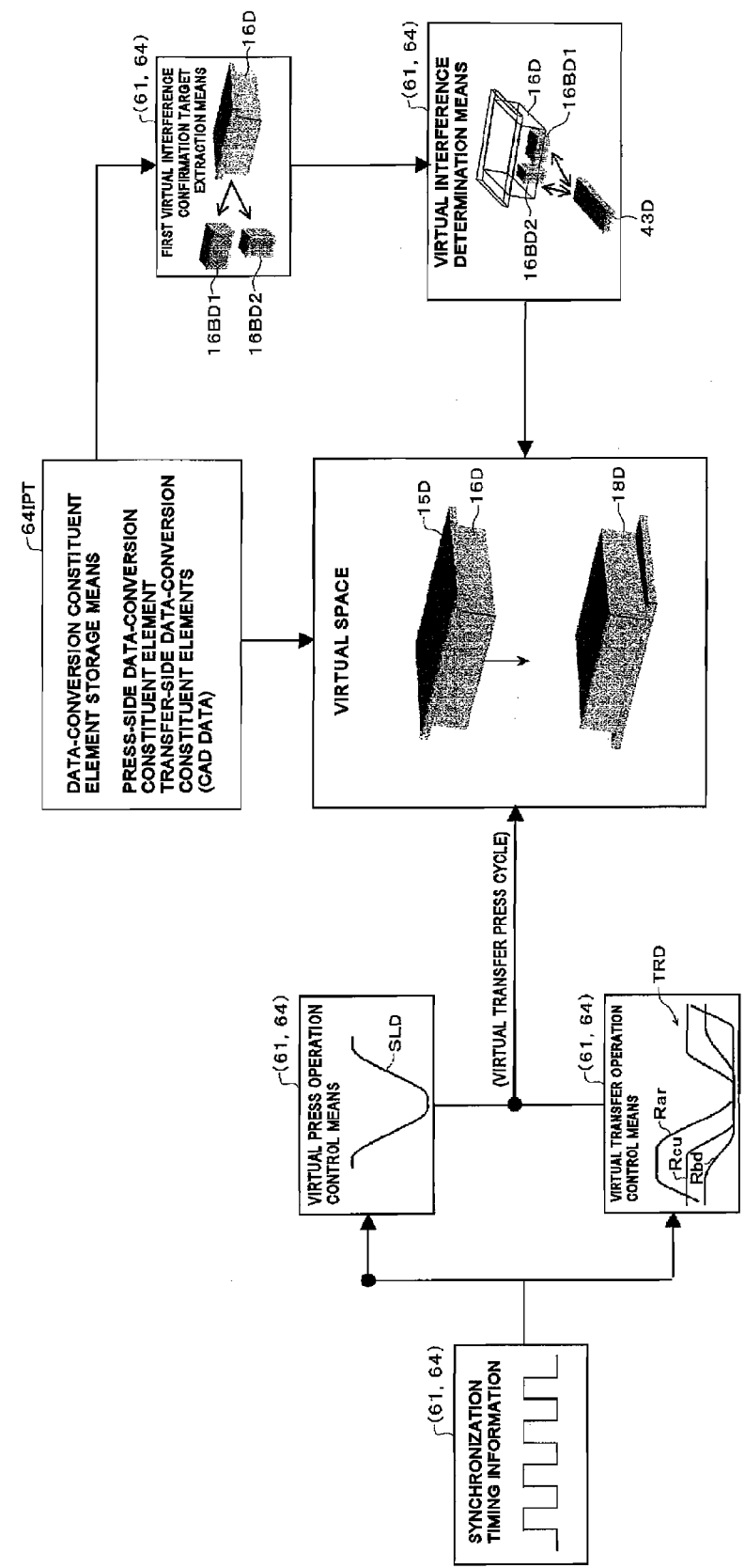
FIG. 11 is a block diagram illustrative of a virtual transfer press cycle.

The virtual synchronization timing information generation-output means (61,64) generates and outputs virtual synchronization timing information for synchronizing the virtual press operation of the virtual press operation control means (61,64) and the virtual transfer operation of the virtual transfer operation control means (61,64) as shown in FIG. 11 (ST16 in FIG. 10). The progress of these operations in synchronization is the progress (execution) of the virtual transfer press cycle, as shown in FIG. 1. In this embodiment, the virtual synchronization timing signal is generated and output utilizing a reference clock signal transmitted from a clock circuit (not shown) in the CPU 61.

The virtual interference determination means (61,64) is means for determining whether or not interference occurs between the press-side data-conversion constituent element (data-conversion upper die 16D) and the transfer-side data-conversion constituent element (43D) converted into three-dimensional shape data during the virtual transfer press cycle (SLD, TRD) (see ST21 and ST22 in FIG. 10 and FIG. 11 which is a schematic diagram).

In FIG. 11, the virtual interference determination means (61,64) is illustrated on the right side for convenience of illustration. Note that the virtual interference determination means (61,64) operates in virtual space illustrated on the left side. This also applies to first virtual interference confirmation target extraction means (61,64) on the right side.

The presence or absence of interference in virtual space is determined by a sequential correspondence check method using three-dimensional CAD data (press-side data-conversion constituent element and transfer-side data-conversion constituent element). The number of corresponding points between one press-side data-conversion constituent element (e.g. data-conversion upper die part 16BD) and each transfer-side data-conversion constituent element is 500, for example. The number of corresponding points is 3000 taking each press-side data-conversion constituent element (data-conversion lower die part 18BD) into consideration. This also applies to the correspondence between one transfer-side data-conversion constituent element (e.g. data-conversion finger 43D) and each press-side data-conversion constituent element. Specifically, the processing load and the processing time are considerably increased in order to check all of these points (e.g. several tens of thousands points) in units of the progress (e.g. stepping at intervals of 1 msec) of the transfer press cycle. However, it is generally impossible to provide a large-capacity and high-speed computer which satisfies such a requirement in the transfer press machine (10,40).

Therefore, various measures are provided in order to reduce the determination processing load and increase the processing speed. Specifically, the interference check correspondence data-conversion constituent element can be selected. That is, the first virtual interference confirmation target extraction means (61,64) is provided for extracting the data-conversion constituent element which likely undergoes interference in virtual space as the virtual interference confirmation target.

The first virtual interference confirmation target extraction means (61,64) is means for detecting interference between the data-conversion upper die 16D and the data-conversion finger path-shaped box 43DBX placed in virtual space when virtually moving the data-conversion upper die 16D (data-conversion slide 15D) down to the virtual bottom dead center in virtual space (ST1507 in FIG. 12), and extracting the detected data-conversion upper die 16D as the virtual interference confirmation target (YES in ST1508 and ST1509).

The details of the first virtual interference confirmation target extraction means (61,64) are described below with reference to FIGS. 12 and 13(A) to 13(D). First finger path-shaped box generation-placement control means (61,64) making up the first virtual interference confirmation target extraction means (61,64) is formed to generate the data-conversion finger path-shaped box 43DBX based on data-conversion finger traces when causing a pair of right and left data-conversion fingers 43D shown in FIG. 13(A) to perform a virtual one-dimensional transfer operation (ST1503) in virtual space in the order of CLP→LFT→ADV→DWN→UCL→RTN (ST1504 and ST1505) and place the data-conversion finger path-shaped box 43DBX in virtual space (ST1506).

Figures 13A, 13B:
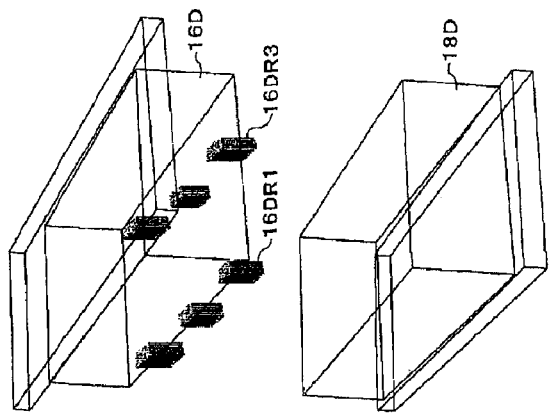

The generated data-conversion finger path-shaped box 43DBX is made up of a right and left pair (43DBXL and 43DBXR) shown in FIG. 13(B), and is stored in the data-conversion constituent element storage means 64IPT (area 64ITFX) shown in FIG. 6 together with the placement data in virtual space. The data-conversion finger path-shaped box 43DBX (43DBXL and 43DBXR) is independently illustrated in FIG. 13(B) for convenience of description. Note that the data-conversion finger path-shaped box 43DBX is disposed between the data-conversion upper die 16D and the data-conversion lower die 18D shown in FIG. 13(C) during preliminary virtual interference detection.

Figures 13C, 13D:
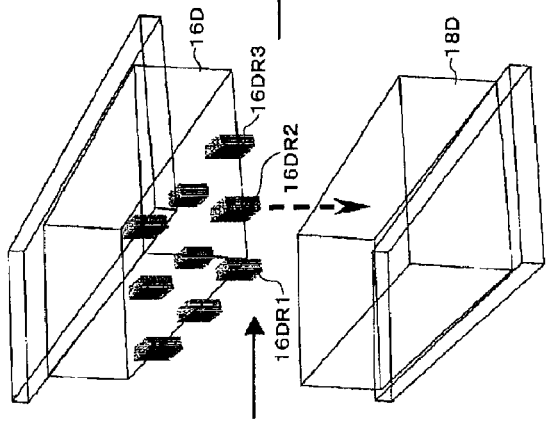

Specifically, the maximum movement space (43DBX) when causing the data-conversion finger 43D to perform a virtual transfer operation is virtually disposed before determination of the presence or absence of virtual interference performed during the virtual transfer press cycle, and a part (data-conversion upper die part 16BD) which enters the maximum movement space (43DBX) when causing the data-conversion upper die 16D (data-conversion slide 15D) to perform the virtual press operation (move down) indicated by the dotted arrow in FIG. 13(C) is extracted as a part (data-conversion upper die part 16BD) which likely interferes during determination of the presence or absence of virtual interference (ST1508) performed during the virtual transfer press cycle (ST1509).

In more detail, as shown in FIG. 13(C), when the data-conversion upper die 16D has downward three-row upper die parts 16BDR1 (three columns), 16BDR2 (three columns), and 16BDR3 (three columns) and the entire data-conversion upper die 16D is moved down to touch the data-conversion lower die 18D, the upper die parts 16BDR1 (three columns) and 16BDR3 (three columns) on the left and right touch (interfere with) the data-conversion finger path-shaped box 43DBX (43DBXL and 43DBXR) disposed between the data-conversion upper die 16D and the data-conversion lower die 18D. On the other hand, since the upper die parts 16BDR2 (three columns) in the middle enter a space SP shown in FIG. 13(B) between the data-conversion finger path-shaped boxes 43DBXL and 43DBXR, the upper die parts 16BDR2 do not interfere with the data-conversion finger path-shaped box 43DBX.

Therefore, the upper die parts 16BDR1 (three columns) and 16BDR3 (three columns) on the left and right are extracted, as shown in FIG. 13(D). The upper die parts 16BDR2 in the middle are not extracted. FIG. 1 shows the case where the upper die parts 16BD1 and 16BD2 are extracted, differing from the case shown in FIG. 13(D).

It is extremely advantageous to determine the presence or absence of virtual interference for the extracted parts (data-conversion upper die parts 16BDR1 and 16BDR3) in order to significantly reduce the processing load of determination of the presence or absence of virtual interference and increase the processing speed. In the above case, the processing load ($\frac{3}{3}$) of determination of the presence or absence of virtual interference in virtual space can be reduced to $\frac{2}{3}$.

The data-conversion upper die 16D (upper die part 16BD) and the data-conversion finger 43D are selected referring to the data-conversion constituent element storage means 64IPT (64IPKD, 64ITKD, 64IPTX) shown in FIG. 6 (ST1501 and ST1502). The extracted data-conversion upper die parts 16BDR1 and 16BDR3 and the data-conversion finger 43D are temporarily stored in the work area of the RAM 63 as the press-side data-conversion constituent elements and the transfer-side data-conversion constituent element, respectively (ST1510).

Figure 12:
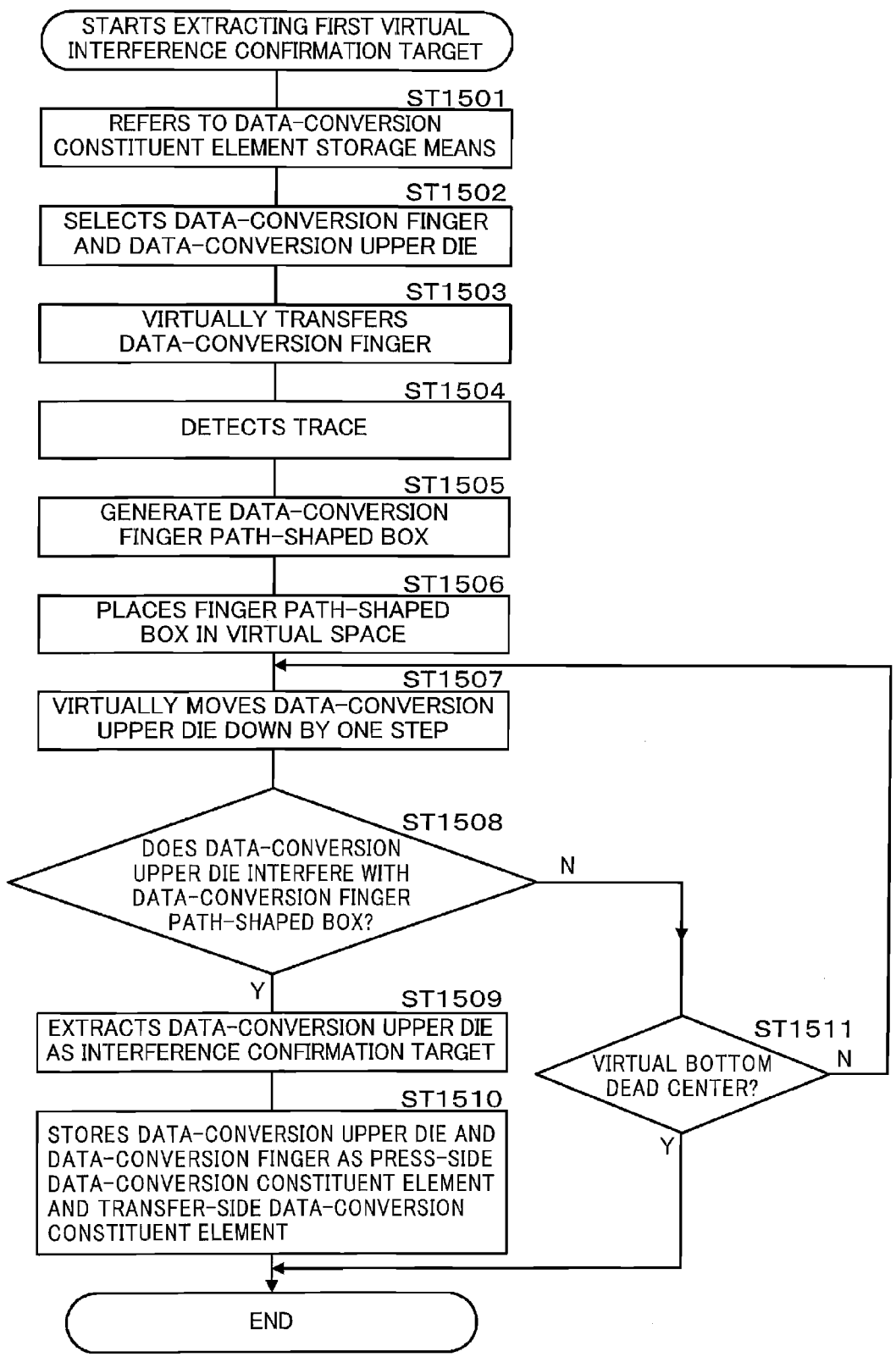
FIG. 12 is a flowchart illustrative of first virtual interference confirmation target extraction operation.

In FIG. 12, even if the data-conversion upper die 16D (data-conversion slide 15D) does not reach the virtual bottom dead center (NO in ST1511), the processing is finished (END) after performing the processing in the steps ST1509 and ST1510 when interference has been detected (ST1508). Note that the operations (ST1507 to 1509) may be repeatedly performed until the data-conversion upper die 16D reaches the virtual bottom dead center. This allows an interference check of the same or different upper die part 16BD and/or data-conversion finger 43D (or data-conversion finger part 43BD) to be performed a number of times. This is because problems such as a device failure do not occur since the interference occurs in virtual space.

The virtual interference determination means (61,64) determines the presence or absence of virtual interference using the data-conversion upper die 16D (a plurality of data-conversion upper die parts 16BDR1 and 16BDR3) extracted by the first virtual interference confirmation target extraction means (61,64) (ST1509 in FIG. 12) as the press-side data-conversion constituent element and the data-conversion finger 43D (may be the data-conversion finger part 43BD) as the transfer-side data-conversion constituent element (ST21 and ST22 in FIG. 10).

Since the die (upper die 16 and lower die 18) and the finger 43 are generally formed by combining a number of parts, a significant increase in speed and facilitation of handling can also be achieved in this respect in comparison with the previously proposed press machine in which it is necessary to determine and set (input) the interference check target parts each time the die is replaced with another die. Specifically, the work at the site (real space) becomes difficult and requires a longer period of time as the die, the finger, and the material have a more complicated three-dimensional shape having a protrusion, a depression, a spherical portion, or the like, and the number of parts is increased.

In this embodiment, the following measures are taken in order to further facilitate handling and further increase the processing speed in the actual operation.

Specifically, the simple three-dimensional shape data-conversion constituent element created to involve the actual three-dimensional shape is selectably stored for each of the press-side data-conversion constituent elements and the transfer-side data-conversion constituent elements in each of the areas 64IPKD, 64ITKD, and 64IPT of the data-conversion constituent element storage means 64IPT shown in FIG. 6 in addition to the complicated three-dimensional shape data-conversion constituent element obtained by converting the actual three-dimensional shape into data.

Therefore, data-conversion constituent element switch control means (61,64) is provided so that the data-conversion constituent element can be switched from the simple three-dimensional shape data-conversion constituent element to the complicated three-dimensional shape data-conversion constituent element (YES in ST18 and ST19 in FIG. 10) at a specific timing during the virtual transfer press cycle.

The term "simple three-dimensional shape data-conversion constituent element" refers to a constituent element which has a size (dimensions) capable of surrounding the maximum dimension of the actual three-dimensional shape (e.g. upper die 16) in each axis (X, Y, Z) direction and is converted into three-dimensional shape data. In more detail, a simple shape (e.g. cubic shape or square prism shape having six interference check target portion surfaces) is formed to involve the complicated three-dimensional shape data-conversion constituent element corresponding to the actual three-dimensional shape (e.g. shape having 1000 interference check target portion surfaces). This significantly reduces the number of correspondence check portions, whereby simplification and an increase in speed of processing can be expected.

The virtual interference determination means (61,64) determines the presence or absence of virtual interference using the simple three-dimensional shape data-conversion constituent element as at least one of the data-conversion constituent elements before switching (NO in ST18 in FIG. 10) (ST21), and determines the presence or absence of virtual interference using the complicated three-dimensional shape data-conversion constituent elements as both of the data-conversion constituent elements after switching (YES in ST18). Therefore, the preliminary interference check time until the complicated three-dimensional shape data-conversion constituent elements approach (or contact) can be reduced to a large extent. Specifically, the processing load can be significantly reduced and the processing speed can be further increased before switching, thereby ensuring efficient operation.

The above switch timing may be input or changed using switch timing input means (operation section 65). The switch timing is preferably immediately before the press-side data-conversion constituent element which likely interferes comes in contact with the transfer-side data-conversion constituent element. For example, the switch timing may be set as the distance between the data-conversion upper die part 16BD (bottom surface of the data-conversion slide 15D) and the data-conversion finger part 43BD (or the top surface of the data-conversion bolster 19D). Since interference in virtual space does not cause an actual problem, when enabling determination of the presence or absence of virtual interference until the data-conversion upper die 16D (data-conversion slide 15D) reaches the virtual bottom dead center, the time at which the presence of interference is determined for the first time (immediately after determination) may be automatically detected and set as the switch timing.

Interval setting means (operation section 65) may be provided so that a determination necessary interval (e.g. clamp operation interval and unclamp operation interval) requiring determination of the presence or absence of virtual interference may be set during the virtual transfer press cycle (synchronized press operation and transfer operation). Note that a determination unnecessary interval (e.g. interval other than the clamp operation interval and the unclamp operation interval) may be set which does not require determination of the presence or absence of virtual interference.

The virtual interference determination means (61,64) may determine the presence or absence of virtual interference (ST20) in the determination necessary interval during the virtual transfer press cycle (YES in ST20 in FIG. 10). Specifically, load can be reduced by narrowing the interference check necessary interval, and the time required for all the check steps can be reduced. Moreover, the processing load of the computer 60 can be reduced.

Moreover, subdivision setting means (operation section 65) is provided so that a determination execution interval generated by subdividing the set determination necessary interval can be set. Such an interval may not be manually set, and may be automatically assigned when placing the three-dimensional data in virtual space, for example.

In this case, the virtual interference determination means (61,64) may determine the presence or absence of virtual interference only in the determination execution interval (YES in ST20 in FIG. 10). For example, in the case where the clamp operation CLP in which the data-conversion finger 43D advances toward the data-conversion lower die 18D and the unclamp operation UCL in which the data-conversion finger 43D moves away from the data-conversion lower die 18D are set as the determination necessary intervals, an interval in which interference is not checked is set when the distance between the data-conversion finger 43D and the data-conversion lower die 18D is large since interference obviously does not occur. Specifically, more efficient operation can be performed in comparison with the case of checking interference over the entire interval. Load and time required for all the check steps can be further reduced in comparison with the case of setting only the necessary interval. Note that a determination nonexecution interval may be set.

Moreover, determination target transfer operation setting means (operation section 65) is provided so that the effect that the presence or absence of interference is determined during the virtual transfer press cycle in units of one-dimensional virtual transfer operations forming the virtual transfer operation can be set. Note that the effect that the presence or absence of interference is not determined may be set. In this case, the virtual interference determination means (61,64) may determine the presence or absence of virtual interference during the one-dimensional virtual transfer operation in which the effect that the presence or absence of interference is determined is set (YES in ST20 in FIG. 10).

Specifically, since execution or nonexecution of determination of data-conversion finger interference or data-conversion material interference can be selectively set for individual data-conversion fingers 43D and data-conversion materials 200D regarding each one-dimensional virtual transfer operation (CLP, UCL, ADV, RTN, LFT, DUN), a selective interference check can be performed. The interference check can be omitted when interference obviously does not occur or for a transfer operation for which interference check is considered to be unnecessary.

Figure 8:
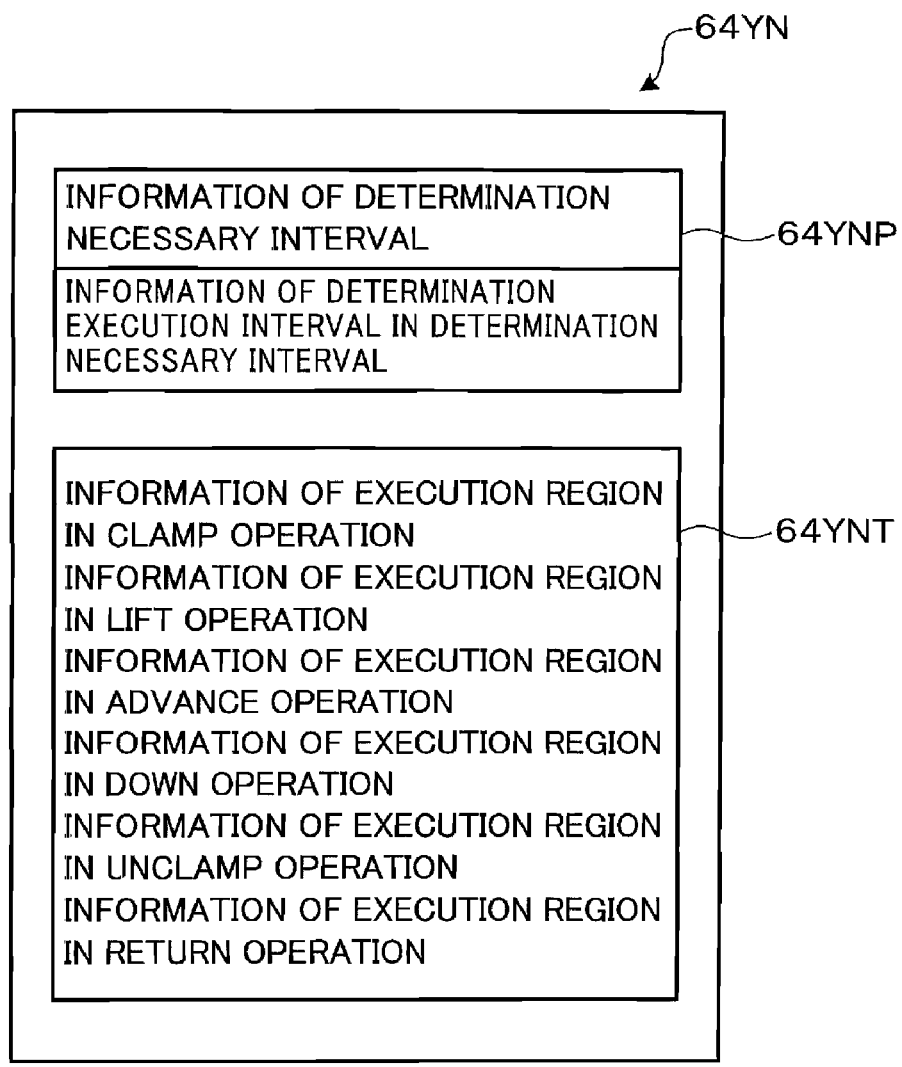
FIG. 8 is a diagram illustrative of determination execution judgment information storage means.

The information of the determination necessary interval and the information of the determination execution interval in the determination necessary interval are stored in an area 64YNP of determination necessity judgment information storage means 64YN shown in FIG. 8. The information of the execution area in each one-dimensional virtual transfer operation is stored in an area 64YNT. The necessity is determined by determination necessity judgment control means (61,64) (ST20 in FIG. 10).

Moreover, three-dimensional shape data-conversion constituent element display control means (61,64) is provided so that the press-side data-conversion constituent element and the transfer-side data-conversion constituent element stored in the data-conversion constituent element storage means 64IPT shown in FIG. 6 can be displayed on the display section 66 in a state in which the constituent elements are placed in virtual space. The constituent elements are displayed so that the constituent elements can be observed with the naked eye in a state shown in FIG. 13(C) even during operation in virtual space.

In the transfer press machine (10,40) according to the first embodiment, when an interference check is requested by key operation of the operation section 65, the interference check device checks (determines) the presence or absence of virtual interference in virtual space according to the procedure shown in FIG. 10.

Specifically, an initial screen is displayed on the display section 66 (ST10). A plurality of slide motions (SLD) set using the slide motion setting input means (operation section 65) and stored in the press motion storage means 64M (64MP) shown in FIG. 4 and a plurality of transfer motions (TRD) set using the transfer motion setting input means (operation section 65) and stored in the transfer motion storage means 64M (64MT) are also displayed.

The operator selects the press motion and the transfer motion referring to the displayed information (ST11). In this case, the slide motion (SLD) and the transfer motion (TRD) shown in FIG. 1 or 11 are selected. Since each motion can be selected by specifying the motion number or the like while confirming the input and stored motion with the naked eye, handling is facilitated. In this stage, each motion (SLD and TRD) may be set (input) while creating each motion.

Virtual interference target storage confirmation means (61, 64) confirms whether or not the virtual interference target is stored in the work area of the RAM 63 (ST12). When the virtual interference target (e.g. data-conversion upper die 16D and data-conversion finger 43D) has been extracted (ST1501 to ST1509 in FIG. 12) using the first virtual interference confirmation target extraction means (61,64) and stored (ST1510) in the memory (RAM 63) (YES in ST12 in FIG. 10), it is determined that selection of the press-side data-conversion constituent element (16D) and the transfer-side data-conversion constituent element (43D) has been completed (ST15 and YES in ST14).

When the virtual interference target is not stored in the memory (63) (NO in ST12), the press-side data-conversion constituent element and the transfer-side data-conversion constituent element stored in the data-conversion constituent element storage means 64IPT shown in FIG. 6 are selected (ST13). The placement data in virtual space concerning each data-conversion constituent element is automatically and incidentally selected on condition that each data-conversion constituent element has been selected.

A simple three-dimensional shape is selected for each data-conversion constituent element in automatic and manual selection (ST13 and ST15). In this embodiment, when a simple three-dimensional shape is selected for one of the press-side data-conversion constituent element (e.g. 16D) and the transfer-side data-conversion constituent element (e.g. 43D), a complicated three-dimensional shape may be selected for the other. Specifically, a preliminary interference check is performed using a simple three-dimensional shape for only one of the press-side data-conversion constituent element and the transfer-side data-conversion constituent element, and the presence or absence of virtual interference is determined using the complicated three-dimensional shapes when it is determined that interference has occurred or in the previous setting state.

Specifically, the data-conversion upper die part 16BD with a complicated three-dimensional shape (or a simple three-dimensional shape) and the data-conversion finger parts 43BD with a simple three-dimensional shape (or a complicated three-dimensional shape) or the data-conversion upper die part 16BD and the data-conversion finger parts 43BD with a complicated three-dimensional shape are selected. Since the selection operation is performed while confirming the display with the naked eye, handling is easy.

The data-conversion upper die (data-conversion upper die part), the data-conversion lower die (data-conversion lower die part), or the like is selected as the press-side data configuration element, and the data-conversion finger (data-conversion finger part) and the data-conversion material (data-conversion material portion) are selected as the transfer-side data-conversion constituent elements.

When the virtual synchronization timing information is generated and output from the virtual synchronization timing information generation-output means (61,64) (ST16), a virtual press operation of the virtual press operation control means (61,64) and a virtual transfer operation of the virtual transfer operation control means (61,64) progress in synchronization. Specifically, the virtual transfer press cycle progresses. The virtual synchronization timing information generation-output control program, the virtual press operation control program, and the virtual transfer operation control program are read from the virtual control program storage means 64IPRG (64) shown in FIG. 7, loaded into the RAM 63, and utilized.

Specifically, one step (unit cycle time) of the virtual transfer press cycle progresses, as shown in FIGS. 1 and 11 (ST17). For example, the data-conversion upper die 16D (data-conversion upper die parts 16BDR1, 16BDR2, and 16BDR3) shown in FIG. 13(C) is moved down together with the data-conversion slide 15D (not shown) at a distance corresponding to one step in the direction indicated by the dotted arrow. The data-conversion finger 43D (data-conversion finger part 43BD) moves together with the data-conversion feed bar 41D according to the order of each transfer operation.

A switch timing does not occur in the initial stage (NO in ST18). When the result determined by the determination necessity judgment control means (61,64) referring to the determination necessity judgment information stored in the determination necessity judgment information storage means 64YN shown in FIG. 8 is the determination execution interval or the like (YES in ST20), the virtual interference determination means (61, 62) determines the presence or absence of interference (ST21). When the determined result is not the determination execution interval or the like (NO in ST20), the processing proceeds to the ST27 without determining the presence or absence of virtual interference.

When the virtual interference determination means (61, 62) has determined that interference has occurred (YES in ST22), the interference is displayed on the display section 66 as a message and stored in the HDD 64. At the same time, a buzzer (not shown) is activated to alarm (ST23). The interference state of the press-side data-conversion constituent element (e.g. 16BDR1 and 16BDR3) and the transfer-side data-conversion constituent element (e.g. 43BD) is displayed on the display section 66 in a state as shown in FIG. 13(C), for example (ST24). Since the event in virtual space can be observed with the naked eye in the same manner as an event in real space, measures can be accurately and promptly taken to avoid interference. The stored virtual interference, the name of the data-conversion constituent element, and the like may be printed using a printer (not shown).

The alarm using the buzzer and the display disappear when the operator has performed a disappearance operation (YES in ST25) by key operation of the operation section 65 (ST26). The disappearance operation may be switched to an automatic disappearance operation using the automatic disappearance time which can be changed.

When determination is not made (NO in ST20) and interference does not occur (NO in ST22) after the alarm has disappeared, the virtual transfer press cycle is caused to proceed to the next step (ST17). Specifically, in view of an extremely characteristic situation in virtual space (actual damage does not occur due to interference), occurrence of virtual interference can be repeatedly checked (ST21 and ST22) until the virtual transfer press cycle in all the steps (steps STP1 to STPn) is completed (YES in ST27). Therefore, a state in which interference occurs to the maximum extent can be determined by the virtual transfer press cycle.

According to the first embodiment, since whether or not interference occurs between the press-side data-conversion upper die 16D or the like and the transfer-side data-conversion finger 43D or the like can be automatically determined during the virtual transfer press cycle in virtual space, interference can be accurately and promptly checked, and handling is facilitated. A complicated setting/input operation and an additional worker are unnecessary. Moreover, since it is unnecessary to actually perform the transfer press cycle in real space, it is safe and almost free from risk.

It is possible to deal with a demand for an increase in the working speed during die tryout in the press production site in which the press motion SLD, the transfer motion TLD, the shape of various parts, and the like are frequently changed.

Moreover, since a complicated and careful setting/input operation is unnecessary, it is very easy to handle the transfer press machine according to the first embodiment in comparison with the previously proposed press machine which requires setting/input for each press condition (e.g. specified speed pattern at processing start position, processing end position, and processing region) and each material transfer condition (e.g. advance operation start timing, advance operation speed, and advance operation distance). Since an additional worker is unnecessary, the press cost can be reduced.

Since the specific position at which interference occurs can be known, the upper die part 16 or the material 200 may be replaced with an upper die part 16 or a material 200 which does not interfere, or the press motion and/or the transfer motion can be changed appropriately and minimally. In addition, skill is unnecessary.

In particular, since the shape of the die (16, 18), the finger 43, and the material 200 is taken into consideration, interference can be accurately checked. Moreover, since the image (data-conversion constituent element and its movement) can be confirmed with the naked eye before operating the machine in real space, the presence or absence of virtual interference can be specifically and efficiently determined. Therefore, utility is extremely increased.

Since the first virtual interference confirmation target extraction means (61,64) which can efficiently select the virtual interference confirmation target is provided, the load of the interference check between the data-conversion upper die 16D and the data-conversion finger 43D can be reduced, and the processing speed can be increased. In particular, the first embodiment is effective when changing the transfer motion of the material 200.

Since interference is checked using the simple three-dimensional shape data-conversion constituent element before switching during the virtual transfer press cycle, the processing load in the initial stage immediately before interference occurs can be significantly reduced, and the processing speed can be further increased. Since the complicated three-dimensional shape data-conversion constituent element is used after switching, specific, accurate, and prompt determination can be ensured.

Moreover, since interference is checked in the determination necessary interval during the virtual transfer press cycle, load can be reduced by selecting the necessary interval, and the time required for all the check steps can be reduced. Since interference is checked in the determination execution interval in the necessary interval, load and time required for all the check steps can be further reduced.

Moreover, since the presence or absence of virtual interference is determined during the one-dimensional virtual transfer operation in which execution of determination of the presence or absence of interference is designated, load and time required for all the check steps can be minimized in view of the relationship with the material transfer operation.

Furthermore, since the press-side data-conversion constituent element and the transfer-side data-conversion constituent element can be displayed on the display section, the relative relationship between the constituent elements can be observed when creating the data-conversion constituent elements or determining the presence or absence of virtual interference. Therefore, handling is further facilitated.

The basic configurations and functions according to another embodiment are similar to those of the embodiment described above (FIGS. 1 to 11) except that second virtual interference confirmation target extraction means including second finger path-shaped box generation-placement control means (61,64) is provided instead of the first virtual interference confirmation target extraction means including the first finger path-shaped box generation-placement control means (61,64) so that the presence or absence of virtual interference generation relating to the virtual material 200D can be determined at a higher speed.

Specifically, the second virtual interference confirmation target extraction means (61,64) detects interference of the data-conversion upper die 16D and the data-conversion lower die 18D with a data-conversion material path-shaped box 200DBX (not shown) disposed in virtual space when virtually moving the data-conversion upper die 16D (data-conversion slide 15D) down to the virtual bottom dead center in virtual space (ST1527 in FIG. 14), and extracts the detected data-conversion upper die 16D and lower die 18D as the virtual interference confirmation target (YES in ST1528 and ST1529).

The second finger path-shaped box generation-placement control means (61,64) making up the second virtual interference confirmation target extraction means (61,64) is formed to generate each data-conversion material path-shaped box 200DBX based on each trace of the data-conversion material 200D virtually held by the data-conversion finger 43D when causing the data-conversion finger 43D to perform a virtual transfer operation (ST1523) in virtual space (ST1524 and ST1525), and place each data-conversion material path-shaped box 200DBX in virtual space (ST1526). Each data-conversion material path-shaped box 200DBX is stored in an area 64ITZX of the data-conversion constituent element storage means 64IPT shown in FIG. 6 together with each item of placement data in virtual space.

Figure 14:
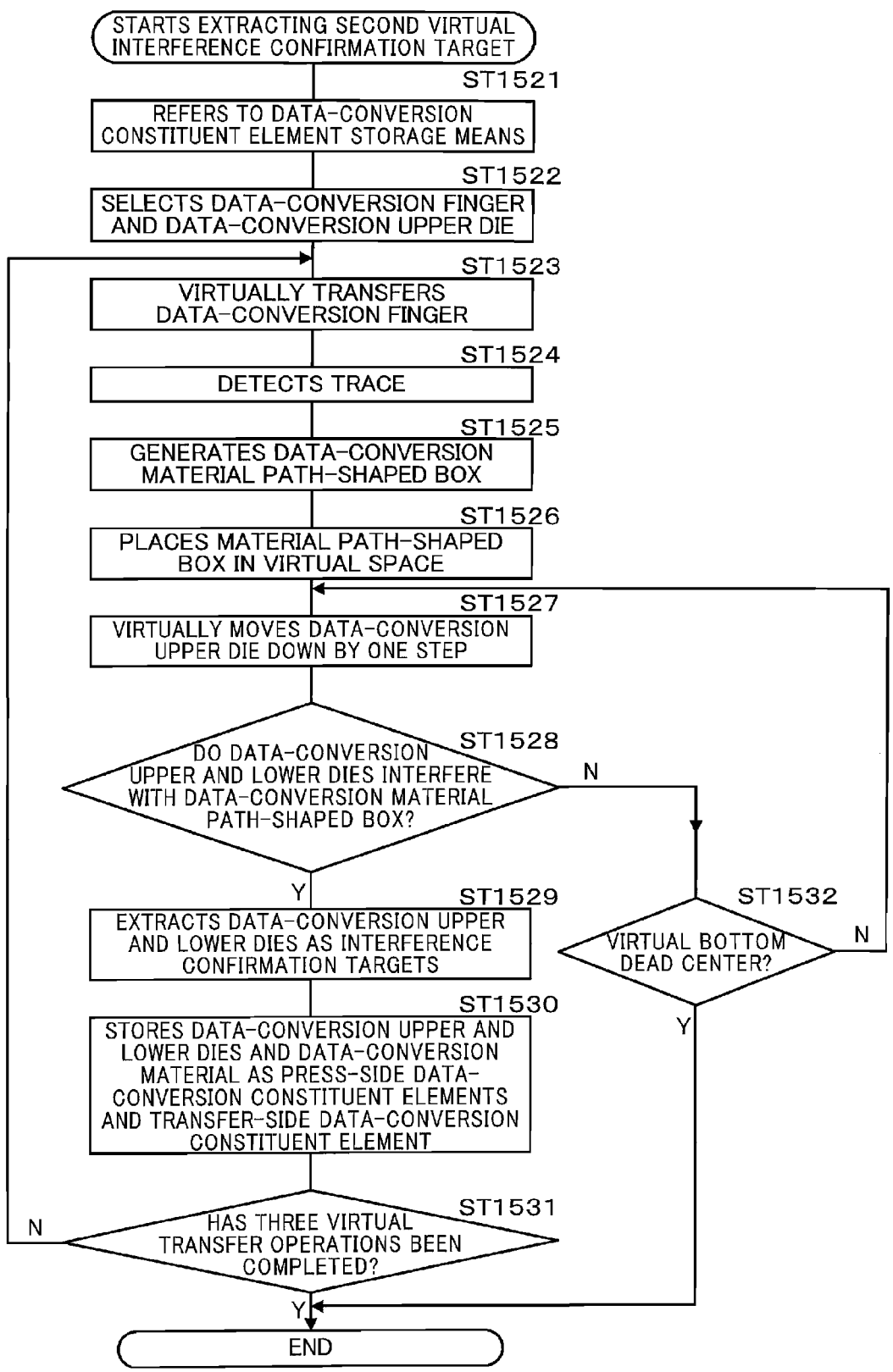
FIG. 14 is a flowchart illustrative of second virtual interference confirmation target extraction operation according to a second embodiment of the invention.

In FIG. 14, when interference has been detected (ST1528), even if the data-conversion upper die 16D (or the data-conversion slide 15D) does not reach the virtual bottom dead center (state in which the data-conversion upper die 16D and the data-conversion lower die 18D contact) (NO in ST1532), the processing is finished (END) after performing processing in steps ST1529 and ST1530.

Note that the operations (ST1527 to 1529) may be repeatedly performed until the data-conversion upper die 16D reaches the virtual bottom dead center (YES in ST1532). This allows an interference check of the same or different upper die part 16BD (or lower die part Bd) and/or data-conversion material 200D (or data-conversion material part 200BD) can be performed a number of times. This is because problems such as a material breakage do not occur since the interference occurs in virtual space.

Each data-conversion material path-shaped box 200DBX based on the data-conversion material traces when subjecting the data-conversion material 200D to a one-dimensional virtual transfer operation in virtual space is generated in the same manner as in the case of generating the data-conversion finger path-shaped box 43DBX based on the data-conversion finger traces (right and left pair) when causing the data-conversion finger 43D shown in FIGS. 13(A) to 13(D) to perform a virtual one-dimensional transfer operation (one-dimensional transfer operation: CLP→LFT→ADV→DWN→UCL→RTN) in virtual space.

The data-conversion upper die 16D, the data-conversion lower die 48D, and the data-conversion finger 43D are selected referring to the data-conversion constituent element storage means 64IPT (64IPKD, 64ITKD, 64IPTX) shown in FIG. 6 (ST1521 and ST1522). The extracted data-conversion upper die 16D and data-conversion lower die 48D and the data-conversion material 200D are temporarily stored in the RAM 63 as the press-side data-conversion constituent elements and the transfer-side data-conversion constituent element (ST1530).

The extracted data-conversion upper die 16D relates to the upper die part 16B, and the extracted data-conversion lower die 18D relates to the lower die part 18B. This is the same as in the case shown in FIGS. 13(A) to 13(D). Therefore, the processing load can be reduced when determining the presence or absence of virtual interference for the data-conversion upper die part 16BD and the data-conversion lower die part 18BD in virtual space.

Regarding the detection and extraction of the data-conversion material in the second embodiment, since the material transfer device 40 is a three-dimensional transfer device, each data-conversion material path-shaped box based on each trace of the data-conversion material corresponding to each one-dimensional virtual transfer operation when causing the data-conversion finger 43D to perform three transfer operations (lift operation, advance operation, and down operation) specified from the virtual transfer operations in virtual space can be generated and placed (NO in ST1531 and ST1523).

Regarding the generation of the data-conversion material path-shaped box 200DBX, that is, the virtual interference check between the data-conversion material 200D and the upper die 16D/lower die 18D, three one-dimensional virtual transfer operations (lift operation, advance operation, and down operation) which may suffer from interference need be subjected to a virtual interference check, and the others (unclamp operation, return operation, and clamp movement) need not be subjected to the virtual interference check. This is because the data-conversion material 200D is not clamped and transferred using the data-conversion finger 43D.

The virtual interference determination means (61,64) can determine whether or not virtual interference occurs using the data-conversion upper die 15D (a plurality of data-conversion upper die parts 15BD) and the data-conversion lower die 18D (a plurality of data-conversion lower die parts 18BD) extracted by the second virtual interference confirmation target extraction means (61,64) as the press-side data-conversion constituent elements and the data-conversion material 200D as the transfer-side data-conversion constituent element.

Note that description of the same configurations and functions as those of the first embodiment is omitted.

According to the second embodiment, the same effects as in the first embodiment can be achieved. Moreover, since the second virtual interference confirmation target extraction means (61,64) is provided instead of the first virtual interference confirmation target extraction means (61,64), the load of the virtual interference check of the data-conversion upper die 16D and the data-conversion lower die 18D with the data-conversion material 200D can be reduced, and the processing speed can be increased. In particular, the second embodiment is effective when changing the material 200.

The basic configurations and functions of a transfer press machine (10,40) according to yet another embodiment are similar to those of the embodiment described first (FIGS. 1 to 5). As shown in FIGS. 15 to 24, the transfer press machine (10,40) includes data-conversion constituent element storage means 64IPT shown in FIG. 15, a virtual interference check device shown in FIG. 20, and an SPM automatic determination device (optimum motion determination control means (61,64) including clamp-unclamp operation optimization means (61,64) and lift-down operation optimization means) shown in FIGS. 18 and 19 so that optimum motion can be automatically determined in which an allowable SPM which is the smaller of a clamp-unclamp operation allowable SPMclp·ucl temporarily determined by the clamp-unclamp operation optimization means and a lift-down operation allowable SPMlft·dwn temporarily determined by the lift-down operation optimization means is used as the stroke per minute (SPM) of the press machine 10.

Figure 20:
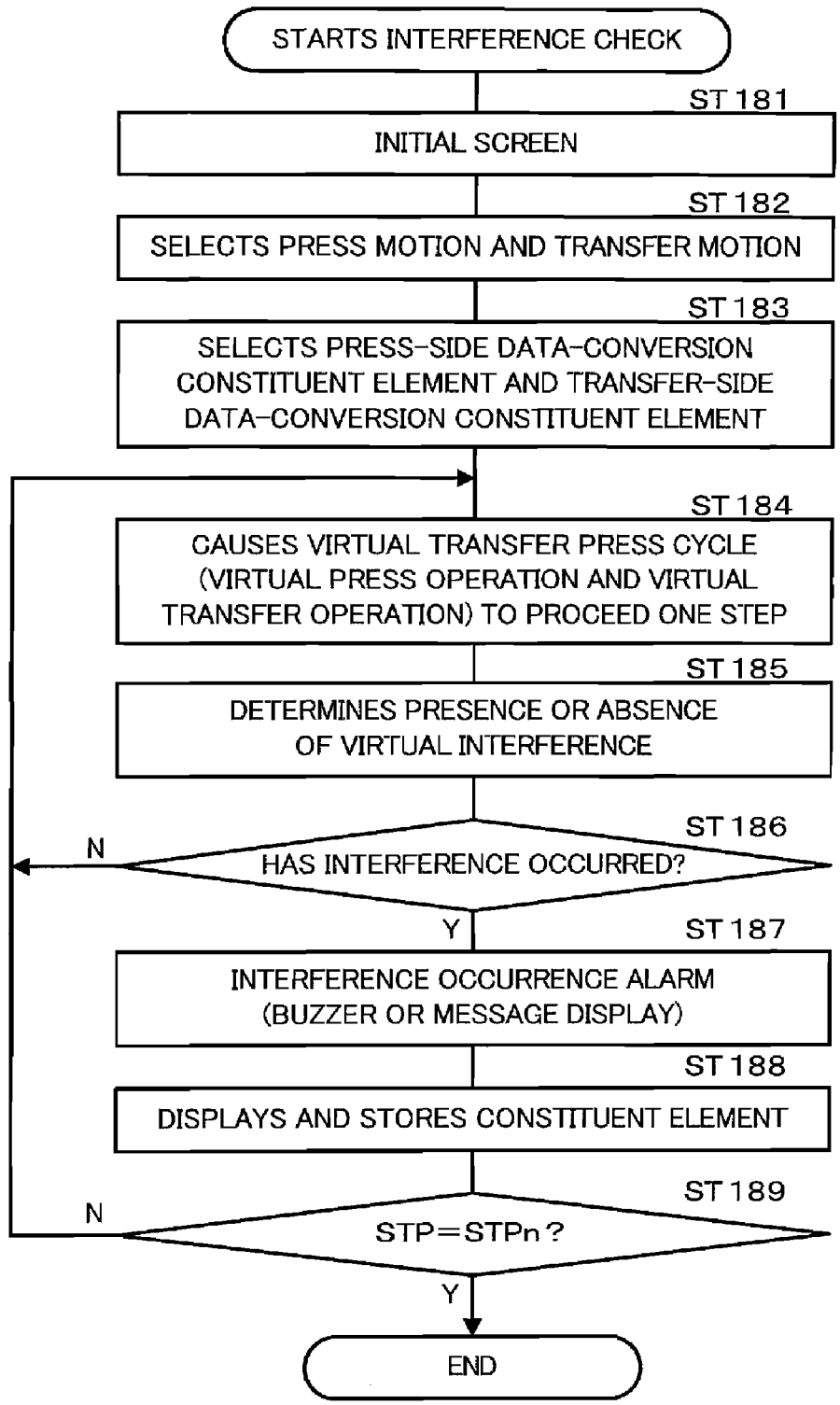
FIG. 20 is a flowchart illustrative of check operation of a virtual interference check device.
Figure 21:
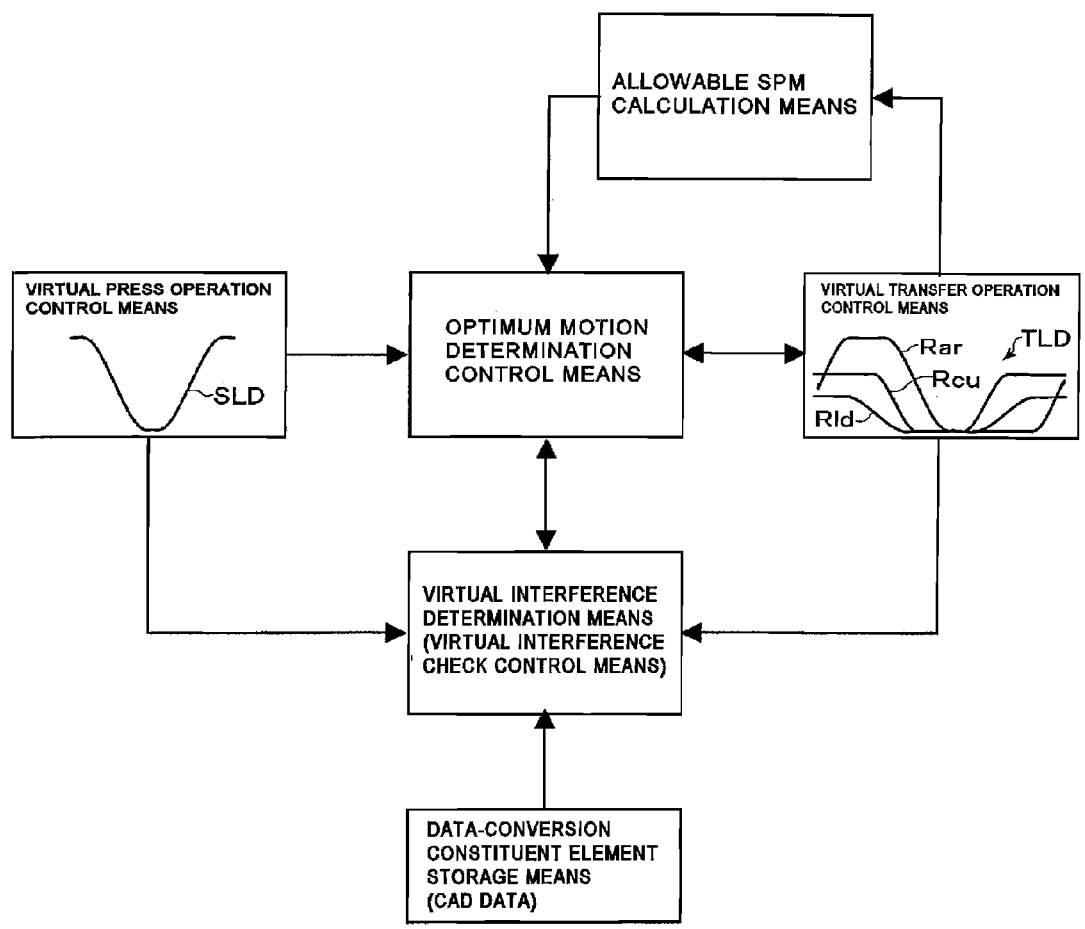
FIG. 21 is a block diagram illustrative of optimization operation.

As shown in FIGS. 20 and 21, the virtual interference check device includes virtual press operation control means (61,64), virtual transfer operation control means (61,64), and virtual interference check control means (61,64) so that the press-side data-conversion constituent element (e.g. data-conversion upper die 16D) and the transfer-side data-conversion constituent element (e.g. data-conversion finger 43D) stored in a state in which the press-side data-conversion constituent element and the transfer-side data-conversion constituent element are converted into three-dimensional shape data and placed in virtual space to have the same relative positional relationship as in real space can be subjected to the virtual transfer press cycle, and whether or not interference occurs between the press-side data-conversion constituent element and the transfer-side data-conversion constituent element can be checked during the transfer press cycle. Specifically, interference can be checked during the transfer press cycle in virtual space without actually performing the transfer press cycle in real space.

Figure 18:
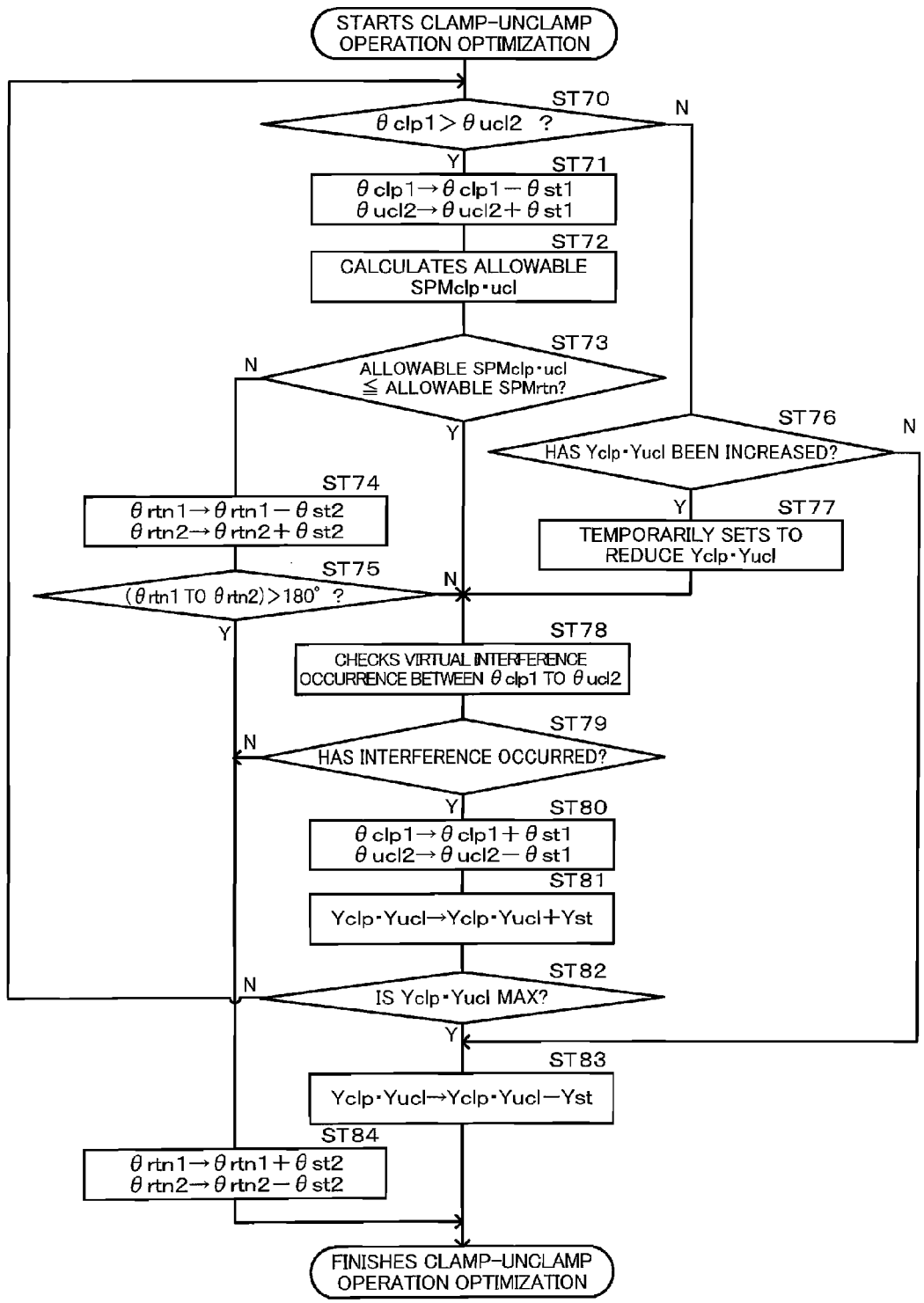
FIG. 18 is a flowchart illustrative of clamp-unclamp operation optimization control operation taking the relationship with return operation into consideration.

The clamp-unclamp operation optimization means making up the SPM automatic determination device (optimum motion determination control means (61,64)) includes first allowable SPM increasing means (61,64), first virtual interference determination means (61,64), first increase operation repeating means (61,64), and first interference prevention means (61,64) so that optimization of the clamp-unclamp operation shown in FIG. 18 can be executed.

Figure 19:
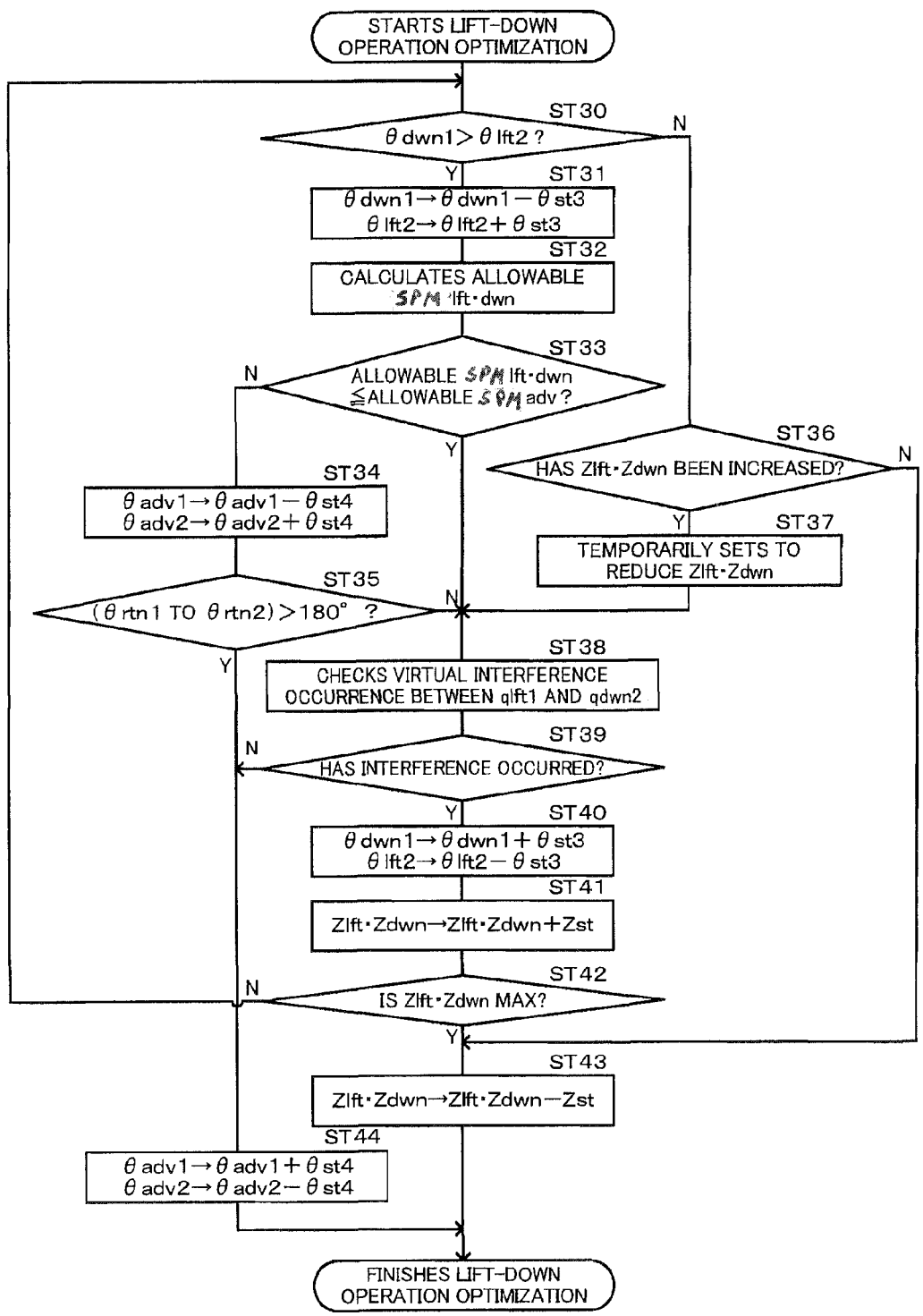
FIG. 19 is a flowchart illustrative of lift-down operation optimization control operation taking the relationship with advance operation into consideration.

Likewise, the lift-down operation optimization means making up the SPM automatic determination device includes second allowable SPM increasing means (61,64), second virtual interference determination means (61,64), second increase operation repeating means (61,64), and second interference prevention means (61,64) so that optimization of the lift-down operation shown in FIG. 19 can be executed.

Figure 28A:
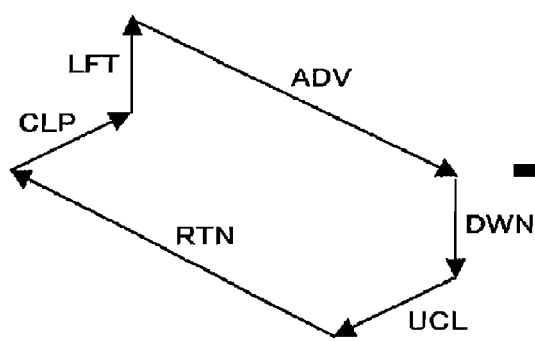
FIGS. 28(A) and 28(B) are diagrams illustrative of the case where three-dimensional transfer operations partially overlap.
Figure 28B:
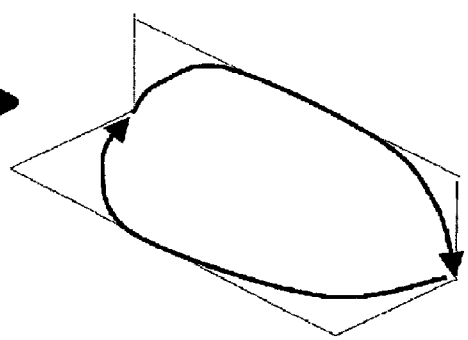

As shown in FIGS. 28(A) and 28(B), the material transfer device 40 is a three-dimensional transfer device which causes the fingers 43 held by the feed bars 41 to hold the material 200 in the pre-placed die (lower die 18) (clamp operation (CLP) in Y axis direction), lift the held material in the Z axis direction to an advance operation height (lift operation (LFT)), transfer the held material in the X axis direction to the position above the post-placed die (lower die 18) (advance operation (ADV)), lower the material 200 from the position above the post-placed die to the height of the post-placed die (down operation (DWN)), release the material in the post-placed die (unclamp operation (UCL)), and return the empty fingers 43 (feed bars 41) to the pre-placed die (return operation (RTN)) in the same manner as in the first embodiment (FIG. 1).

In the third embodiment, the means designated as "(61,64)", such as the press operation control means (61,64) and the transfer operation control means (61,64) which are operated in real space, and the synchronization timing information generation-output means (61,64), the virtual press operation control means (61,64), the virtual transfer operation control means (61,64), and the virtual interference check control means (61,64) which are operated in virtual space, are formed by the HDD 64 which stores respective control programs and the CPU 61 having a program execution function. The program and the like are loaded into the RAM 63 and executed. Specifically, the constituent elements are mainly formed by means of software. Note that the constituent elements may be formed by means of hardware such as a logic circuit.

This also applies to the first allowable SPM increasing means (61,64), the first virtual interference determination means (61,64), the first increase operation repeating means (61,64), the first interference prevention means (61,64), and the like making up the clamp-unclamp operation optimization means (61,64) and the second allowable SPM increasing means (61,64), the second virtual interference determination means (61,64), the second increase operation repeating means (61,64), the second interference prevention means (61, 64), and the like making up the lift-down operation optimization means (61,64).

Figure 16:
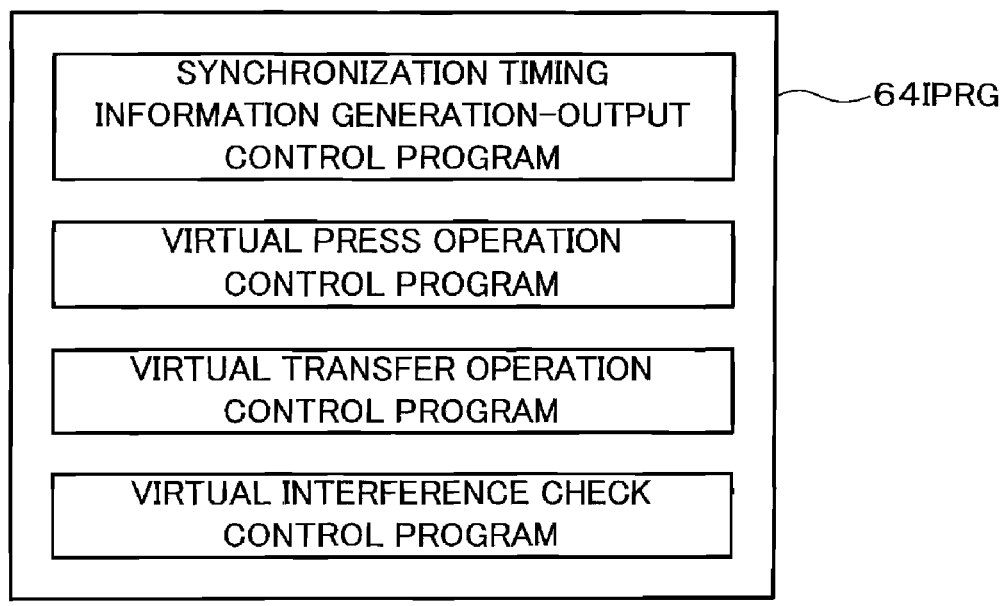
FIG. 16 is a diagram illustrative of virtual control program storage means.
Figure 17:
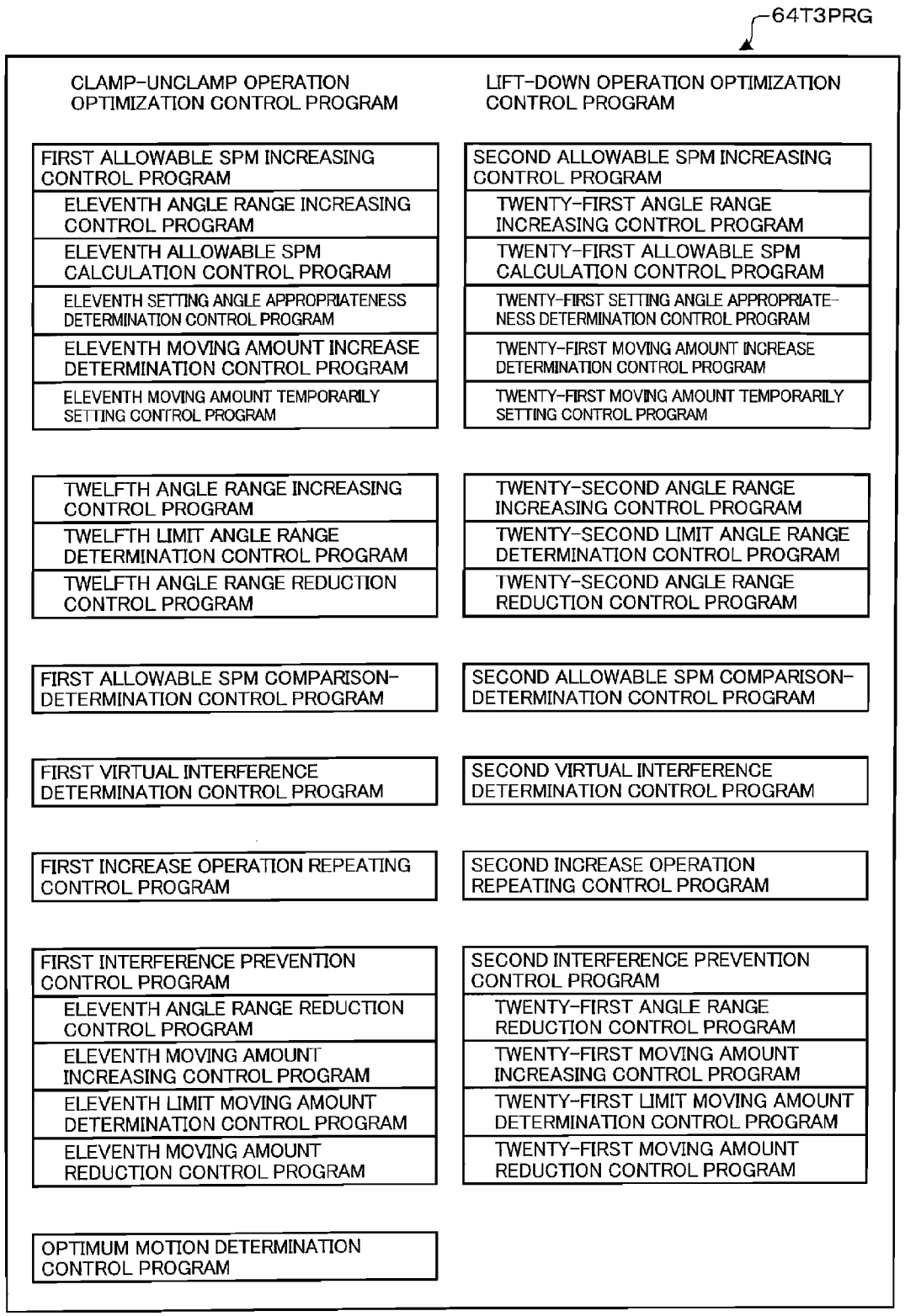
FIG. 17 is a diagram illustrative of three-dimensional transfer operation optimization control program storage means.

Each control program characteristic of the invention is stored in virtual control program storage means 64IPRG shown in FIG. 16 and three-dimensional transfer operation optimization control program storage means 64T3PRG shown in FIG. 17, and items (e.g. information of BIOS, fixed value, and the like) common to each control program are stored in the ROM 62. This also applies to two-dimensional transfer operation optimization control program storage means 64T2PRG shown in FIG. 25 according to a second embodiment described later.

Figure 15:
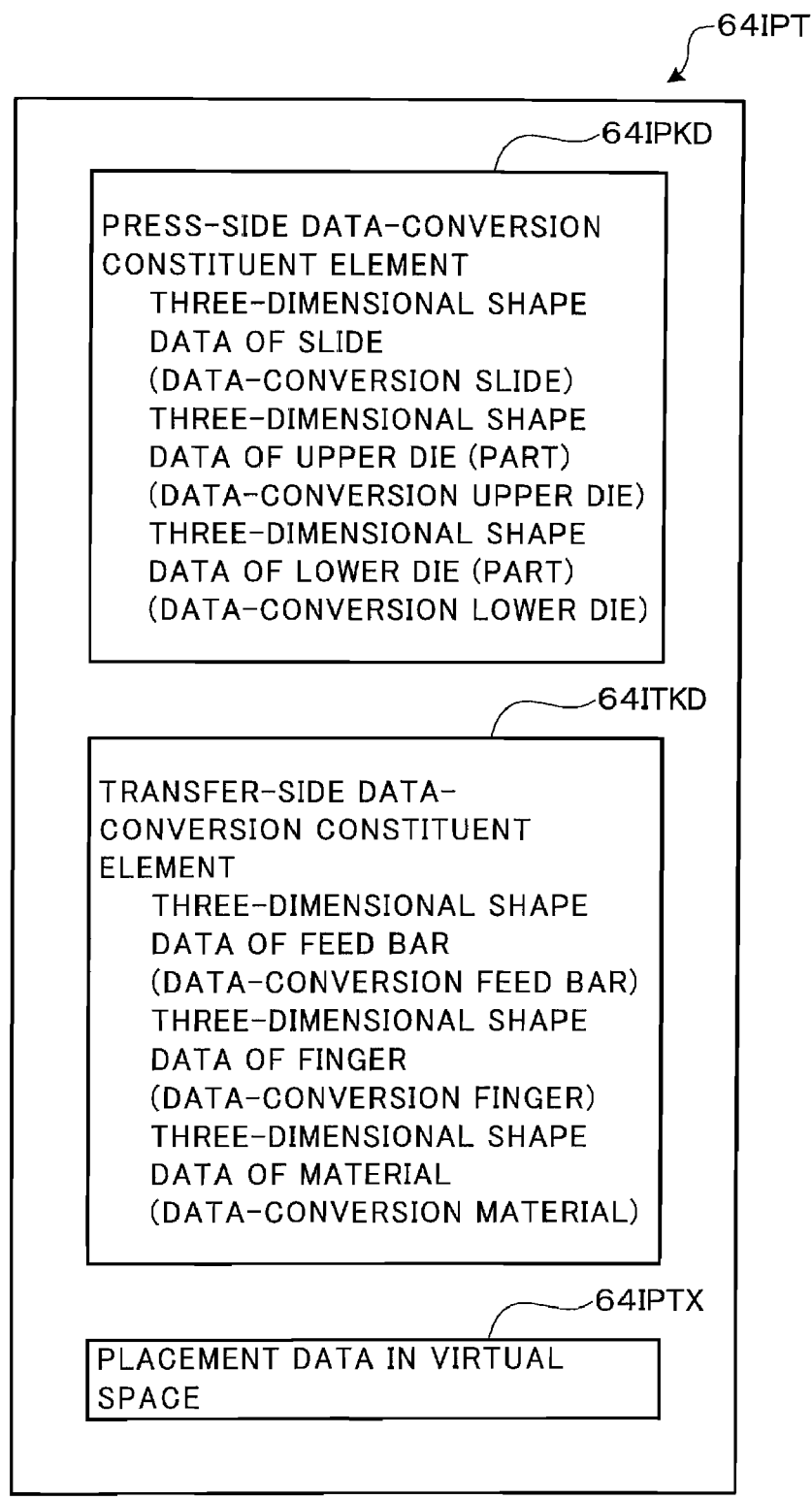
FIG. 15 is a diagram illustrative of a data-conversion constituent element storage means according to a third embodiment of the invention.

The data-conversion constituent element storage means 64IPT shown in FIG. 15 stores the press-side data-conversion constituent element and the transfer-side data-conversion constituent element in a state in which the constituent elements are placed in virtual space to have the same relative position relationship as in real space. The term "press-side data-conversion constituent element" refers to a press-side constituent element (e.g. slide 15 and upper die 16) which is converted into three-dimensional shape data (e.g. 15D and 16D) which is obtained by converting the actual three-dimensional shape of the press-side constituent element into data.

This conversion into data is performed by the three-dimensional shape data conversion control means in the same manner as in the embodiment described first (FIG. 9). Specifically, the three-dimensional shape data conversion control means (61,64) converts the data-conversion target (actual object) specified by referring to the data-conversion target storage means 64PT shown in FIG. 5 (ST01 in FIG. 9) into three-dimensional shape data (ST04). The data-conversion target is specified from information (e.g. data of the upper die 16 or each upper die part 16BD such as the name and dimensions) displayed (ST02) on the display section 66 by key operation or touch operation of the operation section 65 (ST03). The data-conversion target may be scaled down when converting the data-conversion target into data.

The constituent element converted into data (e.g. 16D . . . three-dimensional CAD data) is stored in the data-conversion constituent element storage means 64IPT (area 64IPKD) shown in FIG. 15 by the function of the data-conversion constituent element storage control means (61,64) (ST06). The data-conversion constituent element is stored in a placement state in cooperation with the placement control means (61,64).

Specifically, the placement control means (61,64) places the press-side data-conversion constituent element (e.g. data-conversion upper die 16D) converted into three-dimensional shape data while referring to basic data (e.g. layout information) of the press machine 10 which is input using the layout setting input means (operation section 65) and stored in the data-conversion target storage means 64PT (area 64PBD) shown in FIG. 5 (ST05). The layout information is "position information with respect to the center of the press main body in the width direction, the depth direction, and the height direction". In this embodiment, the placement data storage control means (61,64) operates to store the data-conversion constituent element in the data-conversion constituent element storage means 64IPT (area 64IPTX) shown in FIG. 15 as "placement data in virtual space" (ST06).

Likewise, the transfer-side data-conversion constituent element is subjected to three-dimensional shape data conversion and placement (ST03 to ST06), and the processing is finished after all necessary constituent elements have been processed (YES in ST07). The data-conversion constituent element (e.g. data-conversion finger 43D) is stored in the data-conversion constituent element storage means 64IPT (area 64ITKD) shown in FIG. 15. The "placement data in virtual space" is stored in the area 64IPTX shown in FIG. 15 in the same manner as the press-side data-conversion constituent element (e.g. 16D) (ST05). Specifically, the relative positional relationship between the transfer-side data-conversion constituent element (e.g. data-conversion upper die 16D) and the transfer-side data-conversion constituent element (e.g. data-conversion finger 43D) in virtual space becomes the same as the relative positional relationship in real space by three-dimensional CG.

The above series of operations may be carried out while confirming the data-conversion target (e.g. upper die 16 and upper die part 16B) and the basic data (e.g. layout information) displayed on the display section 66 with the naked eye. The completed press-side data-conversion constituent element (e.g. 16D) and transfer-side data-conversion constituent element (e.g. 43D) and the placement state thereof in virtual space may also be confirmed with the naked eye.

The respective data-conversion constituent elements and placement data may be created in another location and stored in the data-conversion constituent element storage means 64IPT (64IPTX) shown in FIG. 15 through a communication line or using a medium.

The virtual press operation control means (61,64) is means for causing the press-side data-conversion constituent element (data-conversion slide 15D . . . data-conversion upper die 16D and data-conversion upper die part 16BD) placed in the data-conversion constituent element storage means 64IPT (64IPKD and 64IPTX) shown in FIG. 15 to perform a virtual press operation (see FIG. 21) in virtual space according to the press motion SLD stored in the press motion storage means 64M (area 64MP) shown in FIG. 4. Note that the press motion control means (61,64) which operates in real space outputs the pulse signal (Sh) in specific time units for feedback control, and it suffices that the virtual press operation control means (61,64) acquire the stored press (slide) motion as traces (SLD) and follow the traces (SLD). Specifically, it suffices that the virtual press operation control means (61,64) move the data-conversion upper die 16D (data-conversion upper die part 16BD) up and down together with the data-conversion slide 15D in specific cycle (time) units.

The virtual transfer operation control means (61,64) is means for causing the transfer-side data-conversion constituent elements (data-conversion feed bar 41D . . . data-conversion finger 43D and data-conversion finger part 43BD) placed in the data-conversion constituent element storage means 64IPT (64ITKD and 64IPTX) shown in FIG. 15 to perform a virtual transfer operation (see FIG. 21) in virtual space according to the transfer motion TRD stored in the transfer motion storage means 64M (area 64MT) shown in FIG. 4.

In this case, while the transfer motion control means (61, 64) which operates in real space outputs the pulse signal (Sar, Scu, Sld) in specific time units for feedback control, it suffices that the virtual transfer operation control means (61,64) acquire the stored transfer motion as traces (TRD) and follow the traces (TRD). Specifically, it suffices that the virtual transfer operation control means (61,64) move the data-conversion finger 43D (data-conversion finger part 43BD) up and down together with the feed bar 41D along the traces (TRD . . . . Rar, Rcu, Rld) in specific cycle (time) units.

The virtual synchronization timing information generation-output means (61,64) generates and outputs virtual synchronization timing information for synchronizing the virtual press operation of the virtual press operation control means (61,64) and the virtual transfer operation of the virtual transfer operation control means (61,64) shown in FIG. 21. The progress of these operations in synchronization is the progress (execution) of the virtual transfer press cycle, as shown in FIG. 1 (see ST184 in FIG. 20). In this embodiment, the virtual synchronization timing signal is generated and output utilizing a reference clock signal transmitted from a clock circuit (not shown) in the CPU 61.

The virtual interference check control means (61,64) is means for checking whether or not interference occurs between the press-side data-conversion constituent element (data-conversion upper die 16D) and the transfer-side data-conversion constituent element (data-conversion finger 43D) converted into three-dimensional shape data during the virtual transfer press cycle (SLD, TRD) (ST185 and ST186 in FIG. 20).

The presence or absence of interference in virtual space is checked by a sequential correspondence check method using three-dimensional CAD data (press-side data-conversion constituent element and transfer-side data-conversion constituent element). Therefore, various measures may be additionally provided in order to reduce the determination processing load and increase the processing speed.

For example, the simple three-dimensional shape data-conversion constituent element created to involve the actual three-dimensional shape is selectably stored for each of the press-side data-conversion constituent elements and the transfer-side data-conversion constituent elements in each of the areas 64IPKD, 64ITKD, and 64IPT of the data-conversion constituent element storage means 64IPT shown in FIG. 15 in addition to the actual three-dimensional shape data (complicated three-dimensional shape data-conversion constituent element). The data-conversion constituent element switch control means (61,64) is provided so that the data-conversion constituent element can be switched from the simple three-dimensional shape data-conversion constituent element to the complicated three-dimensional shape data-conversion constituent element at a specific timing during the virtual transfer press cycle.

The term "simple three-dimensional shape data-conversion constituent element" refers to a constituent element which has a size (dimensions) capable of surrounding the maximum dimension of the actual three-dimensional shape (e.g. upper die 16) in each axis (X, Y, Z) direction and is converted into three-dimensional shape data. In more detail, a simple shape (e.g. cubic shape or square prism shape having six interference check target portion surfaces) is formed to involve the complicated three-dimensional shape data-conversion constituent element corresponding to the actual three-dimensional shape (e.g. shape having 1000 interference check target portion surfaces). This significantly reduces the number of correspondence check portions, whereby simplification and an increase in speed of processing can be expected.

The presence or absence of virtual interference is determined using the simple three-dimensional shape data-conversion constituent element as at least one of the data-conversion constituent elements in the initial stage, and the presence or absence of virtual interference is then determined using the complicated three-dimensional shape data-conversion constituent elements for both of the data-conversion constituent elements. This significantly reduces the preliminary interference check time until the complicated three-dimensional shape data-conversion constituent elements approach (or contact). Specifically, the processing load can be significantly reduced and the processing speed can be further increased before switching, thereby ensuring efficient operation.

The above switch timing may be input or changed using the switch timing input means (operation section 65). The switch timing is preferably immediately before the press-side data-conversion constituent element which likely interferes contacts the transfer-side data-conversion constituent element. For example, the switch timing may be set as the distance between the data-conversion upper die part 16BD (bottom surface of the data-conversion slide 15D) and the data-conversion finger part 43BD (or the top surface of the data-conversion bolster 19D). Since interference in virtual space does not cause actual damage, when enabling determination of the presence or absence of virtual interference until the data-conversion upper die 16D (data-conversion slide 15D) reaches the virtual bottom dead center, the time at which the presence of interference is determined for the first time (immediately after determination) may be automatically detected and set as the switch timing.

Moreover, the three-dimensional shape data-conversion constituent element display control means (61,64) may be provided so that the press-side data-conversion constituent element and the transfer-side data-conversion constituent element stored in the data-conversion constituent element storage means 64IPT shown in FIG. 15 can be displayed on the display section 66 in a state in which the constituent elements are placed in virtual space. The constituent elements are displayed so that the constituent elements can be observed with the naked eye even during the operation in virtual space.

The virtual interference check device according to the third embodiment is automatically activated (ST78 in FIG. 18 and ST38 in FIG. 19) and can execute a virtual interference check (determination) in virtual space according to the procedure (ST S81 to ST189) shown in FIG. 20. The virtual interference check device may be manually caused to execute the check (determination) by key operation of the operation section 65.

When automatic activation instructions have been issued, an initial screen is displayed on the display section 66 (ST181 in FIG. 20). A plurality of press motions (SLD) set using the press motion setting input means (operation section 65) and stored in the press motion storage means 64M (64MP) shown in FIG. 4 and a plurality of transfer motions (TRD) set using the transfer motion setting input means (operation section 65) and stored in the transfer motion storage means 64M (64MT) are also displayed, and the slide motion (SLD) and the transfer motion (TRD) shown in FIG. 1 or 21 which have been selected in advance are automatically selected (ST182).

Specifically, the press-side data-conversion constituent element and the transfer-side data-conversion constituent element stored in the data-conversion constituent element storage means 64IPT shown in FIG. 15 are automatically selected (ST183). The placement data in virtual space concerning each data-conversion constituent element is automatically and incidentally selected on condition that each data-conversion constituent element has been selected.

Note that the operator may manually select each motion by specifying the motion number or the like while confirming the input and stored motion on the display with the naked eye. This enables only the virtual interference check device to be independently operated, whereby utility is increased.

The data-conversion upper die 16D (data-conversion upper die part 16BD), the data-conversion lower die 18D (data-conversion lower die part 18BD), or the like is selected as the press-side data configuration element, and the data-conversion finger 43D (data-conversion finger part 43BD) and the data-conversion material 200D (data-conversion material portion 200BD) are selected as the transfer-side data-conversion constituent elements.

When the virtual synchronization timing information is generated and output from the virtual synchronization timing information generation-output means (61,64), a virtual press operation of the virtual press operation control means (61,64) and a virtual transfer operation of the virtual transfer operation control means (61,64) progress in synchronization, as shown in FIG. 21. Specifically, the virtual transfer press cycle progresses (ST184 in FIG. 20). The virtual synchronization timing information generation-output control program, the virtual press operation control program, and the virtual transfer operation control program are read from the virtual control program storage means 64IPRG (64) shown in FIG. 16, loaded into the RAM 63, and utilized.

Specifically, one step (unit cycle time) of the virtual transfer press cycle progresses, as shown in FIGS. 1 and 21 (ST184). The data-conversion upper die 16D (data-conversion upper die part 16BD) is moved down together with the data-conversion slide 15D (not shown) at a distance corresponding to one step. The data-conversion finger 43D (data-conversion finger part 43BD) moves together with the data-conversion feed bar 41D according to the order of each transfer operation.

The virtual interference check control means (61,62) checks interference (including determination of the presence or absence of interference) (ST185 and ST186). When the virtual interference check control means (61, 62) has determined that interference has occurred (YES in ST186), the interference is displayed on the display section 66 as a message and stored in the memory. At the same time, a buzzer (not shown) is activated to alarm (ST187). The interference state of the press-side data-conversion constituent element and the transfer-side data-conversion constituent element is displayed on the display section 66 (ST188). The event in virtual space can be observed with the naked eye in the same manner as an event in real space. The stored virtual interference, the name of the data-conversion constituent element, and the like may be printed using a printer (not shown).

When interference does not occur (NO in ST186), the virtual transfer press cycle is caused to proceed to the next step (ST184). Specifically, in view of extremely characteristic situation in virtual space (actual damage does not occur due to interference), virtual interference can be repeatedly checked (ST185 and ST186) until the virtual transfer press cycle in all the steps (steps STP1 to STPn) is completed (YES in ST189).

In the case of automatic activation (ST78 in FIG. 18 and ST38 in FIG. 19) by the clamp-unclamp operation optimization means (61,64) and the lift-down operation optimization means (61,64), the operation is finished when the steps (e.g. steps STP(1+h) to STP(n−i)) corresponding to the clamp-unclamp operation have been completed instead of all the steps (steps STP1 to STPn).

The first allowable SPM increasing means making up the clamp-unclamp operation optimization means (61,64) increases the allowable SPM by increasing the clamp-unclamp operation angle range using eleventh angle range increasing means (61,64) (ST71 in FIG. 18). The eleventh angle range increasing means (61,64) increases the clamp operation angle range (start angle theta(clp1) to finish angle theta(clp2)) and the unclamp operation angle range (start angle theta(ucl1) to finish angle theta(ucl2)) shown in FIG. 22(A).

Figure 22A:
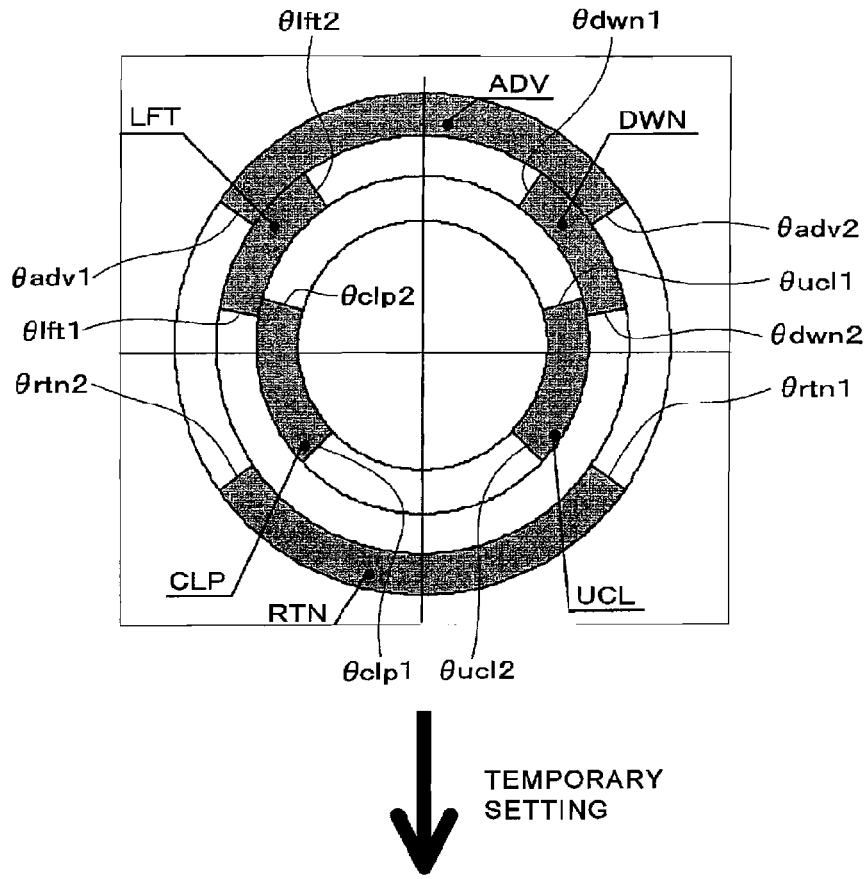
FIGS. 22(A) and 22(B) are diagrams illustrative of a start angle and a finish angle of each transfer operation.
Figure 22B:
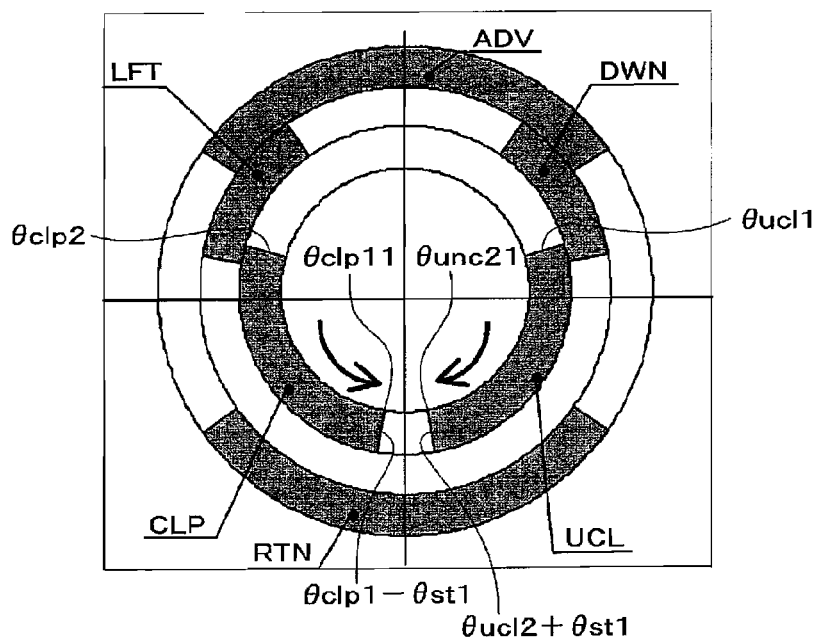

In this embodiment, the clamp-unclamp operation angle range is increased (ST71 in FIG. 18) by reducing the clamp movement start angle theta(clp1) (theta(clp1)−theta(st1)) and increasing the unclamp operation finish angle theta(ucl2) (theta(ucl2)+theta(st1)), as shown in FIG. 22(B). The start angle theta(clp1) and the finish angle theta(clp2) specifying the clamp (CLP) operation angle range and the start angle theta(ucl1) and the finish angle theta(ucl2) specifying the unclamp (UCL) operation angle range may be set (input) using crank angle setting input means (operation section 65). The device may be formed so that the remaining angles (theta (ucl1) and theta(ucl2)) can be automatically calculated by inputting some angles (e.g. theta(clp1), and theta(clp2)) due to symmetry.

The first adjustment setting angle theta(st1) can be changed using adjustment setting angle input means (operation section 65). The set first adjustment setting angle theta(st1) is stored in an FRAM (not shown) together with the clamp operation angle range (start angle theta(clp1) to finish angle theta(clp2)) and the unclamp operation angle range (start angle theta (ucl1) to finish angle theta(ucl2)). Virtual interference can be finely checked by setting the first adjustment setting angle theta(st1) to a small value (e.g. 0.5 degrees). Virtual interference can be promptly checked by setting the first adjustment setting angle theta(st1) to a large value (e.g. 2 degrees).

When the clamp-unclamp operation angle range is increased (ST71 in FIG. 18), the allowable SPM calculation means (61,64) calculates the clamp-unclamp operation allowable SPMclp·ucl referring to the mechanical rigidity of the transfer (clamp-unclamp operation) mechanism and the maximum acceleration and the maximum speed determined by the amount of inertia, the characteristics of the servomotor, and the like set and stored in advance (ST72), and stores the allowable SPMclp·ucl in the memory (e.g. RAM 63). Specifically, the limit (allowable) SPMclp·ucl is updated.

Figure 26:
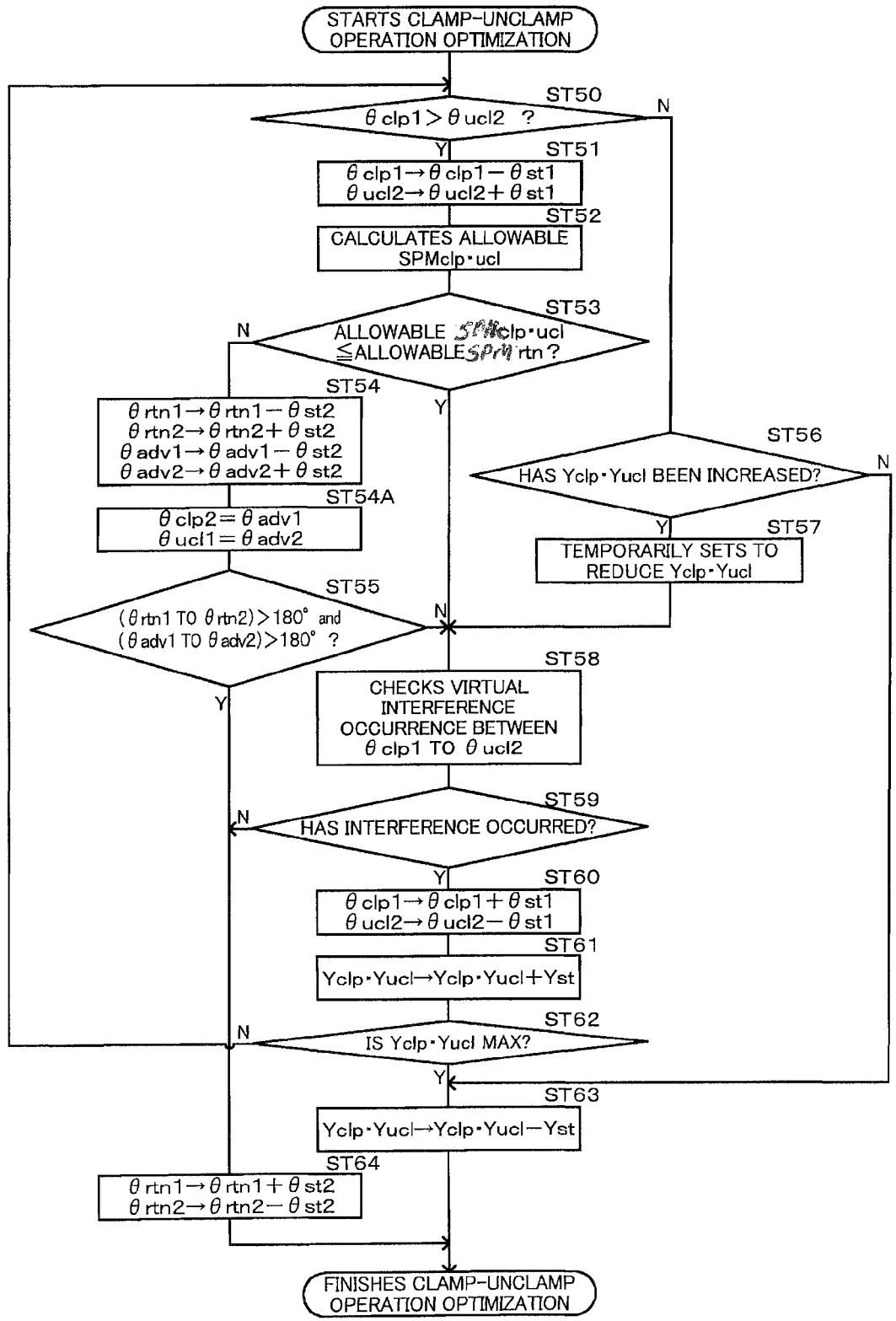
FIG. 26 is a flowchart illustrative of clamp-unclamp operation optimization control operation taking the relationship with return-advance operation into consideration.
Figure 27A:
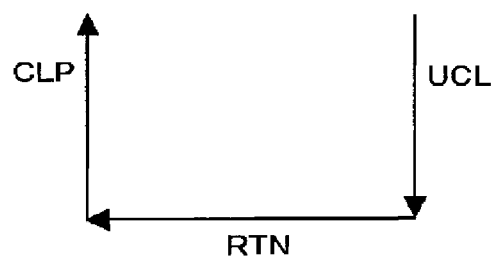
FIGS. 27(A) and 27(B) are diagrams illustrative of the case where clamp-unclamp operation and return operation partially overlap.
Figure 27B:
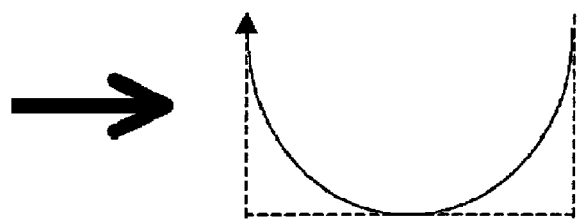

Note that the start angle theta(adv1) and the finish angle theta(adv2) specifying the advance (ADV) operation angle range, the start angle theta(rtn1) and the finish angle theta (rtn2) specifying the return (RTN) operation angle range, the start angle theta(lft1) and the finish angle theta(lft2) specifying the lift (LFT) operation angle range, and the start angle theta(dwn1) and the finish angle theta(dwn2) specifying the down (DWN) operation angle range shown in FIGS. 22(A) and 22(B), and the second to fourth adjustment setting angles theta(st2) to theta(st4) shown in FIGS. 18 and 19 are set (input), stored, and subjected to allowable SPM calculation in the same manner as the clamp operation angle range (start angle theta(clp1) to finish angle theta(clp2)), the unclamp operation angle range (start angle theta(ucl1) to finish angle theta(ucl2)), and the first adjustment setting angle theta(st1). This also applies to a fourth embodiment (FIG. 26).

The first virtual interference determination means (61,64) determines the presence or absence of interference by activating the virtual interference check device during the clamp-unclamp operation after increasing the allowable SPM (ST78 and ST79 in FIG. 18). In this embodiment, when the updated clamp-unclamp operation allowable SPMclp·ucl is determined to be equal to or smaller than the return operation allowable SPMrtn (allowable SPMclp·ucl≦allowable SPMrtn) as a result of comparison (YES in ST73), the virtual interference check device is automatically activated and caused to check virtual interference (ST78 in FIG. 18 and ST181 to ST189 in FIG. 20). In this embodiment, when the presence of interference is stored in the memory in the virtual interference check device (ST188 in FIG. 20), the first virtual interference determination means (61,64) detects that effect to determine that virtual interference occurs (YES in ST79 in FIG. 18).

When the first virtual interference determination means (61,64) has determined that interference does not occur (NO in ST79), the first increase operation repeating means (61,64) again activates the first allowable SPM increasing means (61,64) (YES in ST70 and ST71). Specifically, the first increase operation repeating means (61,64) gradually increases the clamp-unclamp operation angle range ((start angle theta(clp1) to finish angle theta(clp2))(start angle theta (ucl1) to finish angle theta(ucl2))) on condition that interference does not occur. This directly leads to an increase in the allowable SPMclp·ucl.

However, since an increase in the clamp-unclamp operation angle range (allowable SPMclp·ucl) is limited, it is inevitably determined that interference has occurred (YES in ST79). The first interference prevention means (61,64) then operates.

The first interference prevention means (61,64) prevents interference by reducing the clamp-unclamp operation angle range (ST80) and increasing the clamp-unclamp operation moving amount (ST81) when it is determined that interference has occurred.

Specifically, eleventh angle range reducing means (61,64) returns the current clamp operation angle range (start angle theta(clp1) to finish angle theta(clp2)) and unclamp operation angle range (start angle theta(ucl1) to finish angle theta(ucl2)) which have been gradually increased (ST71) to the previous clamp operation angle range and unclamp operation angle range at which interference does not occur (ST80). This is achieved by increasing the current clamp movement start angle theta(clp1) (theta(clp1)+theta(st1)) and reducing the current unclamp operation finish angle theta(ucl2) (theta (ucl2)−theta(st1)).

Eleventh moving amount increasing means (61,64) gradually increases the clamp-unclamp operation moving amount Yclp·Yucl (ST81). This is achieved by adding a first setting increase/decrease amount Yst to the clamp-unclamp operation moving amount Yclp·Yucl (Yclp·Yucl+Yst).

Figure 23B:
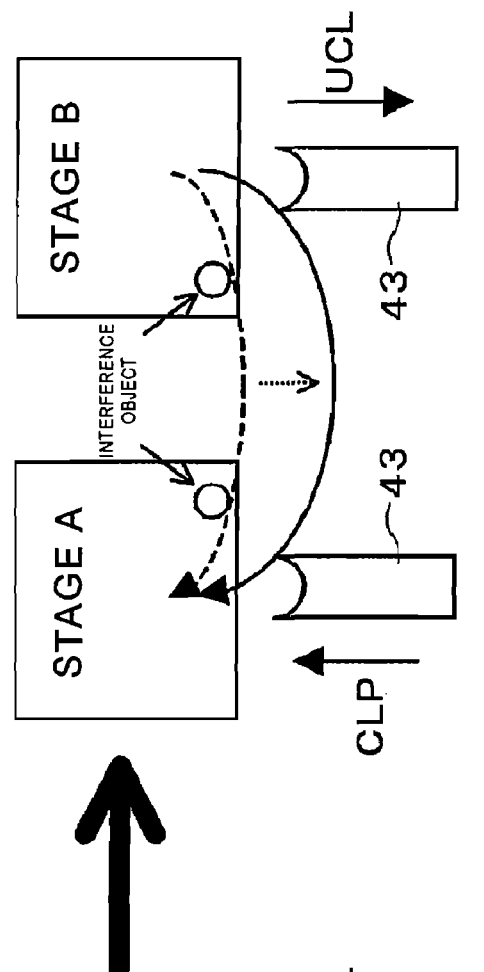
FIGS. 23(A) and 23(B) are diagrams illustrative of interference prevention effect when temporarily increasing a clamp-unclamp operation moving amount.
Figure 23A:
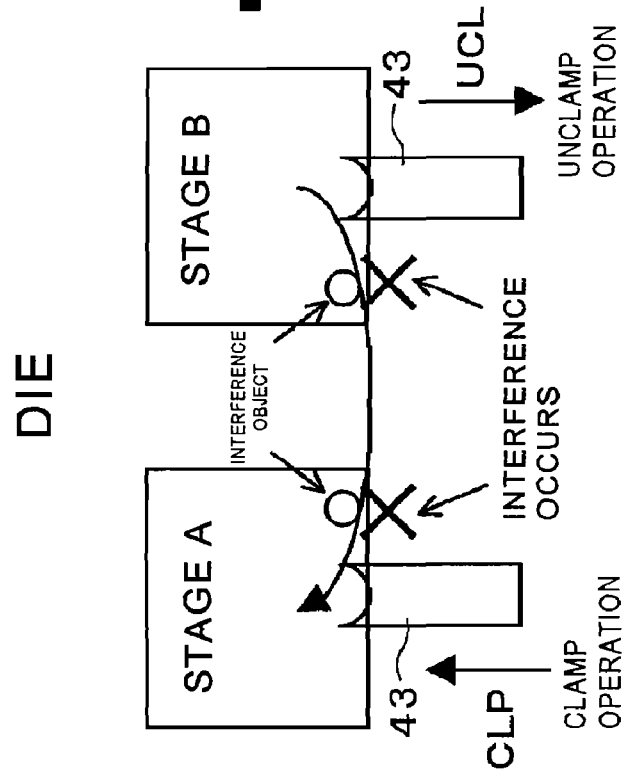

For example, when the finger 43 is returned from a stage B on the right to a stage A on the left by the return operation indicated by the solid line (or dotted line) in FIG. 23(A) (or FIG. 23(B)), the constituent element (finger 43) of the material transfer device 40 interferes with the constituent element (die (e.g. part 16B of the upper die 16 . . . interference object in the drawing)) of the press machine 10. If the moving amount of the finger 43 (clamp-unclamp operation moving amount Yclp·Yucl) can be increased as indicated by the solid line in FIG. 23(B), the finger 43 moves away from the interference object. Specifically, interference can be prevented.

The basic clamp-unclamp operation moving amount Yclp·Yucl may be set (input) using operation moving amount setting input means (operation section 65). The first setting increase/decrease amount Yst can be changed using increase/decrease amount setting input means (operation section 65), and stored in an FRAM (not shown) together with the clamp-unclamp operation moving amount Yclp·Yucl.

The lift-down operation moving amount Zlft·Zdwn and the second setting increase/decrease amount Zst shown in ST41 in FIG. 19 are set (input) and stored in the same manner as the clamp-unclamp operation moving amount Yclp·Yucl and the first setting increase/decrease amount Yst.

Eleventh limit moving amount determination means (61, 64) determines whether or not the clamp-unclamp operation moving amount Yclp·Yucl increased by the function of the first interference prevention means (61,64) (eleventh moving amount increasing means (61,64)) is the limit moving amount (ST82). The limit moving amount Yclp(max)·Yucl(max) is a value specific to the unclamp operation mechanism which is set and stored in advance.

When the eleventh limit moving amount determination means (61,64) has determined that the clamp-unclamp operation moving amount Yclp·Yucl is not the limit moving amount (NO in ST82), the first increase operation repeating means (61,64) operates (return to ST70). The first allowable SPM increasing means (61,64) again operates (YES in ST70 and ST71). Specifically, even when interference occurs, the clamp-unclamp operation angle range ((start angle theta (clp1) to finish angle theta(clp2))(start angle theta(ucl1) to finish angle theta(ucl2))) is gradually increased on condition that the clamp-unclamp operation moving amount Yclp·Yucl has been increased. This also directly leads to an increase in the allowable SPMclp·ucl.

When the eleventh limit moving amount determination means (61,64) has determined that the clamp-unclamp operation moving amount Yclp·Yucl increased by the function of the eleventh moving amount increasing means (61,64) is the limit moving amount (value exceeding the limit moving amount) (YES in ST82), the eleventh operation moving amount reducing means (61,64) reduces the clamp-unclamp operation moving amount. Specifically, the eleventh operation moving amount reducing means (61,64) reduces the clamp-unclamp operation moving amount to the value before being increased (ST83). The clamp-unclamp operation moving amount is gradually reduced by subtracting the first setting increase/decrease amount Yst from the current clamp-unclamp operation moving amount Yclp·Yucl (Yclp·Yucl−Yst).

First allowable SPM comparison-determination means (61,64) provided to the clamp-unclamp operation optimization means compares the clamp-unclamp operation allowable SPMclp·ucl increased based on the clamp-unclamp operation angle range increased by the eleventh angle range increasing means (61,64) with the return operation allowable SPMrtn to determine whether or not the return operation allowable SPMrtn is smaller than the clamp-unclamp operation allowable SPMclp·ucl (ST73).

When the first allowable SPM comparison-determination means has determined that the return operation allowable SPMrtn is smaller than the clamp-unclamp operation allowable SPMclp·ucl (NO in ST73), twelfth angle range increasing means (61,64) increases the return operation angle range (theta(rtn1) to theta(rtn2)) (ST74). In this embodiment, the return operation angle range is increased by reducing the return operation start angle theta(rtn1) shown in FIG. 22 (theta(rtn1)−theta(st2)) and increasing the return operation finish angle theta(rtn2) (theta(rtn2)+theta(st2)).

Specifically, after increasing the allowable SPMclp·ucl by increasing the clamp-unclamp operation angle range (ST71) and increasing the moving amount (ST81), the allowable SPMrtn is increased by increasing the return operation angle range (theta(rtn1) to theta(rtn2)) of the return operation performed between the clamp-unclamp operations.

The first virtual interference determination means (61,64) can determine the presence or absence of virtual interference by activating the virtual interference check device after the return operation angle range has been increased (ST74, NO in ST75, ST78, and ST79).

Twelfth limit angle range determination means (61,64) determines whether or not the return operation angle range (theta(rtn1) to theta(rtn2)) increased (ST74) by the twelfth angle range increasing means (61,64) is a value exceeding 180 degrees (ST75).

When the twelfth limit angle range determination means (61,64) has determined that the increased return operation angle range is a value exceeding 180 degrees (YES in ST75), twelfth angle range reducing means (61,64) reduces the return operation angle range (ST84). Specifically, the twelfth angle range reducing means (61,64) returns the current return operation angle range (start angle theta(rtn1) to finish angle theta(rtn2)) which has been gradually increased (ST74) to the previous return operation angle range at which interference does not occur (ST24). This is achieved by increasing the current return operation start angle theta(rtn1) (theta(rtn1)+theta(st2)) and reducing the current finish angle theta(rtn2) (theta(rtn2)−theta(st2)).

When the twelfth limit angle range determination means (61,64) has determined that the increased return operation angle range (theta(rtn1) to theta(rtn2)) is a value exceeding 180 degrees (YES in ST75), the determination operation (ST78 and ST79) of the first virtual interference determination means (61,64) is prohibited.

Eleventh setting angle appropriateness determination means (61,64) provided to the clamp-unclamp operation optimization means determines whether or not the relationship between the clamp operation start angle theta(clp1) and the unclamp operation finish angle theta(ucl2) manually set in advance is inappropriate (ST10). The relationship is inappropriate (NO in ST70) when theta(clp1)>theta(ucl2) is not satisfied.

Figure 24A:
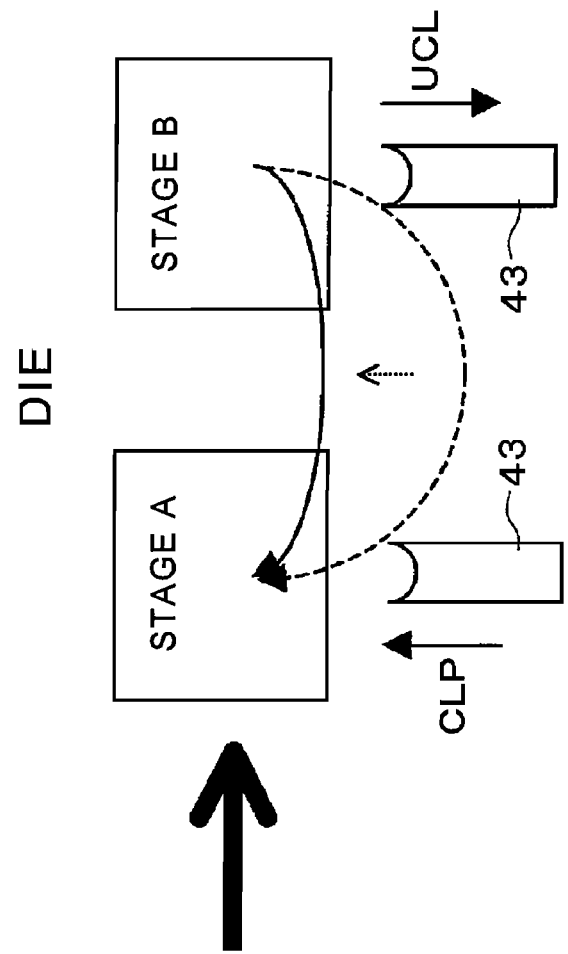
FIGS. 24(A) and 24(B) are diagram illustrative of allowable SPM limitation reduction effects when temporarily reducing a clamp-unclamp operation moving amount.
Figure 24B:
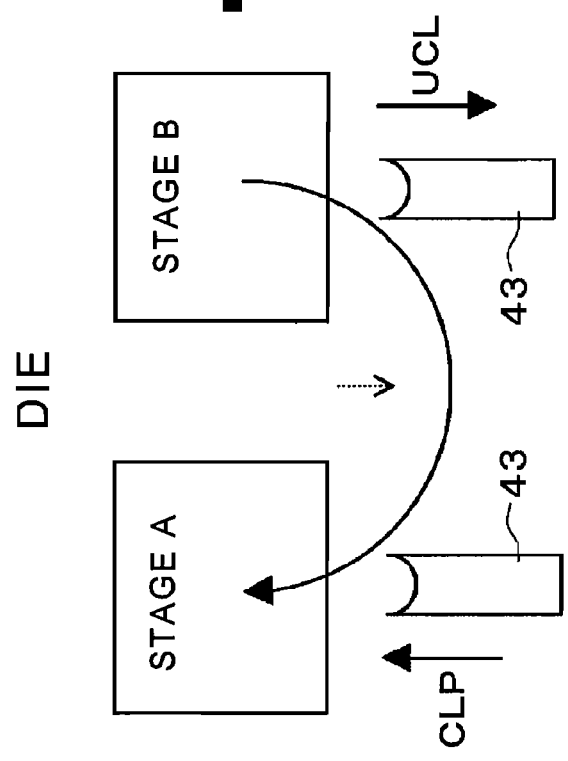

Specifically, when the unclamp operation finish angle theta (ucl2) and the clamp operation start angle theta(clp1) overlap even though the moving amount of the clamp-unclamp operation mechanism (clamp shaft) is not increased, it is considered that the finger 43 has been manually set to take a roundabout route as indicated by the solid line (or dotted line) in FIG. 24(A) (or FIG. 24(B)). Such a situation is one of the factors which limit the allowable SPM. Therefore, the effective allowable SPM can be determined through a smooth virtual interference check by temporarily setting a value which reduces the clamp-unclamp moving amount as indicated by the solid line in FIG. 24(B). The clamp-unclamp moving amount is optimized as a moving amount immediately before interference occurs (ST83).

Eleventh moving amount increase determination means (61,64) provided therefor determines whether or not the clamp-unclamp moving amount has been increased (ST76 in FIG. 18). When the eleventh setting angle appropriateness determination means (61,64) has determined that the relationship between the clamp operation start angle theta(clp1) and the unclamp operation finish angle theta(ucl2) is inappropriate (NO in ST70) and the eleventh moving amount increase determination means (61,64) has determined that the clamp-unclamp moving amount has not been increased (YES in ST76), eleventh moving amount temporarily setting means (61,64) can temporarily set the clamp-unclamp moving amount. Specifically, the eleventh moving amount temporarily setting means (61,64) reduces (temporarily sets) the clamp-unclamp moving amount Yclp·Yucl (ST77).

The allowable SPM under corresponding conditions is calculated after increasing or reducing the operation angle range or increasing or reducing the moving amount in the steps ST74, ST77, ST80, ST81, ST83, and ST84, and rewritten and stored in the FRAM (not shown).

The optimization of the clamp-unclamp operation is thus completed taking the relationship with the return operation into consideration. The clamp-unclamp operation optimization means (61,64) temporarily determines the smaller of the clamp-unclamp operation allowable SPMclp·ucl and the return operation allowable SPMrtn as the allowable SPM obtained by the clamp-unclamp operation optimization, and stores the allowable SPM in the memory. The lift-down operation optimization means (61,64) temporarily determines the smaller of the lift-down operation allowable SPMlft·dwn and the advance operation allowable SPMadv as the allowable SPM obtained by the lift-down operation optimization, and stores the allowable SPM in the memory.

As described above, the optimum motion determination control means (61,64) is formed so that the smaller of the clamp-unclamp operation allowable SPMclp·ucl (or the allowable SPMrtn) temporarily determined by the clamp-unclamp operation optimization means and the lift-down operation allowable SPMlft·dwn (or the allowable SPMadv) temporarily determined by the lift-down operation optimization means can be automatically determined as the SPM (optimum motion) of the press machine 10.

The lift-down operation optimization means (61,64) is described below.

The second allowable SPM increasing means (61,64) increases the allowable SPM by increasing the lift-down operation angle range using twenty-first angle range increasing means (61,64) (ST31 in FIG. 19). In this embodiment, the twenty-first angle range increasing means (61,64) increases the lift-down operation angle range by reducing the down operation start angle theta(dwn1) (theta(dwn1)−theta(st3)) and increasing the lift operation finish angle theta(lft2) (theta(lft2)+theta(st3)).

When the lift-down operation angle range is increased, the allowable SPM calculation means (61,64) calculates the lift-down operation allowable SPMlft·dwn referring to the mechanical rigidity of the transfer (lift-down operation) mechanism, the maximum acceleration, the maximum speed, and the like set and stored in advance (ST32). Specifically, the limit (allowable) SPMlft·dwn is updated.

The second virtual interference determination means (61,64) determines the presence or absence of interference by activating the virtual interference check device during the lift-down operation after increasing the allowable SPM (ST38 and ST39 in FIG. 19). When the updated lift-down operation allowable SPMlft·dwn is determined to be equal to or smaller than the advance operation allowable SPMadv (allowable SPMlft·dwn≦SPMadv) as a result of comparison (YES in ST33), the virtual interference check device is automatically activated and caused to check virtual interference (ST38 in FIG. 19 and ST181 to ST189 in FIG. 20). In this embodiment, when the presence of interference is stored in the memory in the virtual interference check device (ST188 in FIG. 20), the second virtual interference determination means (61,64) detects that effect to determine that virtual interference has occurred (YES in ST39 in FIG. 19).

When the second virtual interference determination means (61,64) has determined that interference does not occur (NO in ST39), the second increase operation repeating means (61,64) again activates the second allowable SPM increasing means (61,64) (YES in ST30 and ST31). Specifically, the second allowable SPM increasing means (61,64) gradually increases the lift-down operation angle range ((start angle theta(lft1) to finish angle theta(lft2))(start angle theta(dwn1) to finish angle theta(dwn2))) on condition that interference does not occur. This directly leads to an increase in the allowable SPMlft·dwn.

However, since an increase in the lift-down operation angle range (allowable SPMlft·dwn) is limited, it is inevitably determined that interference has occurred (YES in ST39). The second interference prevention means (61,64) then operates.

The second interference prevention means (61,64) prevents interference by reducing the lift-down operation angle range (ST40) and increasing the lift-down operation moving amount (ST41) when it is determined that interference has occurred.

Specifically, twenty-first angle range reducing means (61,64) returns the current lift operation angle range (start angle theta(lft1) to finish angle theta(lft2)) and down operation angle range (start angle theta(dwn1) to finish angle theta(dwn2)) which have been gradually increased (ST31) to the previous lift operation angle range and down operation angle range at which interference does not occur (ST40). The twenty-first angle range reducing means (61,64) reduces the lift-down operation angle range by increasing the down operation start angle theta(dwn1) (theta(dwn1)+theta(st3)) and reducing the lift operation finish angle theta(lft2) (theta(lft2)−theta(st3)).

Twenty-first moving amount increase determination means (61,64) determines whether or not the lift-down moving amount has been increased (ST36). When the twenty-first setting angle appropriateness determination means (61,64) has determined that the down operation start angle theta(dwn1) does not exceed 0 degrees (inappropriate) (NO in ST30) and the twenty-first moving amount increase determination means (61,64) has determined that the lift-down moving amount Zlft·Zdwn has not been increased (YES in ST36), twenty-first moving amount temporarily setting means (61,64) can temporarily set the lift-down moving amount. Specifically, the eleventh twenty-first moving amount temporarily setting means (61,64) reduces (temporarily sets) the lift-down moving amount Zlft·Zdwn (ST37).

Twenty-first limit moving amount determination means (61,64) provided to the lift-down operation optimization means determines whether or not the lift-down operation moving amount Zlft·Zdwn increased by the function of the second interference prevention means (61,64) (twenty-first moving amount increasing means (61,64)) is the limit moving amount (ST42). The limit moving amount Zlft(max)·Zdwn(max) is a value specific to the lift-down operation mechanism which is set and stored in advance.

When the twenty-first limit moving amount determination means (61,64) has determined that the lift-down operation moving amount Zlft·Zdwn increased by the function of the second interference prevention means (61,64) is not the limit moving amount (NO in ST42), the second increase operation repeating means (61,64) operates. Specifically, the second allowable SPM increasing means (61,64) again operates (YES in ST30 and ST31). Specifically, even when interference has occurred, the lift-down operation angle range ((start angle theta(lft1) to finish angle theta(lft2))(start angle theta(dwn1) to finish angle theta(dwn2))) is gradually increased on condition that the lift-down operation moving amount Zlft·Zdwn has been increased. This also directly leads to an increase in the allowable SPMlft·dwn.

When the twenty-first limit moving amount determination means (61,64) has determined that the lift-down operation moving amount increased by the function of the twenty-first moving amount increasing means (61,64) is a value exceeding the limit moving amount (YES in ST42), the twenty-first operation moving amount reducing means (61,64) returns the lift-down operation moving amount to the value before being increased (ST43). The lift-down operation moving amount is gradually reduced by subtracting the second setting increase/decrease amount Zst from the lift-down operation moving amount Zlft·Zdwn (Zlft·Zdwn−Zst).

Second allowable SPM comparison-determination means (61,64) provided to the lift-down operation optimization means compares the lift-down operation allowable SPMlft·dwn increased based on the clamp-unclamp operation angle range increased by the twenty-first angle range increasing means (61,64) with the advance operation allowable SPMadv to determine whether or not the advance operation allowable SPMadv is smaller than the lift-down operation allowable SPMlft·dwn (ST33).

When the second allowable SPM comparison-determination means has determined that the advance operation allowable SPMadv is smaller than the lift-down operation allowable SPMlft·dwn (NO in ST33), twenty-second angle range increasing means (61,64) increases the advance operation angle range (theta(adv1) to theta(adv2)) (ST34). In this embodiment, the advance operation angle range is increased by reducing the advance operation start angle theta(adv1) shown in FIGS. 22(A) and 22(B) (theta(adv1)−theta(st4)) and increasing the advance operation finish angle theta(adv2) (theta(adv2)+theta(st4)).

Specifically, after increasing the allowable SPMadv by increasing the lift-down operation angle range (ST31) and increasing the moving amount (ST41), the allowable SPMadv is increased by increasing the advance operation angle range (theta(adv1) to theta(adv2)) of the advance operation performed between the lift-down operations.

The second virtual interference determination means (61, 64) can determine the presence or absence of interference by activating the virtual interference check device after the advance operation angle range has been increased (ST34, NO in ST35, ST38, and ST39).

Twenty-second limit angle range determination means (61, 64) determines whether or not the advance operation angle range (theta(adv1) to theta(adv2)) increased (ST34) by the twenty-second angle range increasing means (61,64) is a value exceeding 180 degrees (ST35).

When the twenty-second limit angle range determination means (61,64) has determined that the increased advance operation angle range is a value exceeding 180 degrees (YES in ST35), twenty-second angle range reducing means (61,64) reduces the advance operation angle range (theta(adv1) to theta(adv2)) (ST44).

Specifically, the twenty-second angle range reducing means (61,64) returns the current advance operation angle range (start theta(adv1) to finish angle theta(adv2)) which has been gradually increased (ST34) to the previous advance operation angle range at which interference does not occur (ST44). In this embodiment, the advance operation angle range is reduced by increasing the current return operation start angle theta(adv1) (theta(adv1)+theta(st4)) and reducing the current finish angle theta(adv2) (theta(adv2)−theta(st4)).

When the twenty-second limit angle range determination means (61,64) has determined that the increased advance operation angle range is a value exceeding 180 degrees (YES in ST35), the determination operation (ST38 and ST39) of the second virtual interference determination means (61,64) is prohibited.

Twenty-first setting angle appropriateness determination means (61,64) provided to the lift-down operation optimization means determines whether or not the down operation start angle theta(dwn1) manually set in advance exceeds theta (lft2) degrees (whether or not the down operation start angle theta(dwn1) is inappropriate) (ST30). The down operation start angle theta(dwn1) is inappropriate (NO in ST30) when theta(dwn1)>theta(lft2) degrees is not satisfied.

Twenty-first moving amount increase determination means (61,64) determines whether or not the lift-down moving amount has been increased (ST36). When the twenty-first setting angle appropriateness determination means (61,64) has determined that the down operation start angle theta (dwn1) does not exceed theta(lft2) degrees (inappropriate) (NO in ST30) and the twenty-first moving amount increase determination means (61,64) has determined that the lift-down moving amount Zlft·Zdwn has not been increased (YES in ST36), twenty-first moving amount temporarily setting means (61,64) can temporarily set the lift-down moving amount. Specifically, the eleventh moving amount temporarily setting means (61,64) reduces (temporarily sets) the lift-down moving amount Zlft·Zdwn (ST37).

The allowable SPM under corresponding conditions is calculated after increasing or reducing the operation angle range or increasing or reducing the moving amount in the steps ST34, ST37, ST40, ST41, ST43, and ST44, and rewritten and stored in the FRAM (not shown).

The optimization of the lift-down operation is thus completed taking the relationship with the advance operation into consideration. The lift-down operation optimization means (61,64) temporarily determines the smaller of the lift-down operation allowable SPMlft·dwn and the advance operation allowable SPMadv as the allowable SPM obtained by the lift-down operation optimization. The subsequent automatic determination of the optimum motion by the optimum motion control means (61,64) has been described above.

According to this embodiment, the transfer press machine includes the virtual interference check device which can check interference between the three-dimensional press-side data-conversion constituent element (e.g. data-conversion upper die 15D) and the transfer-side data-conversion constituent element (data-conversion finger 43D) during the virtual transfer press cycle in virtual space, the clamp-unclamp operation optimization means (61,64) including the first allowable SPM increasing means, the first virtual interference determination means, the first increase operation repeating means, and the first interference prevention means, and the lift-down operation optimization means (61,64) including the second allowable SPM increasing means, the second virtual interference determination means, the second increase operation repeating means, and the second interference prevention means, and can automatically determine the smaller of the temporarily determined clamp-unclamp operation allowable SPMclp·ucl and lift-down operation allowable SPMlft·dwn as the SPM of the press machine 10. Therefore, optimization of the transfer press motion (cycle) with an increased SPM can be promptly and accurately performed while preventing interference. Therefore, handling is facilitated. Moreover, a complicated setting/input operation and an additional worker are unnecessary. Moreover, since it is unnecessary to actually perform the transfer press cycle in real space, it is safe and almost free from risk.

Moreover, the problem in the related art (i.e. the probability of interference is considerably increased when increasing the operation angle range by partially overlapping (simultaneously performing) the transfer operations) can be eliminated. Therefore, a situation in which the press machine 10 is operated at a low speed can be made unnecessary, and troublesome operation in which interference checks between respective parts and operation angle assignments are repeatedly performed while gradually increasing the press speed to find an appropriate point can be eliminated. This makes it possible to fully utilize the characteristics of the servomotor drive press machine 10, that is, the advantage which allows selection of an arbitrary press motion (e.g. decreasing the processing speed in the pressing region or making the processing speed constant or achieving stop operation at the bottom dead center). Since it is unnecessary to set the press conditions only by intuition or an empirical rule, the burden on worker assignment can be significantly reduced. It is possible to deal with a demand for a frequent change in the press motion and the transfer motion and a frequent change in the shape of various parts in the press production site.

Moreover, the method can be reliably carried out in which the transfer operation angle range is increased while checking virtual interference in virtual space based on the temporarily set transfer operation angle range, the transfer operation angle range is returned to the previous value and the transfer operation moving amount is increased when virtual interference occurs, the transfer operation angle range is again increased after increasing the transfer operation moving amount while checking virtual interference in virtual space, and a motion of which the assigned angle is the transfer operation angle range when the transfer operation moving amount has reached the limit is automatically determined. This enables an SPM which ensures a state in which interference does not occur to be automatically determined promptly and accurately. Therefore, the press operation at the maximum speed which satisfies the material transfer conditions can be reliably and stably performed. Productivity is also improved. Since the shape of the die and the material is taken into consideration, interference can be reliably prevented before operating the actual machine in real space.

The start and finish of each transfer operation of the material transfer device 40 are not assigned to the crank angle of the press machine 10, and each transfer operation angle range can be automatically increased while preventing interference. Specifically, since the transfer operation time can be increased, a change in speed per unit time can be reduced during activation and inactivation. Therefore, since the acceleration can be reduced and flexure of the feed bar 41 and the like can be minimized, the material 200 can be stably transferred. Since the operation which requires a rapid change in acceleration can be avoided, the life of each constituent element (mechanical part) can be increased.

Since the clamp-unclamp operation moving amount Yclp·Yucl can be returned to a value less than the limit moving amount and the lift-down operation moving amount Zlft·Zdwn can be returned to a value less than the limit moving amount, the SPM can be optimized to the allowable (limit) SPM when the clamp-unclamp operation moving amount Yclp·Yucl has reached the specified limit width of the die (16, 18) or the like.

Since the return operation angle range (theta(rtn1) to theta (rtn2)) can be increased when the return operation allowable SPMrtn has been determined to be smaller than the increased clamp-unclamp operation allowable SPMclp·ucl, and the advance operation angle range can be increased when the value advance operation allowable SPM has been determined to be smaller than the increased lift-down operation allowable SPM, the SPM can be optimized to the limit SPM at a point immediately before the clamp operation finish angle theta (clp2) and the unclamp operation start angle theta(ucl1) overlap.

Since the return operation angle range can be reduced when the increased return operation angle range (theta(rtn1) to theta(rtn2)) has been determined to be a value exceeding 180 degrees, and the advance operation angle range can be reduced when the increased advance operation angle range (theta(adv1) to theta(adv2)) has been determined to be a value exceeding 180 degrees, a situation can be prevented in which the return operation angle range and the advance operation angle range exceed 180 degrees.

Since a temporary setting of reducing the clamp-unclamp operation moving amount (Y) can be automatically performed, limitations to the allowable SPM which may occur when the clamp operation finish angle theta(clp2) and the unclamp operation start angle theta(ucl1) overlap even though the clamp-unclamp operation moving amount is not increased can be automatically eliminated.

Since the virtual interference check device can automatically determine whether or not interference occurs between the press-side data-conversion upper die 16D or the like and the transfer-side data-conversion finger 43D or the like during the virtual transfer press cycle in virtual space, interference can be accurately and promptly checked, and handling is facilitated. A complicated setting/input operation and an additional worker are unnecessary. Moreover, since it is unnecessary to actually perform the transfer press cycle in real space, it is safe and almost free from risk. It is possible to deal with a demand for an increase in the working speed during die tryout in the press production site in which the press motion SLD, the transfer motion TLD, the shape of various parts, and the like are frequently changed, for example.

Moreover, since a complicated and careful setting/input operation is unnecessary in comparison with the previously proposed transfer press machine which requires setting/input for each press condition (e.g. specified speed pattern at processing start position, processing end position, and processing region) and material transfer condition (e.g. advance operation start timing, advance operation speed, and advance operation distance), handling is very easy. Since an additional worker is unnecessary, the press cost can be reduced.

In particular, since the shape of the die (16, 18), the finger 43, and the material 200 is taken into consideration, interference can be accurately checked. Moreover, since the image (data-conversion constituent element and its movement) can be confirmed with the naked eye before operating the machine in real space, the presence or absence of virtual interference can be specifically and efficiently determined. Therefore, utility is extremely increased.

If interference is checked using the simple three-dimensional shape data-conversion constituent element in the initial stage of the virtual transfer press cycle, the processing load in the initial stage immediately before interference occurs can be significantly reduced, and the processing speed can be further increased. Since the complicated three-dimensional shape data-conversion constituent element is used in the final stage, specific, accurate, and prompt determination can be ensured.

Furthermore, since the press-side data-conversion constituent element and the transfer-side data-conversion constituent element can be displayed on the display section 66, the relative relationship between the constituent elements can be observed when creating the data-conversion constituent element or determining the presence or absence of virtual interference. Therefore, handling is further facilitated.

Figure 25:
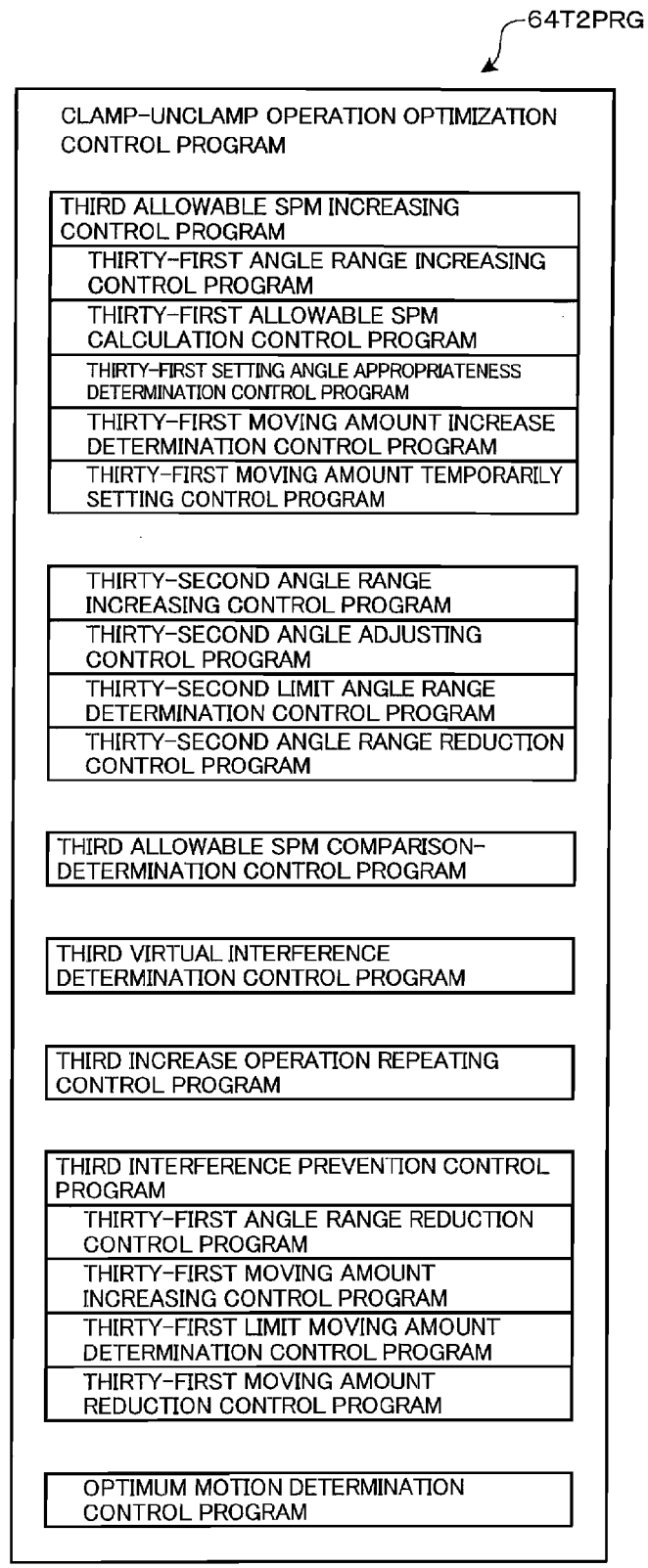
FIG. 25 is a diagram illustrative of two-dimensional transfer operation optimization control program storage means according to a fourth embodiment of the invention.

The basic configurations and functions according to an additional embodiment are the same as those of the previously explained embodiment except that the material transfer device 40 is a two-dimensional transfer system, as shown in FIGS. 25 and 26.

A transfer press machine (10,40) according to this embodiment includes a virtual interference check device and an SPM automatic determination device (optimum motion determination control means), and is formed so that the smaller of the temporarily determined clamp-unclamp operation allowable SPMclp·ucl and the temporarily determined return operation allowable SPMrtn can be automatically determined as the SPM (optimum motion) of the press machine 10.

Specifically, the transfer press machine (10,40) includes the virtual interference check device which can store the press-side data-conversion constituent element (e.g. data-conversion upper die 15D) and the transfer-side data-conversion constituent element (e.g. data-conversion finger 43D) in a state in which the press-side data-conversion constituent element and the transfer-side data-conversion constituent element are converted into three-dimensional shape data and placed in virtual space to have the same relative positional relationship as in real space, and can check interference between the press-side data-conversion constituent element and the transfer-side data-conversion constituent element during the virtual transfer press cycle in virtual space, the clamp-unclamp operation optimization means (61,64) including third allowable SPM increasing means, third virtual interference determination means, third increase operation repeating means, and third interference prevention means and capable of optimizing clamp-unclamp operation, third allowable SPM comparison-determination means, thirty-second angle range increasing means, and thirty-second angle adjusting means (61,64), and is formed so that, when the third allowable SPM comparison-determination means (61,64) has determined that the return operation allowable SPMrtn is smaller than the clamp-unclamp operation allowable SPMclp·ucl, the return advance operation angle range can be increased by thirty-first angle range increasing means (61,64) and angle adjustment can be performed by the thirty-second angle adjusting means (61,64), and the third virtual interference determination means can perform a determination operation by activating the interference check device after angle adjustments.

The third allowable SPM increasing means (61,64), the third virtual interference determination means (61,64), the third increase operation repeating means (61,64), and the third interference prevention means (61,64) (thirty-first angle range reducing means and thirty-first moving amount increasing means) making up the SPM automatic determination device (optimum motion determination control means) have the same configuration and function as the first allowable SPM increasing means (61,64), the first virtual interference determination means (61,64), the first increase operation repeating means (61,64), and the first interference prevention means (61,64) (eleventh angle range reducing means and eleventh moving amount increasing means) according to the first embodiment.

Third allowable SPM comparison-determination means (61,64), thirty-first range increasing means (61,64), thirty-first allowable SPM calculation means (61,64), thirty-first setting angle appropriateness determination means (61,64), thirty-first moving amount increase determination means (61,64), thirty-first moving amount temporarily setting means (61,64), thirty-first limit moving amount determination means (61,64), thirty-first moving amount shortening means (61,64), and thirty-second angle range reducing means (61,64) are provided and respectively have the same configuration and function as the first allowable SPM comparison-determination means (61,64), the eleventh angle range increasing means (61,64), the eleventh allowable SPM calculation means (61,64), the eleventh setting angle appropriateness determination means (61,64), the eleventh moving amount increase determination means (61,64), the eleventh moving amount temporarily setting means (61,64), the eleventh limit moving amount determination means (61,64), the eleventh moving amount shortening means (61,64), and the twelfth angle range reducing means (61,64) according to the third embodiment.

Therefore, steps ST50 to ST53 and ST56 to ST64 shown in FIG. 26 are the same as the steps ST70 to ST73 and ST76 to ST84 shown in FIG. 18 according to the first embodiment. Accordingly, description of these steps is omitted.

In this embodiment, two-dimensional transfer operation optimization control program storage means 64T2PRG shown in FIG. 25 is provided instead of the three-dimensional transfer operation optimization control program storage means 64T3PRG (see FIG. 17) according to the third embodiment. The two-dimensional transfer operation optimization control program storage means is indicated in the HDD 64 by the dash-dot-dot line. The virtual interference check device (virtual interference check control means (61,64)) is the same as the virtual interference check device according to the third embodiment. FIG. 20 is directly applied to the virtual interference check device.

The thirty-second angle range increasing means (61,64), the thirty-second angle adjusting means (61,64), and the thirty-second limit angle range determination means (61,64) are provided in the second embodiment corresponding to the twelfth angle range increasing means (61,64) and the twelfth limit angle range determination means (61,64) concerning the return operation provided in the third embodiment. These means are executed in the steps ST54, ST54A, and ST55 shown in FIG. 26.

Specifically, the third allowable SPM comparison-determination means (61,64) compares the clamp-unclamp operation allowable SPMclp·ucl increased based on the clamp-unclamp operation angle range increased by the thirty-first range increasing means (61,64) with the return operation allowable SPMrtn to determine whether or not the return operation allowable SPMrtn is smaller than the clamp-unclamp operation allowable SPMclp·ucl (ST53).

When the third allowable SPM comparison-determination means (61,64) has determined that the return operation allowable SPMrtn is smaller than the clamp-unclamp operation allowable SPMclp·ucl (NO in ST53), the thirty-first range increasing means (61,64) increases the return operation angle range (theta(rtn1) to theta(rtn2)) and the advance operation angle range (theta(adv1) to theta(adv2)) (ST54).

In this embodiment, the return operation angle range is increased by reducing the return operation start angle theta(rtn1) shown in FIGS. 22(A) and 22(B) (theta(rtn1)−theta(st2)) and increasing the return operation finish angle theta(rtn2) (theta(rtn2)+theta(st2)). Likewise, the advance operation angle range is increased by reducing the advance operation start angle theta(adv1) (theta(adv1)−theta(st2)) and increasing the advance operation finish angle theta(adv2) (theta(adv2)+theta(st2)).

Specifically, after increasing the allowable SPMclp·ucl by increasing the clamp-unclamp operation angle range (ST51) and increasing the moving amount (ST61), the allowable SPMadv·rtn is increased by increasing the advance-return operation angle range of the advance-return operation performed in a period other than the clamp-unclamp operation.

The thirty-second angle adjusting means (61,64) adjusts the clamp operation finish angle theta(clp2) and the advance operation start angle theta(adv1) to the increased advance operation angle (ST54A). The thirty-second angle adjusting means (61,64) adjusts the angles so that theta(clp2)=theta(adv1) and theta(ucl1)=theta(adv2). The angles are adjusted to perform a two-dimensional transfer.

The thirty-second limit angle range determination means (61,64) determines whether or not the return operation angle range (theta(rtn1) to theta(rtn2)) and the advance operation angle range (theta(adv1) to theta(adv2)) adjusted in the step ST54A are values exceeding 180 degrees (ST55).

Description of the remaining configurations and functions which are the same as in the third embodiment is omitted.

According to this embodiment, the same effects as in the previously explained embodiment can be achieved. This embodiment is extremely effective for a transfer press machine including a two-dimensional transfer material transfer device 40.

INDUSTRIAL APPLICABILITY

According to the invention, whether or not interference occurs between the constituent element of the press machine and the constituent element of the material transfer device can be promptly and accurately determined in virtual space. Moreover, optimization of transfer press motion (cycle) with an increased SPM while preventing interference can be automatically performed promptly and accurately. In particular, the invention is effective for operating a transfer press machine including a servomotor drive press machine.

The invention claimed is:

1. A transfer press machine including a press machine which can press a material by using a press operation of a slide and a material transfer device which can transfer a material to the press machine by using a transfer operation of a finger, the press machine and the material transfer device being disposed in real space to have a specific relative positional relationship with each other, the transfer press machine operable to press a material transferred during a transfer press cycle in which the press operation and the transfer operation are synchronized, and the transfer press machine comprising an interference check device, the interference check device including:

a data-conversion constituent element storage section which stores a press-side data-conversion constituent element, which is a constituent element of the press machine and is converted into three-dimensional shape data, and a transfer-side data-conversion constituent element, which is a constituent element of the material transfer machine and is converted into three-dimensional shape data, in a state of being placed in virtual space to have the same relative positional relationship as in the real space;

a virtual press operation control section which causes the press-side data-conversion constituent element placed in the data-conversion constituent element storage section to perform a virtual press operation in the virtual space according to a press motion;

a virtual transfer operation control section which causes the transfer-side data-conversion constituent element placed in the data-conversion constituent element storage section to perform a virtual transfer operation in the virtual space according to a transfer motion;

a virtual synchronization timing information generation-output section which generates and outputs virtual synchronization timing information for causing the virtual press operation control section and the virtual transfer operation control section to execute a virtual transfer press cycle in which the virtual press operation and the virtual transfer operation are synchronized; and a virtual interference determination section which determines whether or not interference occurs between the press-side data-conversion constituent element and the transfer-side data-conversion constituent element during the virtual transfer press cycle, whereby interference in the virtual space is checked without executing the transfer press cycle in the real space.

2. The transfer press machine as defined in claim 1, wherein a data-conversion finger path-shaped box based on data-conversion finger traces when causing a data-conversion finger, which is a constituent element of the material transfer machine and is converted into three-dimensional shape data, to perform the virtual transfer operation in the virtual space, is generated and placed in the virtual space;

wherein the transfer press machine includes a first virtual interference confirmation target extraction section which detects interference between a data-conversion upper die, which is a constituent element of the press machine and converted into three-dimensional shape data, and the data-conversion finger path-shaped box placed in the virtual space, and for extracting the detected data-conversion upper die as a virtual interference confirmation target, when virtually moving the data-conversion upper die down to a virtual bottom dead center in the virtual space; and wherein the virtual interference determination section determines the presence or absence of virtual interference by using the data-conversion upper die extracted by the first virtual interference confirmation target extraction section as the press-side data-conversion constituent element and the data-conversion finger as the transfer-side data-conversion constituent element.

3. The transfer press machine as defined in claim 1, wherein, when causing a data-conversion finger, which is a constituent element of the material transfer machine and is converted into three-dimensional shape data, to perform the transfer operation in the virtual space, each data-conversion material path-shaped box corresponding to each transfer operation and based on each trace of a data-conversion material virtually held by the data-conversion finger is generated and placed in the virtual space;

wherein the transfer press machine includes a second virtual interference confirmation target extraction section which detects interference of a data-conversion upper die, which is a constituent element of the press machine and converted into three-dimensional shape data, and a data-conversion lower die, which are constituent elements of the press machine and converted into three-dimensional shape data, with each data-conversion material path-shaped box placed in virtual space, and for extracting the detected data-conversion upper die and data-conversion lower die as virtual interference confirmation targets, when virtually moving the data-conversion upper die down to a virtual bottom dead center in the virtual space; and wherein the virtual interference determination section determines the presence or absence of virtual interference by using the data-conversion upper die and the data-conversion lower die extracted by the second virtual interference confirmation target extraction section as the press-side data-conversion constituent elements and the data-conversion material as the transfer-side data-conversion constituent element.

4. The transfer press machine as defined in claim 1, wherein the press-side data-conversion constituent element and the transfer-side data-conversion constituent element are stored in the data-conversion constituent element storage section selectably as a complicated three-dimensional shape data-conversion constituent element generated by converting an actual three-dimensional shape into data or a simple three-dimensional shape data-conversion constituent element which involves the actual three-dimensional shape;

wherein the transfer press machine includes a data-conversion constituent element switch control section which switches the constituent element from the simple three-dimensional shape data-conversion constituent element to the complicated three-dimensional shape data-conversion constituent element at a specific timing during the virtual transfer press cycle; and wherein the virtual interference determination section determines the presence or absence of virtual interference by using at least one of the press-side data-conversion constituent element and the transfer-side data-conversion constituent element as the simple three-dimensional shape data-conversion constituent element before switching, and by using both the press-side data-conversion constituent element and the transfer-side data-conversion constituent element as the complicated three-dimensional shape data-conversion constituent elements after switching.

5. The transfer press machine as defined in claim 1, wherein a determination necessary interval which requires determination of the presence or absence of virtual interference can be set in the virtual transfer press cycle; and wherein the virtual interference determination section can determine the presence or absence of virtual interference in the determination necessary interval during the virtual transfer press cycle.

6. The transfer press machine as defined in claim 5, wherein a determination execution interval formed by subdividing the set determination necessary interval is set; and wherein the virtual interference determination section can determine the presence or absence of virtual interference in the determination execution interval.

7. The transfer press machine as defined in claim 1, wherein execution of determination of the presence or absence of virtual interference is designated during the virtual transfer press cycle in units of one-dimensional virtual transfer operations forming the virtual transfer operation; and wherein the virtual interference determination section can determine the presence or absence of virtual interference during the one-dimensional virtual transfer operation for which execution of determination of the presence or absence of virtual interference is designated.

8. The transfer press machine as defined in claim 1, wherein the press-side data-conversion constituent element and the transfer-side data-conversion constituent element stored in the data-conversion constituent element storage section in a state of being placed in the virtual space is displayed on a display section.

9. A transfer press machine including a press machine which can press a material by utilizing a press operation of a slide and a material transfer device which three-dimensionally transfers a material, the press machine and the material transfer device being disposed in real space to have a specific relative positional relationship, and the transfer press machine operable to press a material transferred during a transfer press cycle in which the press operation and the transfer operation are synchronized, wherein a press-side data-conversion constituent element, which is a constituent element of the press machine and is converted into three-dimensional shape data, and a transfer-side data-conversion constituent element, which is a constituent element of the material transfer machine and is converted into three-dimensional shape data, are stored in a state of being placed in virtual space to have the same relative positional relationship as in the real space;

wherein the transfer press machine includes:

a virtual interference check device formed so that interference between the press-side data-conversion constituent element and the transfer-side data-conversion constituent element can be checked during a virtual transfer press cycle in which a virtual press operation of the press-side data-conversion constituent element placed in the virtual space according to a press motion and a virtual transfer operation of the transfer-side data-conversion constituent element placed in the virtual space according to a transfer motion are synchronized;

a clamp-unclamp operation optimization section including a first allowable strokes-per-minute (SPM) increasing section which increases an allowable SPM by increasing a clamp-unclamp operation angle range by using an eleventh angle range increasing section, a first virtual interference determination section which determines the presence or absence of interference by activating the virtual interference check device during a clamp-unclamp operation after increasing the allowable SPM, a first increase operation repeating section which again activates the first allowable SPM increasing section when the first virtual interference determination section has determined that interference does not occur, and a first interference prevention section which prevents interference by reducing the clamp-unclamp operation angle range and increasing a clamp-unclamp operation moving amount when the first virtual interference determination section has determined that interference has occurred, the clamp-unclamp operation optimization section being formed to optimize the clamp-unclamp operation; and a lift-down operation optimization section including a second allowable SPM increasing section which increases an allowable SPM by increasing a lift-down operation angle range by using a twenty-first angle range increasing section, a second virtual interference determination section which determines the presence or absence of interference by activating the virtual interference check device during a lift-down operation after increasing the allowable SPM, a second increase operation repeating section which again activates the second allowable SPM increasing section when the second virtual interference determination section has determined that interference does not occur, and a second interference prevention section which prevents interference by reducing the lift-down operation angle range and increasing a lift-down operation moving amount when the second virtual interference determination section has determined that interference has occurred, the lift-down operation optimization section being formed to optimize the lift-down operation; and wherein the smaller of a clamp-unclamp operation allowable SPM temporarily determined by the clamp-unclamp operation optimization section and a lift-down operation allowable SPM temporarily determined by the lift-down operation optimization section are automatically determined as an SPM of the press machine.

10. The transfer press machine as defined in claim 9, wherein an eleventh limit moving amount determination section and an eleventh operation moving amount reducing section are provided on the side of the clamp-unclamp operation optimization section, the clamp-unclamp operation moving amount being reduced to a value before being increased by activating the eleventh operation moving amount reducing section when the eleventh limit moving amount determination section has determined that the clamp-unclamp operation moving amount increased by the first interference prevention section is a limit moving amount; and wherein a twenty-first limit moving amount determination section and a twenty-first operation moving amount reducing section are provided on the side of the lift-down operation optimization section, the lift-down operation moving amount being reduced to a value before being increased by activating the twenty-first operation moving amount reducing section when the twenty-first limit moving amount determination section has determined that the lift-down operation moving amount increased by the second interference prevention section is a limit moving amount.

11. The transfer press machine as defined in claim 9,
wherein a first allowable SPM comparison-determination section and a twenty-first angle range increasing section are provided on the side of the clamp-unclamp operation optimization section, the return operation angle range being increased by a twelfth angle range increasing section, and the first virtual interference determination section performing a determination operation by activating the virtual interference check device after the return operation angle range has been increased, when the first allowable SPM comparison-determination section has compared the clamp-unclamp operation allowable SPM increased based on the clamp-unclamp operation angle range increased by the eleventh angle range increasing section with a return operation allowable SPM and determined that the return operation allowable SPM is smaller than the clamp-unclamp operation allowable SPM; and
wherein a second allowable SPM comparison-determination section and a twenty-second angle range increasing section are provided on the side of the lift-down operation optimization section, the advance operation angle range being increased by the twenty-second angle range increasing section, and the second virtual interference determination section performing a determination operation by activating the virtual interference check device after the advance operation angle range has been increased, when the second allowable SPM comparison-determination section has compared the lift-down operation allowable SPM increased based on the lift-down operation angle range increased by the twenty-first angle range increasing section with an advance operation allowable SPM and determined that the advance operation allowable SPM is smaller than the lift-down operation allowable SPM.

12. The transfer press machine as defined in claim 11,
wherein a twelfth limit angle range determination section and a twelfth angle range reducing section are provided on the side of the clamp-unclamp operation optimization section, the determination operation of the first virtual interference determination section being prohibited, and the return operation angle range being reduced by the twelfth angle range reducing section, when the twelfth limit angle range determination section has determined that the return operation angle range increased by the twelfth angle range increasing section is a value exceeding 180 degrees; and
wherein a twenty-second limit angle range determination section and a twenty-second angle range reducing section are provided on the side of the lift-down operation optimization section, the determination operation of the second virtual interference determination section being prohibited, and the advance operation angle range being reduced by the twenty-second angle range reducing section, when the twenty-second limit angle range determination section has determined that the advance operation angle range increased by the twenty-second angle range increasing section is a value exceeding 180 degrees.

13. The transfer press machine as defined in claim 9,
wherein an eleventh setting angle appropriateness determination section, an eleventh moving amount increase determination section, and an eleventh moving amount temporarily setting section are provided on the side of the clamp-unclamp operation optimization section, the clamp-unclamp moving amount being temporarily set by activating the eleventh moving amount temporarily setting section, when the eleventh setting angle appropriateness determination section has determined that the relationship between a clamp operation start angle and an unclamp operation finish angle is inappropriate and the eleventh moving amount increase determination section has determined that the clamp-unclamp moving amount has not been increased; and
wherein a twenty-first setting angle appropriateness determination section, a twenty-first moving amount increase determination section, and a twenty-first moving amount temporarily setting section are provided on the side of the clamp-unclamp operation optimization section, the lift-down moving amount being temporarily set by activating the twenty-first moving amount temporarily setting section, when the twenty-first setting angle appropriateness determination section has determined that a down operation start angle does not exceed 0 degrees and the twenty-first moving amount increase determination section has determined that the lift-down moving amount has not been increased.

14. A transfer press machine including a press machine which can press a material by utilizing a press operation of a slide and a material transfer device which two-dimensionally transfers a material, the press machine and the material transfer device being disposed in real space to have a specific relative positional relationship, and the transfer press machine is operable to press a material transferred during a transfer press cycle in which the press operation and the transfer operation are synchronized,
wherein a press-side data-conversion constituent element, which is a constituent element of the press machine and is converted into three-dimensional shape data, and a transfer-side data-conversion constituent element, which is a constituent element of the material transfer machine and is converted into three-dimensional shape data, is stored in a state of being placed in virtual space to have the same relative positional relationship as in the real space;
wherein the transfer press machine includes:
a virtual interference check device formed so that interference between the press-side data-conversion constituent element and the transfer-side data-conversion constituent element can be checked during a virtual transfer press cycle in which a virtual press operation of the press-side data-conversion constituent element placed in the virtual space according to a press motion and a virtual transfer operation of the transfer-side data-conversion constituent element placed in the virtual space according to a transfer motion are synchronized;
a clamp-unclamp operation optimization section including an allowable strokes-per-minute (SPM) increasing section which increases an allowable SPM by increasing a clamp-unclamp operation angle range by using a first angle range increasing section, a virtual interference determination section which determines the presence or absence of interference by activating the virtual interference check device during a clamp-unclamp operation after increasing the allowable SPM, an increase operation repeating section which again activates the allowable SPM increasing section when the virtual interference determination section has determined that interference does not occur, and an interference prevention section which prevents interference by reducing the clamp-unclamp operation angle range and increasing a clamp-unclamp operation moving amount when the virtual interference determination section has determined that interference has occurred, the clamp-unclamp operation optimization section being formed to optimize the clamp-unclamp operation;

an allowable SPM comparison-determination section which compares a clamp-unclamp operation allowable SPM increased based on the clamp-unclamp operation angle range increased by the first angle range increasing section with a return operation allowable SPM to determine whether or not the return operation allowable SPM is smaller than the clamp-unclamp operation allowable SPM;

a second angle range increasing section which increases a return-advance operation angle range; and a second angle adjusting section which adjusts a clamp operation finish angle and advance operation start angle and adjusts an unclamp operation start angle and an advance operation finish angle; and wherein, when the allowable SPM comparison-determination section has determined that the return operation allowable SPM is smaller than the clamp-unclamp operation allowable SPM, the return-advance operation angle range can be increased by the first angle range increasing section, angle adjustments can be performed by the second angle adjusting section, and the virtual interference determination section can perform a determination operation by activating the virtual interference check device after the angle adjustments.

* * * * *